United States Patent [19]
Unger et al.

[11] Patent Number: 6,021,052
[45] Date of Patent: Feb. 1, 2000

[54] DC/AC POWER CONVERTER

[75] Inventors: Thomas Michael Unger, Burnaby; Haakon MacCallum, Coquitlam; Douglas Kenneth Manness, Port Coquitlam, all of Canada

[73] Assignee: Statpower Technologies Partnership, Canada

[21] Appl. No.: 08/934,994

[22] Filed: Sep. 22, 1997

[51] Int. Cl.[7] .......................... H02M 3/335; H02M 1/12; H02M 3/24; H02M 7/538

[52] U.S. Cl. .............................. 363/26; 363/41; 363/133; 363/97

[58] Field of Search ................................ 363/26, 37, 127, 363/97, 17, 64, 71, 24, 25, 40, 41, 131, 133

[56] References Cited

U.S. PATENT DOCUMENTS

| | | | |
|---|---|---|---|
| 3,717,805 | 2/1973 | Gnaedinger et al. | 321/8 R |
| 3,938,024 | 2/1976 | Clarke | 321/2 |
| 4,706,177 | 11/1987 | Josephson | 363/24 |
| 4,742,441 | 5/1988 | Akerson | 363/97 |
| 5,012,400 | 4/1991 | Yasuda | 363/95 |
| 5,077,652 | 12/1991 | Faley | 363/97 |
| 5,155,672 | 10/1992 | Brown | 363/43 |
| 5,175,439 | 12/1992 | Harer et al. | 363/37 |
| 5,255,174 | 10/1993 | Murugan | 363/17 |
| 5,293,145 | 3/1994 | Rynkiewicz | 336/65 |
| 5,373,433 | 12/1994 | Thomas | 363/43 |
| 5,434,771 | 7/1995 | Danby et al. | 363/71 |
| 5,563,780 | 10/1996 | Goad | 363/71 |
| 5,600,550 | 2/1997 | Cook, II | 363/58 |
| 5,642,273 | 6/1997 | Lai et al. | 363/56 |
| 5,729,444 | 3/1998 | Perol | 363/25 |
| 5,786,670 | 7/1998 | Nguyen | 315/200 R |
| 5,815,384 | 9/1998 | Hammond et al. | 363/26 |

OTHER PUBLICATIONS

Product Brochure—Statpower Technologies Corporation. PROwatt line of power inverters. Copyright ©1996. Printed in Canada.

Product Brochure—Statpower Technologies Corporation. PORTAWATTZ line of power inverters. Copyright ©1996. Printed in Canada.

Product Brochure—Statpower Technologies Corporation. PROsine line of power inverters. Copyright ©1995. Printed in Canada.

Product Brochure—Statpower Technologies Corporation. PROsine Inverter Chargers Copyright ©1997. Printed in Canada.

IEE Catalogue No. 85CH2207–9—Conference Record "Industry Applications Society—IEEE–IAS–1985 Annual Meeting"; Library of Congress No. 80–640527; pp. 1156–1162 relating to Bilateral DC to AC Converter Employing a High Frequency Link; 1985.

(List continued on next page.)

*Primary Examiner*—Peter S. Wong
*Assistant Examiner*—Bao Q. Vu
*Attorney, Agent, or Firm*—Fulbright & Jaworski L.L.P.

[57] ABSTRACT

A DC link power converter apparatus including a first DC to DC converter, a DC to AC converter and a load balancing storage element. The first DC to DC converter has first and second DC ports and the DC to AC converter has a third DC port and has an AC port. The first DC port is connectable to a DC source and the second DC port is connected to the third DC port. The AC port is connectable to an AC load. The load balancing energy storage element is connected to the second DC port for decoupling the DC to DC converter from the DC to AC converter by supplying energy to the third DC port when a voltage at the second DC port is tending to decrease and for storing energy received from the second DC port when a voltage at the third port is tending to increase.

111 Claims, 24 Drawing Sheets

OTHER PUBLICATIONS

Periodical: National Aerospace and Electronics, 1993 Conference (NAECON). Article title: "Topologies of Bidirectional PWM DC–DC Power Converters" (pp. 435–441) by Marian K. Kazimierczuk Senior Member, IEEE and Dung Q. Vuong—Wright State University Dept. of Electrical Engineering, Ohio, USA and Bick T. Nguyen and Joseph A. Weimer—USAF Wright Laboratory Wright–Patterson Air Force Base, Ohio, USA; 1993.

Book Title: "Improved Single–Phase Utility Interface"—Chapter 17—Power Electronic Systems (pp. 421–425).

A paper reprint from IEEE Applied Power Electronics Conference, Mar. 5–9, 1995, Dallas, Texas—entitled "A Novel Resonant Snubber Based Soft–Switching Inverter" (pp. 797–803) by J.S. Lai W. Young, Sr., G.W. Ott, Jr., C.P. White, and J.W. McKeever—Oak Ridge National Laboratory, Tennessee, USA and Daoshen Chen—University of Tennessee, Oak Ridge National Laboratory, Tennessee, USA; 1995.

Proceedings of the IEEE Power Electronics Specialists Conference Jun. 1997 at St. Louis, MO, entitled "A Bi–Directional DC–DC Converter Topology for Low Power Applications" by Manu Jain, Praveen K. Jain and Matteo Daniele—Department of Electrical and Computer Engineering Concordia University, Montreal, P.Q., Canada; 1997.

Proceedings of the IEEE Power Electronics Specialists Conference Jun. 1997 at St. Louis, MO, entitled "A Novel Control Principle of Bi–Directional DC–DC Power Conversion" by T. Reimann, S. Szeponik and G. Berger—Technical University of Ilmenau, Dept. of Power Electronics, Germany and J. Petzoldt—University of Rostock, Dept. of Power Electronics; Germany; 1997.

IEEE Article "Inverter Topologies and Control Techniques for Sinusoidal Output Power Supplies" by D.M. Divan—Department of Electrical & Computer Engineering, University of Wisconsin, Madison, Wisconsin, USA; 1991.

DC/AC POWER CONVERTER

BACKGROUND OF THE INVENTION

This invention relates to DC/AC power converters, and more particularly to bi-directional DC/AC power converters.

Prior art bi-directional DC/AC power converters can be divided into three categories including: line frequency transformer, non-sinusoidal converters; line frequency transformer, sinusoidal converters; and high frequency transformer, sinusoidal converters.

Line frequency transformer non-sinusoidal converters typically employ an H-bridge of switching elements connected to a primary winding of a transformer designed to operate at AC line frequencies and phase control switching elements connected to a secondary winding of the transformer. Switching of the switching elements forming the H-bridge is controlled to produce a quasi-squarewave at the primary winding of the transformer, and this quasi square wave is stepped up by the turns ratio of the transformer. The secondary winding of the transformer produces an output waveform which is commonly called a quasi sinewave or a modified sinewave. Regulation of the root mean square value of the output voltage of the converter is achieved by varying the duty cycle of the waveform. The phase controlled switch is employed to regulate charging current, in the charging mode. By advancing or retarding the phase angle relative to the zero crossing of the AC voltage, the current can be increased or decreased. Power converters of this type have disadvantages in that the output voltage in inverter mode is non-sinusoidal and is only regulated for its Root Mean Square (RMS) value. Some loads are sensitive to non-sinusoidal waveforms and only operate well when the applied voltage is sinusoidal. Others are sensitive to the peak voltage of the AC waveform and require regulation of the peak voltage close to the peak voltage of the sinewave voltage. In addition, with this type of power converter a pulsating current is drawn from the battery, in the inverter mode, as there is no or little internal energy storage within the converter. In addition, power factor in the charger mode is low and current distortion is high. In addition, charging current is pulsating and, finally, the line current transformer is relatively large and heavy, limiting the applications of the converter.

With power converters of the line frequency transformer, sinusoidal type, it is common to find a multi-transformer configuration having secondary windings wired in series and primary windings connected to an H-bridge of switches. By controlling the switching sequence of the switches, a stepped sinusoidal voltage is produced on the secondary windings. Switching H-bridges may also be controlled to convert an AC voltage applied to the transformer secondary winding to produce a DC voltage for battery charging. U.S. Pat. No. 5,373,433 to Thomas discloses this approach.

Line frequency transformer, sinusoidal inverter/chargers also include a line frequency transformer with a multi-tapped secondary winding. The transformer also has a primary winding which is driven with a quasi-squarewave as described above. Bi-directional switches selectively connect the taps of the secondary winding to the output to produce a roughly stepped approximation of a sinusoidal output voltage. This approach is disclosed in U.S. Pat. No. 5,155,672 to Brown.

Uninterruptible power supply circuits also normally fall into the line frequency transformer sinusoidal inverter charger category as they involve an H-bridge controlled by sinusoidal pulse width modulation to produce a sinusoidal line frequency voltage at primary terminals of a line frequency transformer. The line frequency transformer provides a step up or step down in voltage and galvanic isolation between the DC port and AC port. This circuit, however, lacks internal energy storage and therefore, produces pulsating currents at the DC port in both the inverter and charger modes. In addition, such devices are large and heavy because they require one or more low frequency transformers.

Power converters of the high frequency transformer, sinusoidal type include bi-directional DC to high frequency AC converter stages which are connected to a low voltage winding of a high frequency transformer. A power converter of this type is described in U.S. Pat. No. 4,742,441 to Akerson. The high frequency transformer provides voltage step up and step down and galvanic isolation. A high voltage winding of the transformer is typically connected to a high frequency AC to low frequency AC cycloinverter, the output of which is used to source power to an AC load or receive power therefrom. Use of the cycloinverter requires the use of bi-directional switches which, with present technology, must be constructed as composite assemblies of uni-directional switches. In addition, the switches in the DC to high frequency conversion stage and the high frequency AC to low frequency AC conversion stage must be precisely synchronized when switching to avoid destroying the switching elements. This requires complex control circuits.

BRIEF SUMMARY OF THE INVENTION

In accordance with one aspect of the invention, there is provided a DC link power converter apparatus including a first DC to DC converter, a DC to AC converter and a load balancing storage element. The first DC to DC converter has first and second DC ports and the DC to AC converter has a third DC port and has an AC port. The first DC port is connectable to a DC source and the second DC port is connected to the third DC port. The AC port is connectable to an AC load. The load balancing energy storage element is connected to the second DC port for decoupling the DC to DC converter from the DC to AC converter by supplying energy to the third DC port when a voltage at the second DC port is tending to decrease and for storing energy received from the second DC port when a voltage at the third port is tending to increase.

Preferably, the first DC to DC converter and the DC to AC converter are bidirectional.

Preferably, the apparatus includes a DC bus connecting the second and third DC ports together for transferring energy between the DC to DC converter and the DC to AC converter, a load balancing energy storage element decoupling the DC to DC converter from the DC to AC converter by supplying energy to the DC bus when a voltage at the DC bus is tending to decrease and for storing energy received from the DC bus when a voltage at the DC bus is tending to increase.

Preferably, the DC to DC converter includes a first power control circuit and the DC to AC converter includes a second power control circuit, the first and second power control circuits operating independently of each other.

Preferably, the DC to DC converter includes a centre-tapped transformer, an input inductor, and first and second switching elements. The centre-tapped transformer has a centre-tapped primary winding having a number of turns, first and second primary winding terminals and a centre-tap terminal and a secondary winding having first and second secondary winding terminals. The input inductor is connected between the centre-tap terminal and at least one of the first and second DC connection terminals and the first and second switching elements are connected between the first and second primary winding terminals respectively and one of the first and second DC connection terminals.

Preferably, the DC to DC converter includes a first inverter mode control circuit for controlling power flow from the first DC port to the DC bus, and a first charge mode control circuit for controlling power flow from the DC bus to the first DC port.

Preferably, the DC to DC converter includes a first inverter mode control circuit for controlling power flow in the DC to DC converter.

Preferably, the first inverter mode control circuit is operable to control the DC to DC converter as a push-pull, current-fed transformer-isolated boost converter.

Preferably, the first inverter mode control circuit includes a current control loop circuit for generating a current feedback signal responsive to current at the first DC port, a voltage control loop circuit for generating a current command signal in response to DC bus voltage and a first switching control circuit for producing switching control signals in response to the current feedback signal and the current command signal for controlling switching of the first and second switching elements.

Preferably, the voltage control loop circuit includes a DC bus voltage feedback signal generator for generating a DC bus voltage feedback signal indicative of the DC bus voltage and a non-linear voltage loop compensation network responsive to the DC bus feedback signal for producing the current command signal, the non-linear voltage loop compensation network having a relatively slow response in changing the current command signal when the DC bus voltage feedback signal is within a first range and the non-linear voltage loop compensation network having a relatively fast response in changing the current command signal when the DC bus voltage feedback signal is within a second range.

Preferably, the voltage control loop circuit includes a DC bus voltage reference source for producing a DC bus voltage reference signal and a first subtracter for subtracting the DC bus voltage reference signal from the DC bus voltage feedback signal to produce a first voltage error signal, the voltage error signal being communicated to the non-linear voltage loop compensation network, and preferably, the non-linear voltage loop compensation network produces the current command signal in response to the voltage error signal.

Preferably, the non-linear voltage loop compensation circuit includes a first low pass filter and at least one diode in parallel with the first low pass filter, the diode being operable to forward conduct when the voltage error signal changes at a rate at which an instantaneous voltage drop across the low pass filter exceeds a pre-defined value.

Preferably, the first switching control circuit includes a second subtracter for subtracting the current feedback signal from the current command signal to produce a first current error signal, a second low pass filter for filtering the first current error signal to produce a duty cycle command signal and a first pulse width modulator for producing first and second switching signals for placing the first and second switching elements respectively in conducting and non-conducting modes for periods of time dependent on the duty cycle command signal.

Preferably, the first pulse width modulator includes first and second waveform generators for generating first and second waveforms degrees out of phase with each other, the first and second waveforms including at least an on state and an off state and having a first duty cycle, the first and second waveforms being supplied to the first and second switching elements respectively to place the switching elements in conducting and non-conducting modes according to the on and off states respectively, of the first and second waveforms respectively.

Preferably, the first inverter mode control circuit has a first circuit portion connected to the primary winding and a second circuit portion connected to the DC bus, and a first isolator for isolating the first circuit portion from the second circuit portion while providing for communication between the first and second circuit portions.

Preferably, the apparatus includes at least a first clamping circuit for controlling the voltage across at least one of the first and second switching elements.

Preferably, the clamping circuit includes a second DC to DC converter connected between at least one of the switching elements and at least one of the DC connection terminals.

Preferably, the DC to DC converter includes a first charge mode control circuit for controlling power flow from the DC bus to the first DC port.

Preferably, the first charge mode control circuit is operable to control the DC to DC converter as a full-bridge voltage fed transformer-isolated buck step-down converter with centre tapped output rectifiers.

Preferably, the apparatus includes third, fourth, fifth and sixth switching elements connected to the secondary winding in a full bridge topology.

Preferably, the DC to DC converter includes a second switching control circuit in communication with the third, fourth, fifth and sixth switching elements for controlling conduction of the switching elements to produce a high frequency voltage waveform across the secondary winding.

Preferably, the second switching control circuit includes a switching signal generator for generating third, fourth, fifth and sixth control signals responsive to voltage at the first DC port and current at the second DC port, the third, fourth, fifth and sixth switching signals being operable to place the third, fourth, fifth and sixth switching elements in conducting and non-conducting states.

Preferably, the switching signal generator includes a bridge current command signal generator for producing a bridge current command signal in response to voltage and current at the first DC port, a bridge current feedback signal generator for producing a bridge current feedback signal in response to current drawn at the second DC port, a third subtracter for subtracting the bridge current feedback signal from the bridge current command signal to produce a duty cycle command signal and a second pulse width modulator responsive to the duty cycle command signal for producing the third, fourth, fifth and sixth switching signals operable to control switching of the third, fourth, fifth and sixth switching elements.

Preferably, the bridge current feedback signal generator includes first and second current sense signal generators for generating current sense signals representing current flow in the fourth and sixth switching elements respectively, a summer for summing the first and second current sense signals to produce a raw bridge current feedback signal and a third low pass filter for filtering the raw bridge current feedback signal to produce the bridge current feedback signal.

Preferably, the bridge current command signal generator includes a current error signal generator for generating a second current error signal in response to current flow at the first DC port, a voltage error signal generator for generating a second voltage error signal in response to voltage at the first DC port, a signal selector having first and second inputs for receiving the second current error signal and the second voltage error signal and an output for producing a lesser output signal responsive to the lesser of the second current error signal and the second voltage error signal, a second isolator having an input electrically connected to the first DC port, for receiving the lesser output signal and an output electrically connected to the DC bus for providing the bridge current command signal to the third subtracter, the input and output being electrically isolated from each other.

Preferably, the current error signal generator includes, a charging current signal generator for generating a charging current signal indicative of current at the first DC port, a fourth low pass filter for filtering the charging current signal to produce a filtered charging current signal, a charge current command signal generator for generating charging current command signal indicative of a desired charging current, and a fourth subtracter for subtracting the filtered charging current signal from the charge current command signal to produce the second current error signal.

Preferably, the voltage error signal generator includes a charging voltage signal generator for generating a charging voltage signal indicative of voltage at the first DC port, a charging voltage reference signal generator for generating a charging voltage reference signal indicative of a desired charging voltage, a fifth subtracter for subtracting the charging voltage signal from the charging voltage reference signal to produce a raw voltage error signal, and a second non-linear voltage loop compensation network for filtering the raw voltage error signal to produce the second voltage error signal.

Preferably, the second non-linear voltage loop compensation network includes a fifth low pass filter.

Preferably, the second non-linear voltage loop compensation network has a relatively slow loop response when the raw voltage error signal is within a first range and a relatively fast loop response when the raw voltage error signal is within a second range.

Preferably, the second non-linear voltage loop compensation network is operable to provide a slow response when the raw voltage error signal is relatively small and a fast response when the raw voltage error signal is relatively large.

Preferably, the DC to AC converter includes a full bridge converter having an input connected to the DC bus and a bridge output for providing a pulse width modulated waveform, and an AC output low pass filter having an input connected to the full bridge output for receiving the pulse width modulated waveform and a filter output, the filter output acting as the AC port.

Preferably, the full bridge converter includes seventh, eighth, ninth and tenth switching elements connected to the DC bus in a full bridge topology.

Preferably, the DC to AC converter includes an AC current sense signal generator for generating an AC current sense signal responsive to current at the bridge output, a DC bus voltage sense signal generator for generating a DC bus voltage sense signal responsive to voltage at the DC bus, an AC output voltage sense signal generator for generating an output voltage sense signal responsive to voltage at the bridge output, an inverter mode current command signal generator for generating a invert mode current command signal in response to the voltage sense signal, and a third switching control circuit for producing switching signals for controlling the switching elements in response to the inverter mode current command signal.

Preferably, the DC to AC converter includes a DC bus voltage sense signal generator for generating a DC bus voltage sense signal responsive to voltage at the DC bus, a DC bus voltage reference signal generator for generating a DC bus voltage reference signal, a current waveform signal generator for generating a desired current waveform indicative of the desired current at the bridge output, a charge mode current command signal generator for generating a charge mode command signal in response to the DC bus voltage sense signal, the DC bus voltage reference signal and the current waveform signal, and a third switching control circuit for producing switching signals for controlling the switching elements in response to the charge mode command signal.

Preferably, the DC to AC converter includes a DC bus voltage sense signal generator for generating a DC bus voltage sense signal responsive to voltage at the DC bus, a DC bus voltage reference signal generator for generating a DC bus voltage reference signal, a current waveform signal generator for generating a desired current waveform indicative of the desired current at the bridge output, an AC current sense signal generator for generating an AC current sense signal responsive to current at the bridge output, an AC output voltage sense signal generator for generating an output voltage sense signal responsive to voltage at the bridge output, a charge mode current command signal generator for generating a charge mode command signal in response to the DC bus voltage sense signal, the DC bus voltage reference signal and the current waveform signal, an inverter mode current command signal generator for generating an inverter mode current command signal in response to the voltage sense signal, a third switching control circuit for producing switching signals for controlling the switching elements in response to the AC current sense signal, the DC bus voltage reference signal and at least one of the charge mode command signal and the inverter mode command signal, and a selector in communication with the charge mode command signal generator, the inverter mode current command signal generator, and the switching signal generator for selectively providing the inverter mode current command signal or the charge mode current command signal to the switching control circuit.

Preferably, the inverter mode current command signal generator includes a DC offset correction circuit for varying the invert mode current command signal in response to DC offset voltage at the bridge output.

Preferably, the DC offset correction circuit includes a sixth low pass filter for producing a filtered DC offset signal in response to the AC output voltage sense signal a sinewave reference signal generator for generating a sinewave reference signal, a sixth subtracter for subtracting the filtered DC offset signal from the sinewave reference signal to produce an output voltage command signal, and a seventh subtracter for subtracting the AC output voltage sense signal from the output voltage command signal to produce the current command signal.

Preferably, the charge mode current command signal generator includes an eighth subtracter for subtracting the DC bus voltage sense signal from the DC bus voltage reference signal to produce an average current signal, and a multiplier for multiplying the average current signal by the current waveform signal to produce the charge mode current command signal.

Preferably, the switching signal generator includes a third duty cycle command signal generator for generating a third duty cycle command signal indicative of a desired duty cycle of the switching elements, third pulse width modulator for producing a width-modulated pulse stream in response to the third duty cycle command signal, and a gate drive decoder circuit for generating switching element control signals for controlling the seventh, eighth, ninth and tenth switching elements in response to the width-modulated pulse stream.

Preferably, the gate drive decoder circuit includes a programmable array logic device.

Preferably, the switching signal generator includes a magnetization compensation circuit for compensating the third duty cycle command signal in response to the magnitude of current at the bridge output to compensate for magnetization effects in the low pass filter.

Preferably, the magnetization compensation circuit includes a variable gain amplifier in communication with the third pulse width modulator for amplifying the third duty cycle command signal to provide an amplified third duty cycle command signal to the third pulse width modulator, the variable gain amplifier having a gain dependent upon the AC current sense signal.

Preferably, the switching signal generator is operable to switch the seventh and tenth switching elements in unison, between a conducting state and a non-conducting state and is operable to switch the eighth and ninth switching elements in unison, between a conducting state and a non-conducting state such that a dead time is provided when switching the seventh and tenth switching elements from a conducting state to a non-conducting state and when switching the eighth and ninth switching elements between the conducting state and the non-conducting state, the deadtime being a period during which each of the seventh, eighth, ninth and tenth switching elements is in a non-conducting state.

Preferably, the DC to AC converter includes a snubber circuit connected between the bridge output and the DC bus.

Preferably, the snubber circuit includes eleventh and twelfth switching elements connected to the bridge output, second and third inductors connected to the eleventh and twelfth switching elements respectively and connected to each other, and a diode connected to the second and third inductors and the DC bus.

Preferably, the third switching control circuit is operable to control the eleventh and twelfth switching elements in response to the DC bus voltage sense signal and the AC current signal.

Preferably, the third switching control circuit produces eleventh and twelfth switching signals for controlling the eleventh and twelfth switching elements to place the snubber circuit in communication with the bridge output for a period of time dependent upon current at the AC port and DC bus voltage.

Preferably, the third switching control circuit is operable to vary the period of time in response to the DC bus sense signal and the AC current signal.

In accordance with another aspect of the invention, there is provided a method of transferring power between a DC port and an AC port, the method including the steps of:

a) transferring energy between said DC port and a DC bus;

b) transferring energy between said DC bus and said AC port; and c) supplying energy to said DC bus from a load balancing energy storage element when a voltage at said DC bus is tending to decrease and storing energy from said DC bus in said energy storage element when a voltage at said DC bus is tending to increase.

In accordance with another aspect of the invention, there is provided a transformer including a bobbin having a spool portion, a primary winding and a secondary winding. The primary winding includes a conductive foil member having a centre portion and first and second winding portions extending on opposite sides of the centre portion, a centre-tap terminal portion and first and second terminal portions. The centre-tap terminal portion has a proximal transversely extending portion extending generally transversely to the centre portion, a centre parallel portion extending generally parallel to the centre portion and a distal transversely extending portion extending generally transversely to the centre parallel portion. The first terminal portion has a first transversely extending portion extending generally transversely from the first winding portion, and a first parallel portion extending generally parallel to the centre portion from the first transversely extending portion. The second terminal portion has a second transversely extending portion extending generally transversely from the second winding portion, and a second parallel portion extending generally parallel to the centre portion from the second transversely extending portion. The first and second winding portions are wrapped in opposite directions about the spool portion such that the proximal transversely extending portion, the second transversely extending portion and the first transversely extending portion are overlapping in respective parallel planes. The secondary winding is wrapped about the spool coaxially with the first and second winding portions, the second winding having first and second secondary terminals.

Preferably, the first and second winding portions are wrapped in opposite directions about the spool portion such that the proximal transversely extending portion is laid on top of the second transversely extending portion and the first transversely extending portion is laid on top of the proximal transversely extending portion Preferably, the proximal transversely extending portion, the first transversely extending portion and the second transversely extending portion have the same length.

Preferably, overlapping portions of the centre tap terminal portion and the first and second terminal portions have the same surface area.

Preferably, the centre parallel portion, the first parallel portion and the second parallel portions are axially aligned.

Preferably, the centre portion, the first and second winding portions, and overlapping portions of the first and second winding portions are insulated.

Preferably, the centre portion, the first and second winding portions, and overlapping portions of the first and second winding portions are sandwiched between first and second layers of insulating material prior to wrapping the first and second winding portions on the spool.

Preferably, the secondary winding has first and second portions, the first portion being wrapped on the spool prior to wrapping the first and second winding portions of the primary winding and the second portion of the secondary winding is wrapped on the spool after the first and second winding portions of the primary winding are wrapped.

In accordance with another aspect of the invention, there is provided a power converter apparatus including first and second DC to DC converters, a DC bus, a first DC to AC converter, a second DC to AC converter, and a load balancing energy storage element. The first and second DC to DC converters are connectable to a common DC source and each have first and second DC ports connected together. The DC bus is connected to the second DC ports. The first DC to AC converter has a third DC port connected to the DC bus and a first AC port connectable to an AC source, the first DC to AC converter being bi-directional and operable in an AC to DC conversion mode. The second DC to AC converter has a fourth DC port and a second AC port, the fourth DC port being connected to the DC bus and the second AC port being connected to an AC load. The load balancing energy storage element is connected to the DC bus for decoupling the first and second DC to DC converters and the second DC to AC converter from the first DC to AC converter by supplying energy to the DC bus when a voltage at the DC bus is tending to decrease and for storing energy received from the DC bus when a voltage at the DC bus is tending to increase.

Preferably, the first and second DC to AC converters are bi-directional.

Preferably, the first and second DC to DC converters are bi-directional.

Preferably, the first and second DC to DC converters include first and second current control loop circuits respectively for controlling the flow of power through the first and second DC to DC converters respectively.

Preferably, the apparatus includes a DC to DC converter control circuit for providing current command signals to the first and second current control loop circuits respectively for apportioning contributions of energy to the load balancing energy storage element between the first and second DC to DC converters.

Preferably, the first DC to AC converter includes a third current control loop circuit for controlling the flow of power through the first DC to AC converter.

Preferably, the apparatus includes a DC to AC converter control circuit for providing a current command signal to the third current control loop circuit for controlling the flow of power through the first DC to AC converter.

Preferably, the apparatus includes a fourth current control loop circuit for controlling the flow of power through the first DC to AC converter.

Preferably, the apparatus includes a DC to AC converter control circuit for providing a current command signal to the fourth current control loop circuit for controlling the flow of power through the first DC to AC converter.

Preferably, the first and second DC to DC converters are bi-directional and preferably, the first DC to AC converter and first DC to AC converter are bi-directional.

In accordance with another aspect of the invention, there is provided a power converter apparatus including first and second DC to DC converters, a DC bus, first and second DC to AC converters, and a load balancing energy storage element. The first and second DC to DC converters are connectable to a common DC source, and each has first and second DC ports, the second DC ports being connected together. The DC bus is connected to the second DC ports. The first and second DC to AC converters have third DC ports connected to the DC bus respectively and respective first AC ports for supplying power to first and second AC loads respectively. The load balancing energy storage element connected to the DC bus for decoupling the first and second DC to DC converters from the first and second DC to AC converters by supplying energy to the DC bus when a voltage at the DC bus is tending to decrease and for storing energy received from the DC bus when a voltage at the DC bus is tending to increase.

Preferably, the first and second DC to DC converters include first and second current control loop circuits respectively for controlling the flow of power through the first and second DC to DC converters respectively.

Preferably, the apparatus includes a DC to DC converter control circuit for providing current command signals to the first and second current control loop circuits respectively for apportioning contributions of energy to the load balancing energy storage element between the first and second DC to DC converters.

Preferably, the first DC to AC converter includes a third current control loop circuit for controlling the flow of power through the first DC to AC converter.

Preferably, the apparatus includes a first DC to AC converter control circuit for providing a current command signal to the third current control loop circuit for controlling the flow of power through the first DC to AC converter.

Preferably, the second DC to AC converter includes a fourth current control loop circuit for controlling the flow of power through the second DC to AC converter.

Preferably, the apparatus includes a second DC to AC converter control circuit for providing a current command signal to the fourth current control loop circuit for controlling the flow of power through the second DC to AC converter.

Preferably, the first and second DC to AC control circuits control the first and second DC to AC converters such that the first and second DC to AC converters produce first and second AC waveforms respectively, the first and second AC waveforms being out of phase with each other.

Preferably, the apparatus includes a reference signal generator for generating first and second AC waveform reference signals, the first and second AC waveform reference signals being provided to the first and second DC to AC control circuits respectively.

Preferably, the first and second DC to DC converters are bi-directional and preferably, the first and second DC to AC converters are bi-directional.

Preferably, the first and second DC to AC converters include third and fourth current control loop circuits respectively for controlling the flow of power through the first and second DC to AC converters.

Preferably, the apparatus includes a first DC to AC converter control circuit for providing a third and fourth current command signals to the third and fourth current control loop circuits respectively for controlling the flow of power through the first and second DC to AC converters.

In accordance with another aspect of the invention, there is provided a power converter apparatus including first and second DC to DC converters, a DC bus, first and second DC to AC converters, and a load balancing energy storage element. The first and second DC to DC converters are connectable to first and second DC sources respectively. The first and second DC to DC converters each have first and second DC ports, the second DC ports being connected together. The DC bus is connected to the second DC ports. The first and second DC to AC converters have third DC ports connected to the DC bus respectively and respective first AC ports for supplying power to first and second AC loads respectively. The load balancing energy storage element connected to the DC bus for decoupling the first and second DC to DC converters from the first and second DC to AC converters by supplying energy to the DC bus when a voltage at the DC bus is tending to decrease and for storing energy received from the DC bus when a voltage at the DC bus is tending to increase.

Preferably, the first and second DC to DC converters include first and second current control loop circuits respectively for controlling the flow of power through the first and second DC to DC converters respectively.

Preferably, the apparatus includes first and second DC to DC converter control circuits for providing first and second current command signals to the first and second current control loop circuits respectively for independently controlling power flow through the first and second DC to DC converters.

Preferably, the first DC to AC converter includes a third current control loop circuit for controlling the flow of power through the first DC to AC converter.

Preferably, the apparatus includes a first DC to AC converter control circuit for providing a current command signal to the third current control loop circuit for controlling the flow of power through the first DC to AC converter.

Preferably, the second DC to AC converter includes a fourth current control loop circuit for controlling the flow of power through the second DC to AC converter.

Preferably, the apparatus includes a second DC to AC converter control circuit for providing a current command signal to the fourth current control loop circuit for controlling the flow of power through the second DC to AC converter.

Preferably, the first and second DC to AC control circuits control the first and second DC to AC converters such that the first and second DC to AC converters produce first and second AC waveforms respectively, the first and second AC waveforms being out of phase with each other.

Preferably, the apparatus includes a reference signal generator for generating first and second AC waveform reference signals, the first and second AC waveform reference signals being provided to the first and second DC to AC control circuits respectively.

Preferably, the first and second DC to DC converters are bi-directional and preferably, the first and second DC to AC converters are bi-directional.

Preferably, the first and second DC to AC converters include third and fourth current control loop circuits respectively for controlling the flow of power through the first and second DC to AC converters.

Preferably, the apparatus includes a first DC to AC converter control circuit for providing a third and fourth current command signals to the third and fourth current control loop circuits respectively for controlling the flow of power through the first and second DC to AC converters.

The DC bus energy storage element allows current to be drawn from, or delivered to the DC port, substantially ripple free. In addition, the present invention allows the use of uni-directional, relatively inexpensive switches and the operation of the DC to DC converter and the DC to AC converter is decoupled, requiring no precise synchronization. As a result, cost, complexity and power loss in the present invention are less than that of the prior art devices, despite the fact that the prior art converters have only two power conversion stages and the present invention has three power conversion stages, namely the DC to DC converter, the DC bus, and the DC to AC converter.

Various other aspects of the invention such as the DC to DC converter control loop using a non linear loop compensation network to provide fast and slow loop responses, improve the regulation of the overall device.

In addition, the employment of DC offset detection and control circuitry minimizes DC offset in the DC to AC converter which reduces the probability of saturation of motors or transformers in load equipment.

The use of the transformer construction method, according to the invention, provides for reduced inductive losses resulting in an improvement in overall efficiency of the apparatus.

BRIEF DESCRIPTION OF THE SEVERAL VIEWS OF THE DRAWING

In drawings which illustrate embodiments of the invention.

DETAILED DESCRIPTION OF THE INVENTION

FIG. 1

Figure 1:
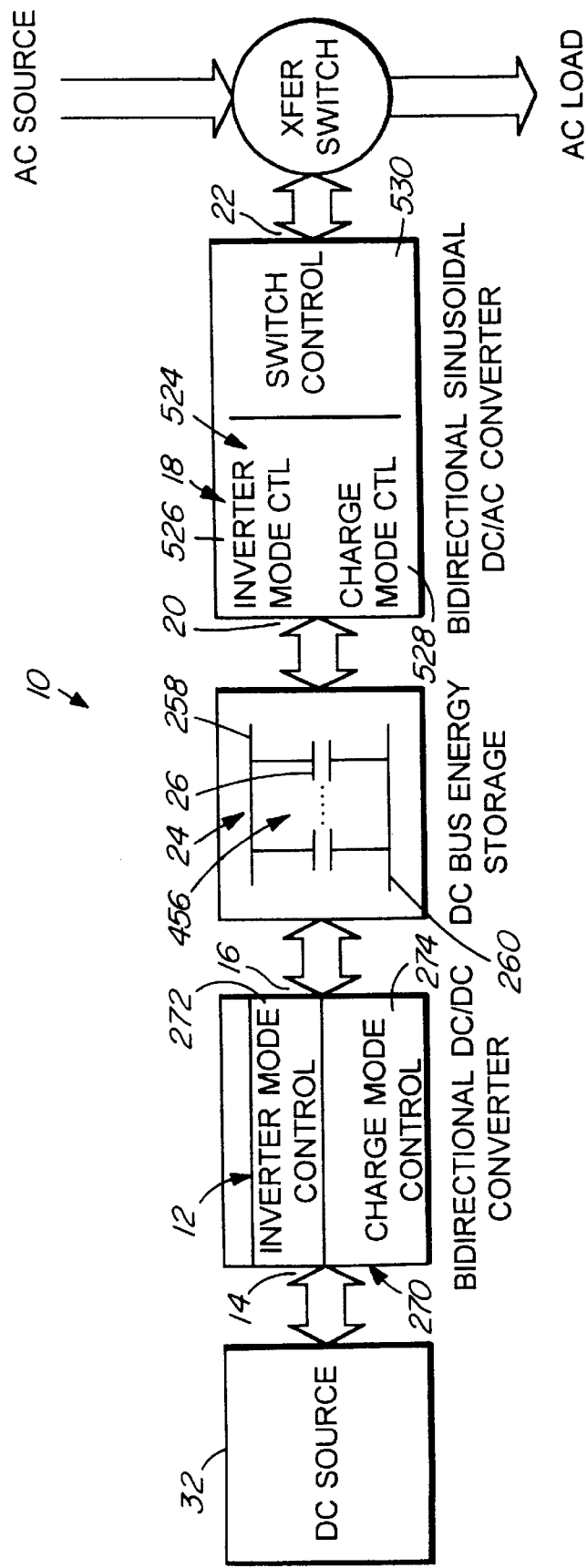
FIG. 1 is a block diagram of a bi-directional DC link power converter apparatus, according to a first embodiment of the invention.

Referring to FIG. 1, a bi-directional DC link power converter apparatus is shown generally at 10. The apparatus includes a first bi-directional DC to DC converter 12 having first and second DC ports 14 and 16, a bi-directional DC to AC converter 18 having a third DC port 20 and an AC port 22, a DC bus 24 connecting the second and third DC ports together for transferring energy between the DC to DC converter 12 and the DC to AC converter 18 and a load balancing energy storage element 26 connected to the DC bus 24 for decoupling the DC to DC converter 12 from the DC to AC converter 18 by supplying energy to the DC bus 24 when a voltage at the DC bus 24 is tending to decrease and for storing energy received from the DC bus 24 when a voltage at the DC bus 24 is tending to increase.

FIG. 2

Figure 2:
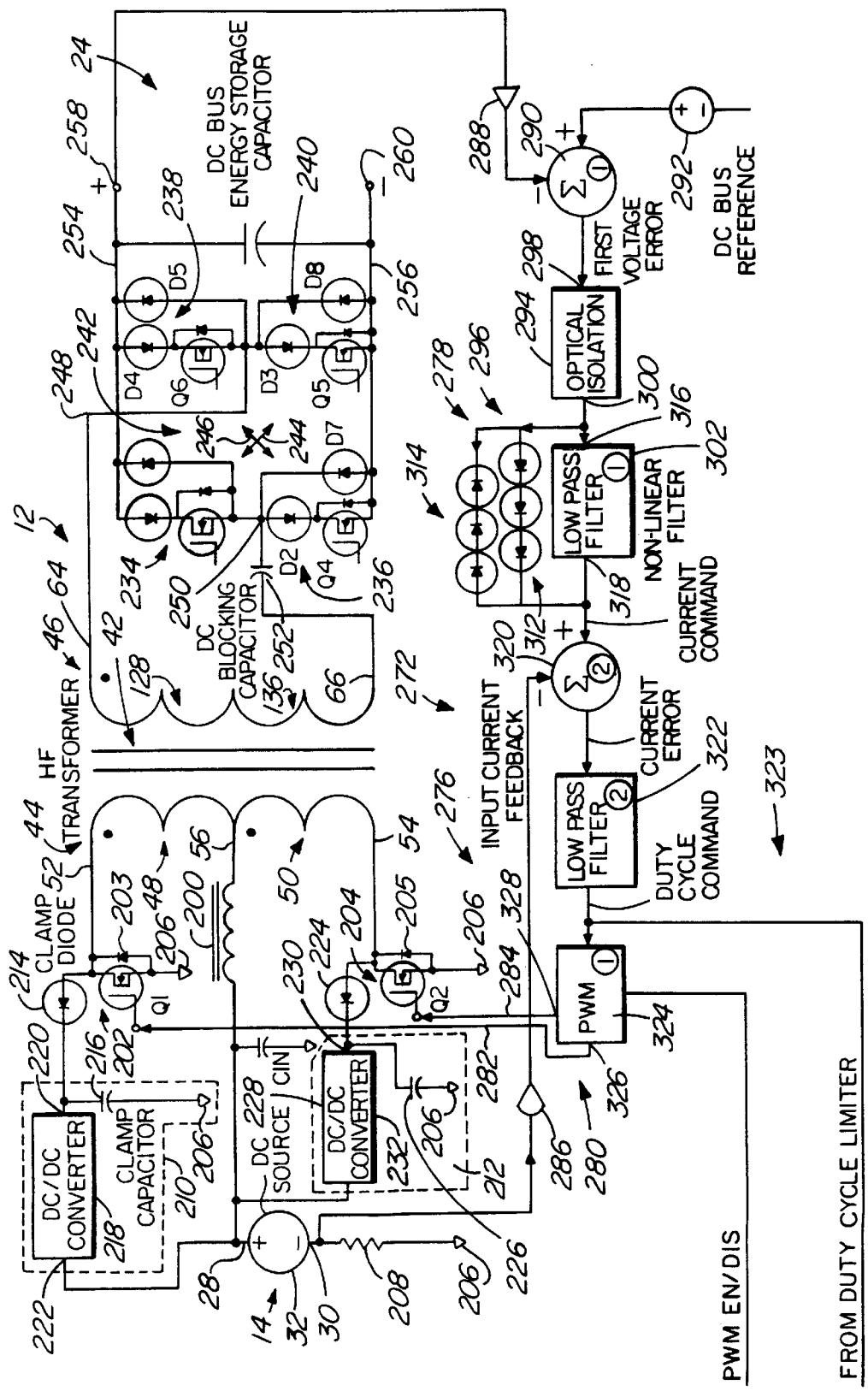
FIG. 2 is a schematic diagram of a DC to DC converter and an invert mode control circuit of the DC to DC converter, according to the first embodiment of the invention.

Referring to FIG. 2, the first DC port 14 has first and second DC port terminals 28 and 30 for connecting the DC port to a first DC source 32, which, in this embodiment includes a conventional deep cycle battery having a source voltage of approximately 12 volts. The bi-directionality of the first DC to DC converter 12 enables the first DC to DC converter 12 to operate in an inverter mode in which it receives energy from the first DC source 32 and supplies energy to the DC bus 24 and to operate in a charge mode in which it receives energy from the DC bus 24 to supply energy to the first DC source 32.

FIG. 3

Figure 3:
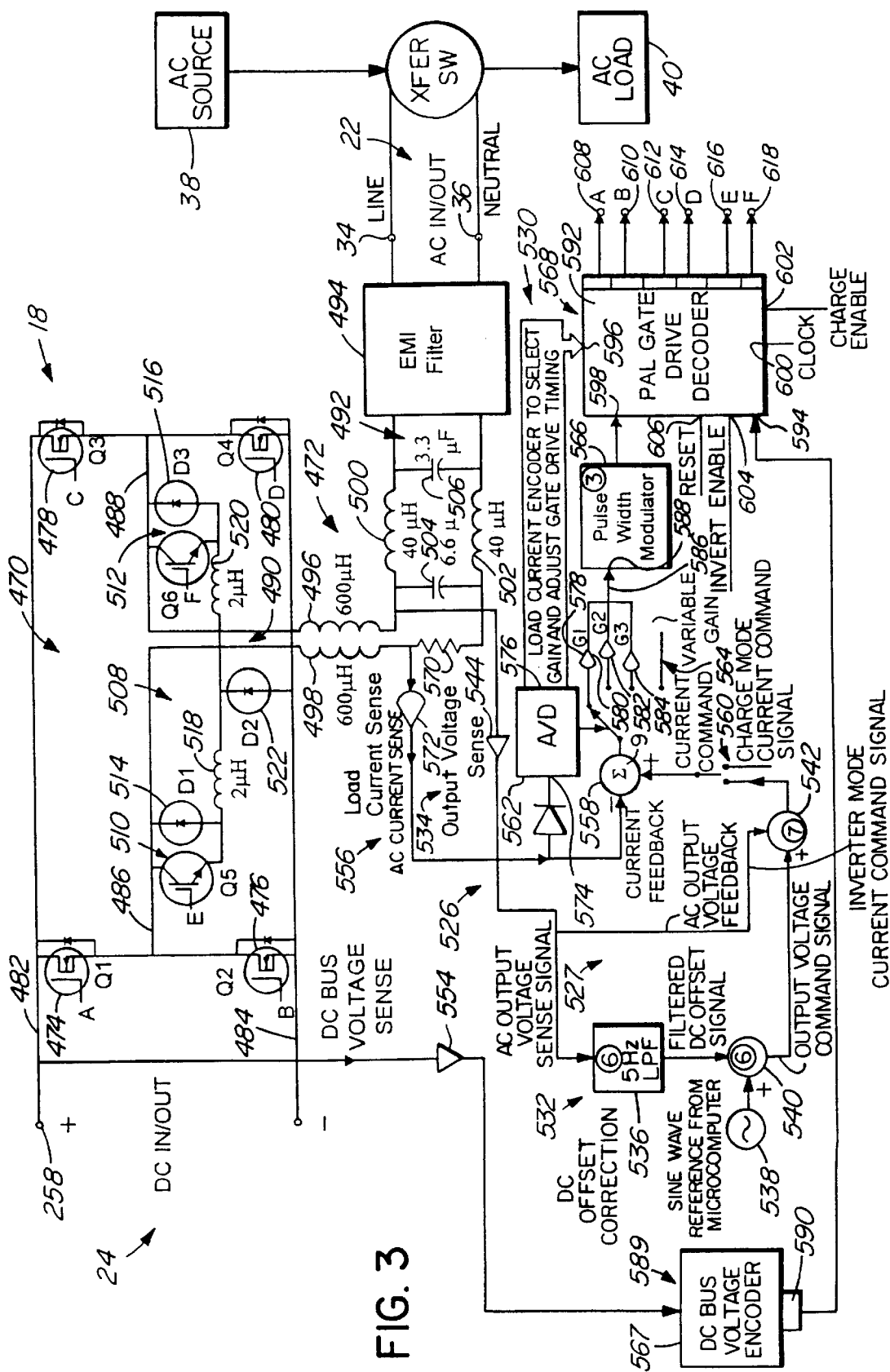
FIG. 3 is a schematic diagram of a DC to AC converter, according to the first embodiment of the invention.

Referring to FIG. 3, the AC port 22 has line and neutral terminals 34 and 36 for connecting the DC to AC converter 18 to a transfer switch for selectively connecting the AC port 22 to an AC source 38 or an AC load 40. The bi-directionality of the DC to AC converter 18 enables the DC to AC converter 18 to operate in an inverter mode in which it receives energy from the DC bus 24 to provide energy to the AC port 22 and to operate in a charge mode in which it receives energy from the AC port 22 to provide energy to the DC bus 24.

In this embodiment, the AC source 38 is the conventional AC power source available in a household, for example. The AC load 40 may include a variety of devices and generally includes any conventional 120 volt AC appliance. In this embodiment, the apparatus provides 120 volt 60 Hz alternating current power to any AC load.

First DC to DC Converter

Transformer

Referring back to FIG. 2, the first DC to DC converter 12 includes a high frequency centre-tapped transformer 42 having a centre-tapped primary winding 44 and a secondary winding 46. The primary winding has first and second winding portions 48 and 50, first and second primary winding terminals 52 and 54 and a centre tap terminal 56. The first winding portion 48 is connected between the first primary winding terminal 52 and the centre tap terminal 56 and the second winding portion 50 is connected between the second primary winding terminal 54 and the centre tap terminal 56. The first and second winding portions 48 and 50 are wound in opposite directions such that current flowing into the centre tap terminal 56 will flow in opposite directions in each of the first and second winding portions 48 and 50.

Figure 4:
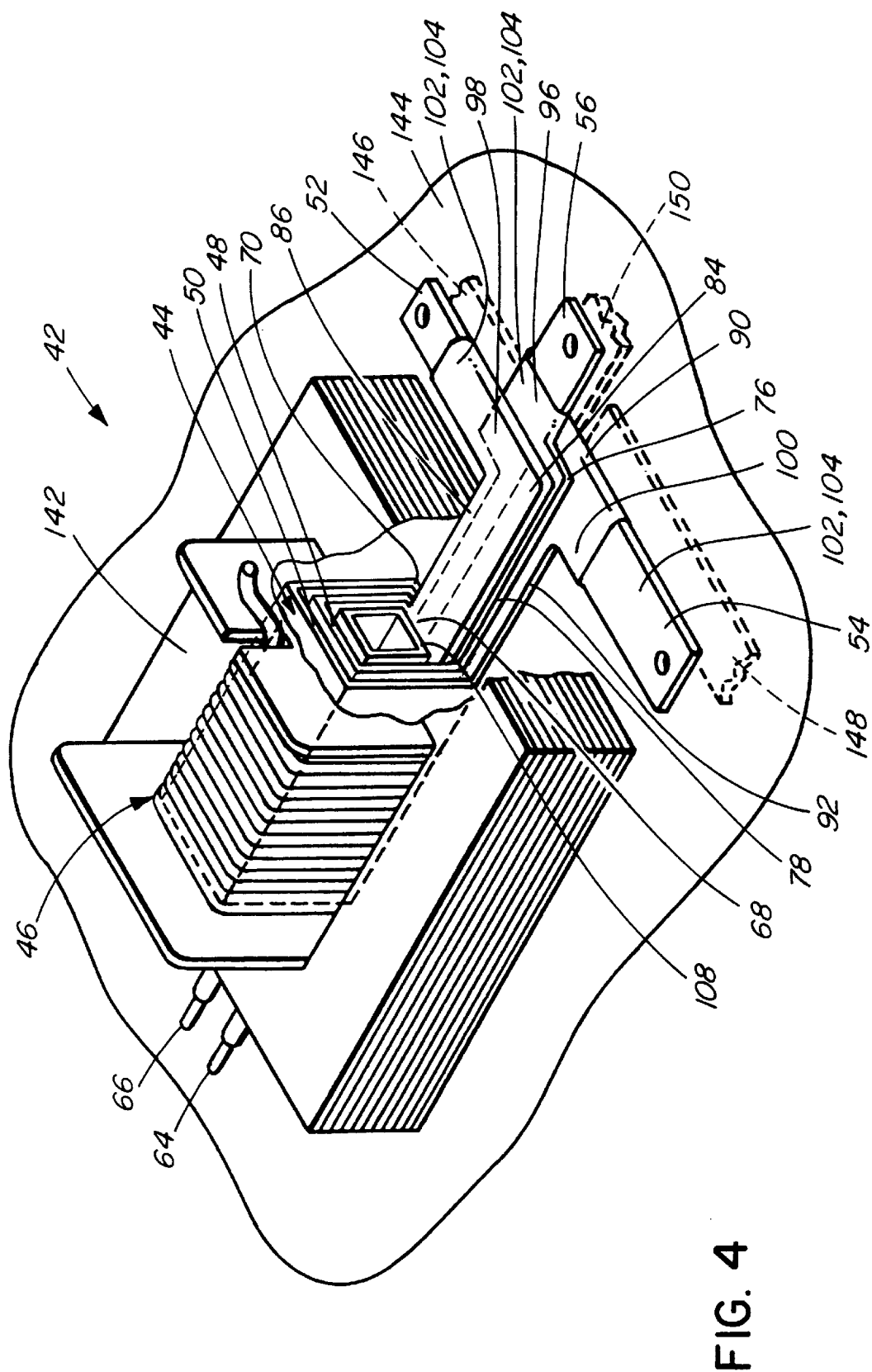
FIG. 4 is a perspective view of a transformer, according to the first embodiment of the invention.

Referring to FIG. 4, the transformer is shown generally at 42. The primary winding is shown generally at 44 and the first and second winding portions are shown generally at 48 and 50 respectively. The secondary winding is shown generally at 46.

Figure 4A:
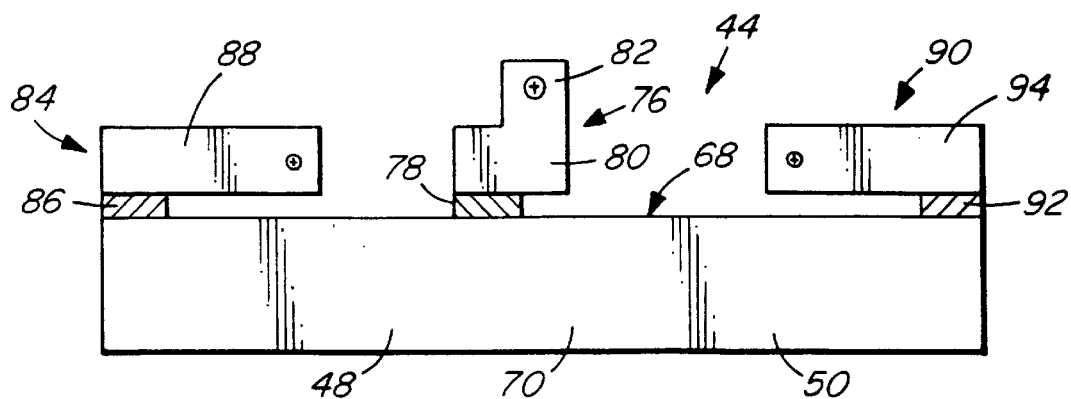
FIG. 4(a) is a plan view of a primary winding of the transformer, according to the first embodiment of the invention.

Referring to FIG. 4a, in this embodiment, the primary winding 44 is formed by first stamping or cutting a conductive copper foil to produce a foil member 68 which acts as the primary winding. The foil member 68 has a centre portion 70 and first and second winding portions 48 and 50 extending on opposite sides of the centre portion 70. The foil member 68 also has a centre-tap terminal portion 76 having a proximal transversely extending portion 78 extending generally transversely to the centre portion 70, a centre parallel portion 80 extending generally parallel to the centre portion 70 and a distal transversely extending portion 82 extending generally transversely to the centre parallel portion 80.

The foil member 68 also has a first terminal portion 84 having a first transversely extending portion 86 extending generally transversely from the first winding portion 48, and a first parallel portion 88 extending generally parallel to the first winding portion 48 from the first transversely extending portion 86.

The foil member 68 also has a second terminal portion 90 having a second transversely extending portion 92 extending generally transversely from the second winding portion 50, and a second parallel portion 94 extending generally parallel to the second winding portion 50, from the second transversely extending portion 92. The first and second parallel portions 88 and 94 thus extend parallel to the first and second winding portions 48 and 50 and extend toward each other, with the centre tap terminal portion 76 disposed therebetween. The proximal transversely extending portion 78, the first transversely extending portion 86 and the second transversely extending portion 92 have the same length. The centre parallel portion 80, the first parallel portion 88 and the second parallel portion 94 are thus axially aligned. It will be appreciated that the first, second and centre tap terminal portions 84, 90 and 76 are formed when the foil is stamped. Thus, the entire primary winding is formed in a single operation.

Figure 4B:
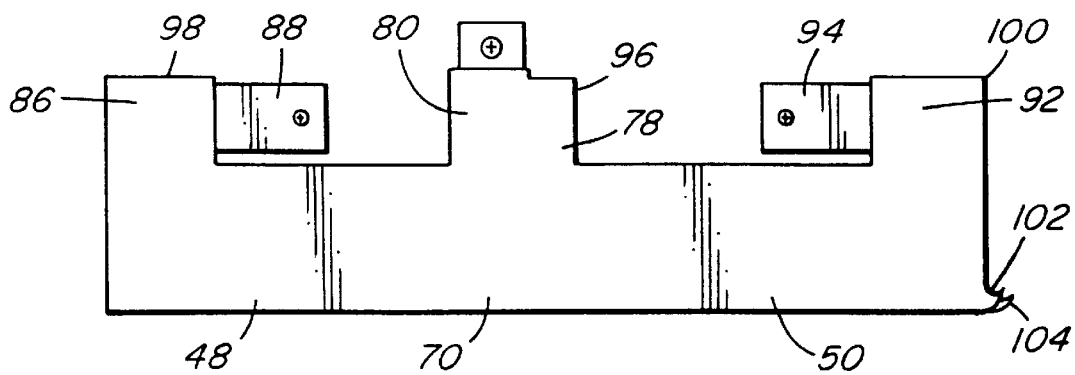
FIG. 4(b) is a plan view of the primary winding shown with insulating material secured thereto.

Referring to FIG. 4b, the centre portion 70, the first and second winding portions 48 and 50, the transversely extending portions 78, 86, and 92 and at least portions 96, 98 and 100 of the parallel portions 80, 88 and 94 are sandwiched between first and second layers 102 and 104 of insulating tape material.

Figure 4C:
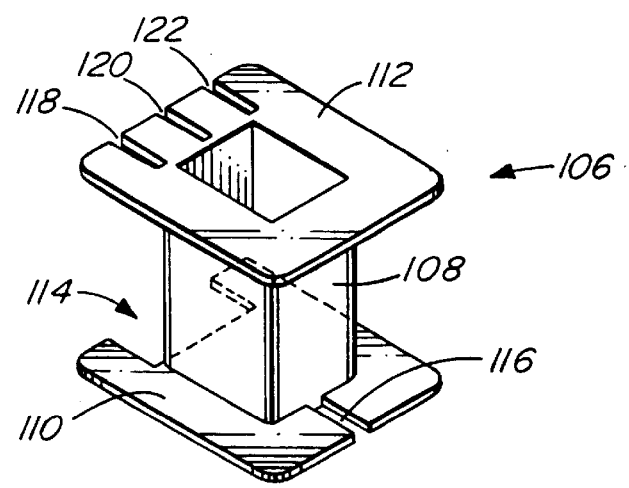
FIG. 4(c) is a perspective view of a bobbin of the transformer, according to the first embodiment of the invention.

Referring to FIG. 4c, the transformer includes a bobbin 106 having a spool portion 108 and first and second flanges 110 and 112 disposed on opposite ends of the spool portion. The first flange 110 has a relatively large notch 114 on a first side thereof and has a relatively small notch 116 on a second, opposite side thereof. The second flange 112 has first, second and third notches 118, 120 and 122 on a side opposite the relatively large notch 114 on the first flange 110.

Figure 4D:
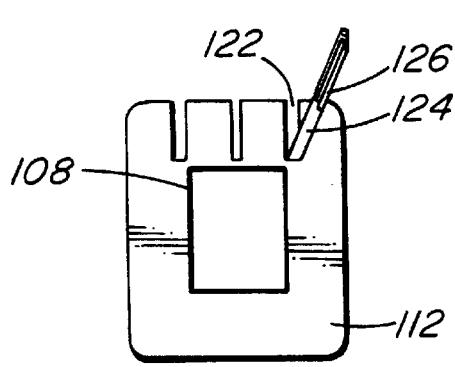
FIG. 4(d) is a plan view of the bobbin.

Referring to FIG. 4d, a first portion of the secondary winding is wound on the spool portion 108 by first installing respective sleeves only one of which is shown at 124, over first and second end portions 126 (and 130 not shown in FIG. 4d) of the winding and inserting the first end portion 126 into the third notch 122 in the second flange 112. The secondary winding is formed from 6 strands of 0.7 mm dia. magnet wire wound hex filar.

Figure 4E:
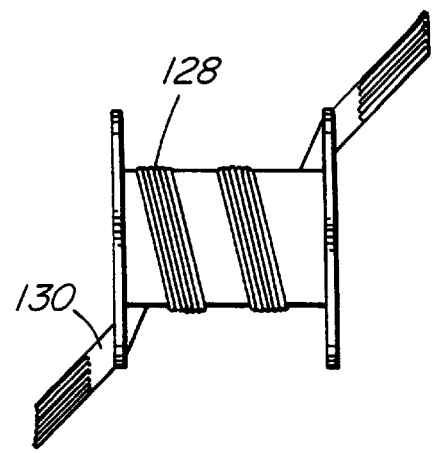
FIG. 4(e) is a side view of the bobbin shown with a first portion of a secondary winding of the transformer wound thereon.
Figure 4F:
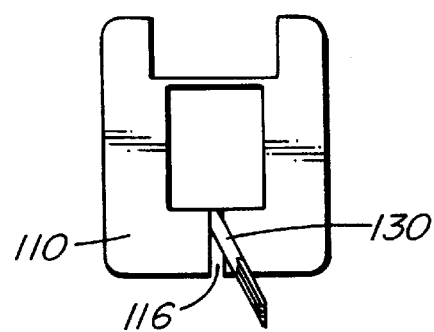
FIG. 4(f) is an end view of the bobbin.

Referring to FIG. 4e, the first portion of the secondary winding is shown at 128 and is wound as a single layer of 6.5 turns. Referring to FIG. 4f, a second end portion 130 of the first portion (128) is brought out through the relatively small notch 116 in the first flange 110. Two layers of electrically insulating tape (not shown) are then wrapped around the first portion (128) of the secondary winding.

Referring back to FIG. 4, the foil member 68 is then wrapped around the two layers of insulating tape such that the first and second winding portions 48 and 50 are wrapped in opposite directions about the spool portion 108 such that the proximal transversely extending portion 78, the first transversely extending portion 86 and the second transversely extending portion 92 are overlapping in respective parallel planes.

Figure 4G:
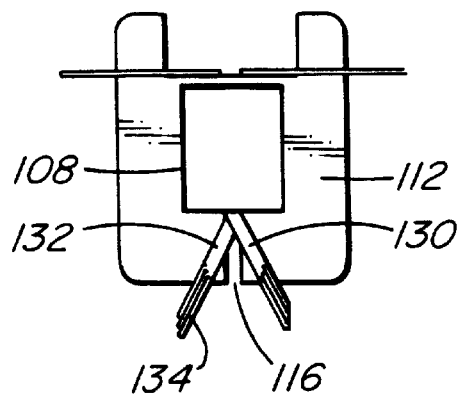
FIG. 4(g) is an end view of the bobbin shown with a second secondary winding portion installed thereon.

Referring to FIG. 4g, a second portion of the secondary winding is then wound on the spool portion 108 in the same direction as the first winding portion (128), by first installing respective sleeves only one of which is shown at 132, over first and second end portions 134 (and 138 not shown in FIG. 4g) of the second winding portion (136) and inserting the first end portion 134 into the relatively small notch 116 in the second flange 112.

Figure 4H:
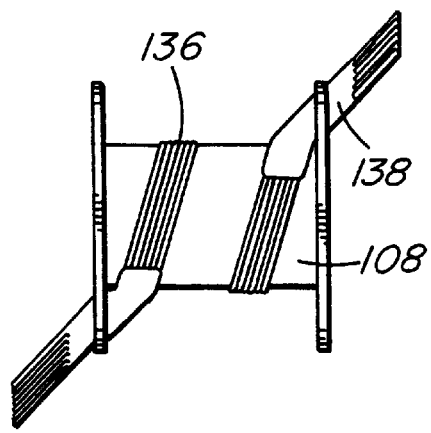
FIG. 4(h) is a side view of the bobbin with a second portion of the secondary winding wound thereon.
Figure 4I:
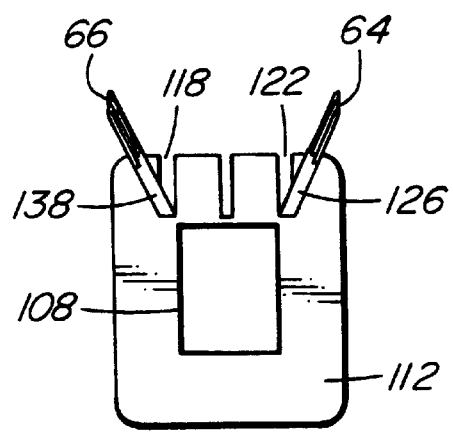
FIG. 4(i) is an end view of the bobbin after both the first and second winding portions of the secondary winding are wound on the bobbin.

Referring to FIG. 4h, the second portion 136 of the secondary winding is wound as a single layer of 5.5 turns. The second portion 136 of the secondary winding is also formed from 6 strands of 0.7 mm dia. magnet wire wound hex filar. The secondary winding is wrapped about the spool portion 108 coaxially with the first and second winding portions (48 and 50, not shown in FIG. 4h) of the primary winding. Referring to FIG. 4i is a second end portion 138 of the second winding portion 136 is brought out through the first notch 118 in the second flange 112.

Referring back to FIG. 4g, the second and first end portions 130 and 134 respectively of the first and second winding portions (128 and 136) adjacent to the relatively small notch 116 are then stripped, tinned, twisted together, soldered and covered with heat shrinkable tubing. Two layers of electrically insulating tape (not shown) are then wrapped around the second portion (136) of the secondary winding.

The end portions 126 and 138 of the first and second portions (128 and 136) of the secondary winding, which extend through the third and first notches 122 and 118 respectively in the second flange 112 act as the first and second secondary winding terminals 64 and 66 of the secondary winding. Thus, the secondary winding (46 in FIG. 2) has first and second portions (128 and 136), the first portion 128 being wrapped on the spool portion 108 prior to wrapping the first and second winding portions (48 and 50) of the primary winding (44) the second portion (136) of the secondary winding (46) being wrapped on the spool portion 108 after the first and second winding portions (48 and 50) of the primary winding (44) are wrapped.

Figure 4J:
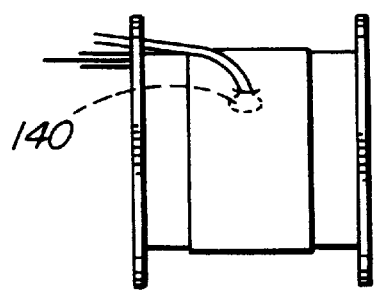
FIG. 4(j) is a side view of a thermistor mounted on the bobbin after the first and second secondary winding portions have been wound, according to the first embodiment of the invention.

Referring to FIG. 4j, a thermistor 140 is then wrapped in a further two layers of insulating tape (not shown) to the last mentioned layers of tape.

Referring back to FIG. 4, a ferrite transformer core 142 or core made of a material having low losses at high frequencies is then installed through the spool portion and the transformer is varnished, according to conventional methods.

Still referring to FIG. 4, it will be appreciated that the first and second winding portions 48 and 50 are wrapped in opposite directions about the spool portion 108 such that the proximal transversely extending portion 78 is laid on top of the second transversely extending portion 92 and the first transversely extending portion 86 is laid on top of the proximal transversely extending portion 78 and that overlapping portions of the centre tap terminal portion 76, and the first and second terminal portions 84 and 90 have the same surface area. This minimizes loop area, reducing inductive losses in the primary winding 44. This is significant as the primary winding 44 is intended to carry a relatively large current. It will be appreciated that the insulating tape layers (102 and 104) installed on the primary winding 44 prior to wrapping are dimensioned such that the centre portion 70, the first and second winding portions 48 and 50, and overlapping portions 96, 98 and 100 of the first and second winding portions 48 and 50 are insulated from coming into contact with each other.

The secondary winding 46 has a greater number of turns than the number of turns in the primary winding 44 such that the reflected voltage appearing across either primary winding portion is higher than the highest source voltage, i.e. 16 volts (maximum) when the DC bus is at its nominal voltage of about 200 volts.

In this embodiment, the transformer is rated at about 1500 VA.

In this embodiment, the transformer 42 is mounted on a circuit board 144 on which there has been pre-formed first, second and third copper pads 146, 148, and 150 positioned directly under the first, second and centre tap terminals 52, 54 and 56 respectively, again to keep loop area small to minimize inductive losses. The first, second and centre tap terminals 52, 54 and 56 of the primary winding 44 lie in respective adjacent parallel planes which are relatively close to each other due to the relatively small thickness of the foil from which they are formed. Thus, each terminal may be bent slightly to contact the first, second or third pad 146, 148 and 150 respectively on the circuit board 144, whereupon the terminals are soldered to the pads. This minimizes the thickness of the connection to the circuit board which minimizes inductive losses.

Input Inductor

Referring back to FIG. 2, the first DC to DC converter 12 further includes an input inductor 200 connected between the centre-tap terminal 56 and the first DC port terminal 28. In this embodiment, the input inductor includes a coil of 48 strands 0.8 mm copper wire wound on two toroidal ferrite cores, each having a cross sectional area of approximately 0.31 sq. in., an effective inductance of approximately 4 uH and a rating of 250 amperes maximum.

First and Second Switching Elements

The first DC to DC converter 12 further includes first and second switching elements 202 and 204. The first switching element 202 is connected between the first primary winding terminal 52 and a DC port signal ground terminal 206 and the second switching element 204 is connected between the second primary winding terminal 54 and the DC port signal ground terminal 206. The DC port signal ground terminal 206 is connected to the second DC port terminal 30 through a low value current sense resistor 208, and therefore, in effect, the first and second switching elements 202 and 204 are connected between the first and second primary winding terminals 52 and 54 respectively and the second DC port terminal 30.

In this embodiment, each of the first and second switching elements 202 and 204 includes six power MOSFET transistors connected in parallel for unidirectional current conduction. The MOSFET transistors used in this embodiment are RFP70N06 N-channel Enhancement-Mode Power Field-Effect transistors manufactured by Harris Corporation of the United States.

Clamping Circuits

The apparatus further includes first and second clamping circuits 210 and 212 connected between the first DC port terminal 28 and the first and second primary winding terminals 52 and 54 respectively, for controlling the voltage across the first and second switching elements by transferring energy from any parasitic inductance to the first DC port terminal 28 and the first DC source 32. They also act to transfer energy from the input inductor 200 to the first DC port terminal 28 and the first DC source 32.

The first clamping circuit 210 includes a first clamp diode 214, a first clamp capacitor 216 and a second DC to DC converter 218 of the buck type. The first clamp diode 214 is connected to the first primary winding terminal 52 to conduct current from the first primary winding terminal 52 to the first clamp capacitor 216 and an input 220 of the second DC to DC converter 218. The first clamp capacitor 216 is connected to the DC port signal ground terminal 206 and stabilizes the voltage at the input 220 of the second DC to DC converter 218. The second DC to DC converter 218 has an output 222 which is connected to the first DC port terminal 28 and returns energy stored in the input inductor 200 and stray inductance to the first DC source 32.

The second clamping circuit 212 is similar to the first clamping circuit 210 in that it includes a second clamp diode 224, a second clamp capacitor 226 and a third DC to DC converter 228 of the buck type. The second clamp diode 224 is connected to the second primary winding terminal 54 to conduct current from the second primary winding terminal 54 to the second clamp capacitor 226 and an input 230 of the third DC to DC converter 228. The second clamp capacitor 226 is connected to the DC port signal ground terminal 206 and stabilizes the voltage at the input 230 of the third DC to DC converter 228. The third DC to DC converter 228 has an output 232 which is connected to the first DC port terminal 28 which also returns energy stored in the input inductor 200 and stray inductance to the first DC source 32.

Third, Fourth, Fifth and Sixth Switching Elements

The first DC to DC converter 12 further includes third, fourth, fifth and sixth switching elements 234, 236, 238, and 240 connected to the secondary winding 46 in a full bridge topology 242, where the third and sixth switching elements 234 and 240 form a first pair 244 of opposite legs of the bridge 242 and the fourth and fifth switching elements 236 and 238 form a second pair 246 of opposite legs of the bridge 242. In this embodiment, each of the third, fourth, fifth and sixth switching elements 234, 236, 238 and 240 includes a single IRF644 N-channel Power MOSFET manufactured by Harris Corporation of the United States.

Figure 5:
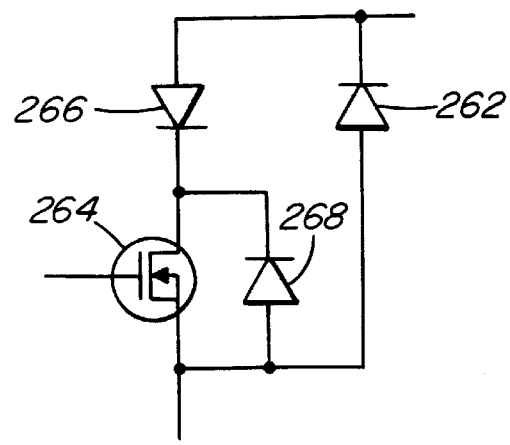
FIG. 5 is a representative switching element representing each of third, fourth, fifth and sixth switching elements, according to the first embodiment of the invention.

Referring to FIG. 5, each of the third, fourth, fifth and sixth switching elements includes a fast recovery diode 262, a power MOSFET 264, and a blocking diode 266. The power MOSFET 264 has an antiparallel diode 268 inherent therein. The antiparallel diode 268 has a slow reverse recovery characteristic. Therefore, the blocking diode 266 is connected in series with the power MOSFET 264 to block current flow from the source to drain terminal, which could occur in inverter mode operation. The fast recovery diode 262 is connected in parallel with the series combination of the blocking diode 266 and the power MOSFET 264 and serves to effectively replace the antiparallel diode 268 in the power MOSFET 264 with one which has a faster recovery time Referring back to FIG. 2, the bridge 242 effectively has an input comprised of first and second bridge input terminals 248 and 250 which are circuit nodes between the third and fourth switching elements 234 and 236 and the fifth and sixth switching elements 238 and 240. The first bridge input terminal 248 is connected to the first secondary winding terminal 64 and the second bridge input 250 is connected to the second secondary winding terminal 66 through a DC blocking capacitor 252. The bridge 242 also has first and second bridge output terminals 254 and 256 which act as a bridge output when the apparatus is in inverter mode. The first and second bridge output terminals 254 and 256 are connected to the DC bus and thus act as positive and negative terminals 258 and 260 of the DC bus.

First Power Control Circuit

Referring back to FIG. 1, the first DC to DC converter 12 further includes a first power control circuit shown generally at 270, including a first inverter mode control circuit 272 for controlling power flow from the first DC port 14 to the DC bus 24, and a first charge mode control circuit 274 for controlling power flow from the DC bus 24 to the first DC port 14.

First Inverter Mode Control Circuit

Referring to FIG. 2, the first inverter mode control circuit is shown generally at 272 and includes a current control loop circuit 276 for generating a current feedback signal responsive to current at the first DC port 14, a voltage control loop circuit 278 for generating a current command signal in response to DC bus voltage and a first switching control circuit 280 for producing first and second switching control signals 282 and 284 for controlling the first and second switching elements 202 and 204 in response to the current feedback signal and the current command signal.

The current control loop circuit 276 includes the current sense resistor 208 connected between the second DC port terminal 30 of the first DC port and the DC port signal ground terminal 206, and a first signal conditioner 286 for measuring the voltage across the current sense resistor 208 and for producing the current feedback signal such that the current feedback signal has a voltage indicative of the current drawn from the first DC source 32.

Voltage Control Loop

The voltage control loop circuit 278 includes a second signal conditioner 288, a first subtracter 290, a DC bus voltage reference source 292, a first optical isolator 294 and a first non-linear voltage loop compensation network 296.

The second signal conditioner 288 is connected to the positive terminal 258 of the DC bus 24 for producing a DC bus voltage feedback signal indicative of the voltage appearing at the DC bus 24. The second signal conditioner 288 thus acts as a DC bus voltage feedback signal generator for generating a DC bus voltage feedback signal indicative of the DC bus voltage.

The DC bus voltage reference source 292 produces a DC bus voltage reference signal. In this embodiment, this signal is produced by a first reference voltage generator circuit 297 which generates a voltage of about 5 volts.

The first subtracter 290 is connected to the second signal conditioner 288 and to the DC bus voltage reference source 292 and subtracts the DC bus voltage reference signal from the DC bus voltage feedback signal to produce a first voltage error signal. The first subtracter 290 is connected to an input 298 of the first isolator 294. The first isolator 294 also has an output 300 which is connected to the first non-linear voltage loop compensation network 296. The input 298 of the first isolator 294 is referenced to the negative terminal 260 of the DC bus 24 while the output 300 of the first isolator 294 is referenced to the DC port signal ground terminal 206. The first isolator 294 thus provides electrical isolation between components of the voltage control loop circuit 278 referenced to the negative terminal 260 and the components of the current control loop circuit 276 referenced to the DC port signal ground terminal 260. In effect therefore, the first inverter mode control circuit 272 has a first circuit portion connected to the primary winding and a second circuit portion connected to the DC bus, and a first isolator for electrically isolating the first circuit portion from the second circuit portion while providing for communication between the first and second circuit portions.

The first isolator 294 effectively transmits the first voltage error signal from the DC bus side of the apparatus to the DC port side thereof. Thus, the first voltage error signal is communicated via the isolator to the first non-linear voltage loop compensation network 296.

The first non-linear voltage loop compensation circuit 296 includes a first low pass filter 302 and first and second signal diode branches 312 and 314, each including three signal diodes connected in series, the branches being connected in parallel between an input 316 and an output 318 of the first low pass filter 302. Overall, the first non-linear voltage loop compensation network 296 produces the current command signal in response to the first voltage error signal.

The first low pass filter 302 has a cutoff frequency of about 5 Hz which significantly reduces any 120 Hz ripple component in the first voltage error signal. The first low pass filter 302 however has a relatively slow response time in producing a change in the current command signal in response to changes in the first voltage error signal. The first branch 312, however, is operable to forward conduct when the first voltage error signal changes at a rate at which an instantaneous voltage drop across the first low pass filter 302 exceeds a pre-defined value, in this embodiment about 1.8 volts the pre-defined value being set by the sum of the forward conducting voltage drops of each diode in the branch. Similarly, the second branch 314 is operable to forward conduct when the first voltage error signal changes at a rate at which an instantaneous voltage drop across the first low pass filter 302 exceeds a pre-defined value, also about 1.8 volts, the pre-defined value also being set by the sum of the forward conducting drops of each diode in the branch. The first and second branches 312 and 314 are connected in opposing orientations and therefore, the first branch 312 handles fast transitions in the first voltage error signal of a first polarity while the second branch 314 handles fast transitions of a polarity opposite to the first polarity. Thus, the first non-linear voltage loop compensation network 296 has a relatively slow response in changing the current command signal when the magnitude of the voltage across the first low pass filter is within a first range, i.e. 0–1.8 volts, and has a relatively fast response in changing the current command signal when the voltage across the first low pass filter is within a second range, i.e. above 1.8 volts.

Thus, the first low pass filter 302, and first and second diode branches 312 and 314 act as a first non-linear voltage loop compensation network 296 responsive to the DC bus feedback signal for producing the current command signal. This significantly reduces ripple which could otherwise appear at the first DC source.

First Switching Control Circuit

The first switching control circuit 280 includes a second subtracter 320 for subtracting the current feedback signal from the current command signal to produce a first current error signal, a second low pass filter 322 for filtering the first current error signal to produce a first duty cycle command signal, a duty cycle limiter shown generally at 323 and a first pulse width modulator circuit 324 having first and second outputs 326 and 328 connected to the first and second switching elements 202 and 204 for producing first and second switching signals for controlling the first and second switching elements 202 and 204.

Duty Cycle Limiter

Figure 2A:
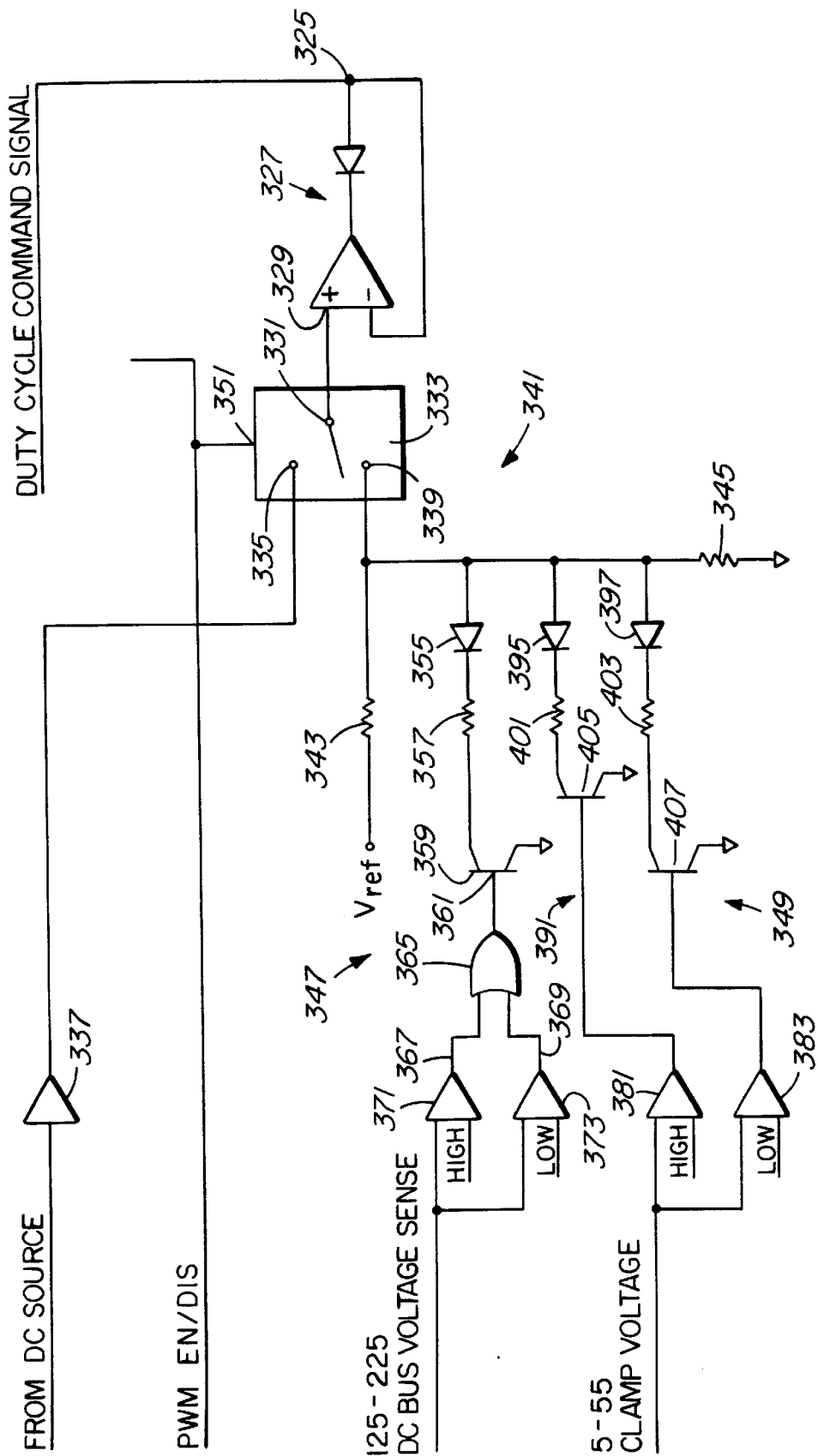
FIG. 2a is a schematic diagram of a duty cycle limiter circuit according to the first embodiment of the invention.

Referring to FIG. 2a, the duty cycle limiter includes a an open collector voltage follower 327 having an input 329 connected to a common terminal 331 of an analog switch 333 and an output 325 connected to the second low pass filter (not shown) for receiving the duty cycle command signal therefrom. The analog switch has a first input 335 for receiving a signal proportional to the voltage of the DC source (32), through a buffer 337. The analog switch further has a second input 339 for receiving a running duty cycle limit setpoint voltage from a setpoint voltage network 341.

The setpoint voltage network 341 includes first and second resistors 343 and 345 which act as a voltage divider, with the input 339 of the analog switch 333 being connected between the first and second resistors 343 and 345.

A voltage reference signal is provided by a voltage reference generator (not shown), the voltage reference signal having a voltage of approximately 6.8 volts, is provided to the first resistor 343.

Also connected between the first and second resistors 343 and 345 are a 30 percent control circuit 347, a 55 percent control circuit 391 and a 0 percent control circuit 349 respectively.

The 30 percent control circuit 347 includes a diode 355, a resistor 357 and a transistor 359 connected in series. The transistor 359 has a first base 361 to which is connected an OR gate 365 having first and second inputs 367 and 369 to which are connected first and second comparators 371 and 373. The first and second comparators are for comparing the DC bus voltage sense signal with high and low reference signals respectively. If the DC bus voltage sense signal is greater than the high level reference signal which, in this embodiment represents 225 volts, the first comparator 371 renders its output active which turns on the first transistor thereby rendering operational, the 30 percent control circuit 347. Alternatively, if the DC bus voltage sense signal is less than the low level reference signal which, in this embodiment, represents 125 volts, the second comparator 373 renders its output active which also turns on the first transistor 359, also rendering the 30 percent control circuit 347 operational.

The 55 percent control circuit includes a diode 395, a resistor 401, a transistor 405 and a comparator 381 connected in series. The comparator compares the voltage appearing at at least one of the clamp circuits (210 and 212 shown in FIG. 2) with a high clamp voltage reference voltage signal. When the clamp voltage is higher than the high clamp reference voltage, which in this embodiment represents 55 volts, comparator 381 renders its output active thereby turning on the transistor 405 and rendering operational the 55 percent control circuit 391.

Similarly, the 0 percent control circuit includes a diode 397, a resistor 403, a transistor 407 and a comparator 383 connected in series. The comparator compares the voltage appearing at at least one of the clamp circuits (210 and 212 shown in FIG. 2) with a low clamp voltage reference voltage signal. When the clamp voltage is lower than the low clamp reference voltage, which in this embodiment represents 5 volts, comparator 383 renders its output active thereby turning on the transistor 407 and rendering operational the 0 percent control circuit 349.

Thus, when the DC bus voltage sense signal is within its associated high and low reference signals, and when the clamp voltage is within its high and low reference signals, neither the 30 percent, the 55 percent nor the 0 percent control circuits 347, 391 or 349 are rendered operational in which case, only the resistors 343 and 345 act to set a duty cycle limit value, and in this embodiment, this value represents an 80 percent duty cycle.

The analog switch 333 further includes a selection input 351 to which is connected a signal line for providing a PWM enable/disable signal from the microprocessor (not shown), for controlling the connection of the common terminal 331 to the first and second inputs 335 and 339 respectively. In the enable position, the common terminal 331 is connected to the second input 339 and in the disable position, the common terminal 331 is connected to the first input 335.

The effect of the duty cycle limiter is to limit the voltage of the first duty cycle command signal appearing at the output of the low pass filter such that the signal is unable to attain a voltage greater than a value representing 80 percent, 55 percent, 30 percent or 0 percent duty cycle, depending upon the voltage at the DC bus and the voltage at the clamp circuits.

First Pulse Width Modulator

Figure 6:
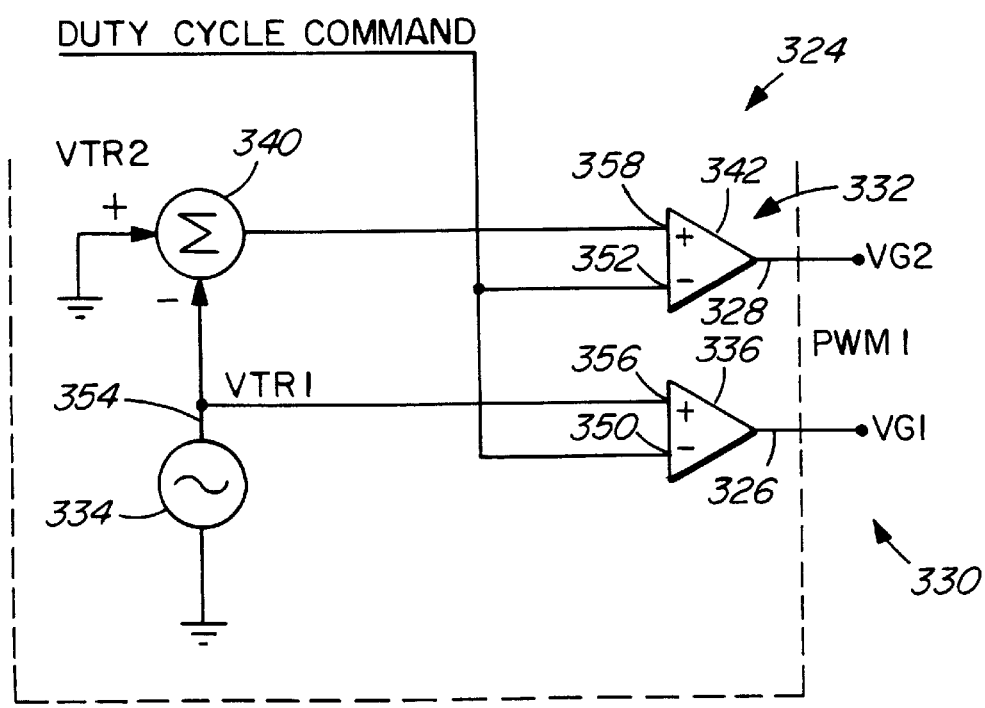
FIG. 6 is a schematic diagram of a first pulse width modulator, according to the first embodiment of the invention.

Referring to FIG. 6, the first pulse width modulator circuit 324 includes first and second waveform generators 330 and 332 for generating first and second pulse width modulated waveforms 180 degrees out of phase with each other. The first waveform generator 330 includes a triangle wave generator 334, and a first comparator 336. The second waveform generator 332 includes the triangle wave generator 334, an inverter 340, and a second comparator 342.

The triangle wave generator 334 has an output 354 which is connected to the inverter 340 and to the non-inverting input 356 of the first comparator 336. The inverter 340 has an output which is connected to the non-inverting input 358 of the second comparator 342. The first and second comparators 336 and 342 thus receive at their respective non-inverting inputs 356 and 358 first and second triangle waveforms 180 degrees out-of-phase with each other and receive at their inverting inputs 350 and 352 the first duty cycle command signal. The first and second comparators 336 and 342 have respective first and second outputs 326 and 328 which produce first and second square wave signals respectively 180 degrees out-of-phase with each other. Each square wave signal has respective cyclicly occurring on and off states with a cyclic frequency of approximately 60 kHz, and each square wave signal has a respective duty cycle. Therefore, the duty cycles of the first and second square wave signals are varied in response to the first duty cycle command signal.

Referring back to FIG. 2, the first and second square wave signals are supplied to the first and second switching elements 202 and 204 respectively to place the first and second switching elements in conducting and non-conducting modes according to the on and off states respectively, of the first and second square wave signals respectively. Thus, the first and second switching elements are placed in conducting and non-conducting modes for periods of time dependent on the first duty cycle command signal.

DC to DC Converter Inverter Mode Operation

Referring to FIG. 2, in the inverter mode, current flows from the first DC port terminal 28 through the input inductor 200 and into the centre tap terminal 56 of the primary winding 44 of the transformer 42. Current flow through the first and second portions 48 and 50 of the primary winding 44 is controlled by the first and second switching elements 202 and 204. The first and second switching elements 202 and 204 are switched at a high frequency, by the first and second square wave signals from the pulse width modulator circuit 324. The third, fourth, fifth, and sixth switching elements 234, 236, 238 and 240 are inactive in the inverter mode. The diodes in series with the third, fourth, fifth, and sixth switching elements respectively, prevent conduction of current through the MOSFETs, rather, current is conducted through the associated parallel diodes (262 in FIG. 5).

The first and second switching elements 202 and 204 are operated in two modes, including an overlapping mode and a non-overlapping mode. In the overlapping mode, either the first switching element 202 or the second switching element 204 is in conduction or both the first and second switching elements 202 and 204 are in conduction. When only the first switching element 202 is in conduction, current flows through the first portion 48 of the primary winding 44, through the first switching element 202 and to the second DC port terminal 30. At the bridge 242, current flows out of the second primary winding terminal 66, through the DC blocking capacitor 252 and through the third switching element 234 to the positive terminal 258 of the DC bus 24. Current returns from the negative terminal 260 of the DC bus 24 through the sixth switching element 240 to the first secondary winding terminal 64.

When only the second switching element 204 is in conduction, current flows through the second portion 50 of the primary winding 44, through the second switching element 204 and to the second DC port terminal 30. Current flows out of the first secondary winding terminal 64, through the fifth switching element 238 to the positive terminal 258 of the DC bus 24. Current returns from the negative terminal 260 of the DC bus 24 through the fourth switching element 236 and the DC blocking capacitor 252 to the second secondary winding terminal 66.

When only the first or second switching element 202 and 204 is in conduction, energy is transferred from the input inductor 200 and from the first DC port 14 to the DC bus 24. When both the first and second switching elements 202 and 204 are in conduction, current flows in both the first and second portions of the primary winding 48 and 50, through the first and second switching elements 202 and 204 to the second DC port terminal 30. Because the first and second primary winding portions 48 and 50 are wound in opposing directions, the current flows in opposing directions and no net magnetic flux is produced in the transformer 42. As a result, no voltage appears across the secondary winding 46 of the transformer 42 and no energy is transferred to the DC bus 24. In this mode, the input inductor 200 is effectively connected across the first and second DC port terminals 28 and 30 and current flowing through the input inductor 200 increases, resulting in increased energy stored in the input inductor 200. Thus, by adjusting the ratio between the time that the first and second switching elements 202 and 204 are both in conduction mode, and the time during which only the first or second switching element 202 and 204 is in conduction, power balance and DC bus voltage regulation can be achieved.

In the non-overlapping mode, either the first switching element 202 is in conduction, the second switching element 204 is in conduction, or both the first and second switching elements 202 and 204 are non-conducting. The current flow when the first or second switching element 202 or 204 is on is essentially the same as described above with respect to the overlapping mode. However, in the non-overlapping mode, when either the first or second switching element 202 or 204 is on, the voltage at the centre tap terminal 56 of the primary winding 44 is lower than the voltage of the first DC source 32. Thus, current in the input inductor 200 increases and energy stored in the input inductor increases while the first or second switching element 202 or 204 is on even though energy is also transferred to the DC bus 24. When both the first switching element 202 and the second switching element 204 are off, inductor current flows in both the first and second portions 48 and 50 of the primary winding, through the first and second clamp diodes 214 and 224 and into the first and second clamp capacitors 216 and 226 respectively. As the first and second winding portions 48 and 50 of the primary winding 44 are wound in opposing directions, the current flows in opposing directions and no net magnetic flux is produced in the transformer 42. Therefore, no voltage appears across the secondary winding 46 and therefore no energy is transferred to the DC bus 24. However, the voltage across the first and second clamp capacitors 216 and 226 is more than twice the source voltage, and therefore, energy is transferred from the first and second clamp capacitors 216 and 226 back to the first DC source 32 by the second and third DC to DC converters 218 and 228. As a result, current in the input inductor 200 decreases and energy is transferred from the input inductor 200 back to the first DC source 32. This eliminates the need for a clamp winding normally used on such inductors.

The first and second clamping circuits 210 and 212 also act to absorb energy stored in the leakage inductance of the transformer 42 in both operating modes, eliminating potentially damaging voltage transients across the first and second switching elements 202 and 204 when they are switched from conducting mode to non-conducting mode.

As mentioned above, the transformer turns ratio is selected so that when the DC bus 24 is at its nominal voltage, the reflected voltage at the centre tap terminal 56 is higher than the highest DC source voltage anticipated. This ensures that the DC to DC converter 12 usually operates in overlap mode. Non-overlap mode operation occurs when the DC bus 24 is lightly loaded or is being charged to its nominal operating voltage.

Control Circuit

As discussed above, the first and second switching elements 202 and 204 are normally operated in the overlapping mode and by adjusting the ratio between the time that the first and second switching elements 202 and 204 are both in conduction and the time that only the first or second switching element 202 or 204 is in conduction, power balance and DC bus voltage regulation can be achieved. These ratios are controlled by the pulse width modulator circuit 324 in response to the first duty cycle command signal. The first duty cycle command signal is a filtered version of the first current error signal which is produced from the input current feedback signal and the current command signal. The current command signal is effectively set by the DC bus voltage as indicated by the DC bus voltage feedback signal. As the DC bus voltage decreases due to loading, the voltage error signal increases. A gradual increase in DC bus loading will result in a gradual increase in the voltage error signal. The voltage error signal is effectively filtered by the first low pass filter 302 to produce the current command signal and the current command signal is effectively diminished by the input current feedback signal to produce the first current error signal. This decreases the duty cycles of the first and second square waveforms which reduces the period of time during which both the first and second switching elements 202 and 204 are in conduction, and increases the period of time during which one of the switching elements is on and the other is off.

In the event that a load is placed abruptly on the DC bus 24, the DC bus voltage decreases rapidly and therefore the voltage error signal rises rapidly. The low pass filter output 318 does not rise as rapidly as the voltage error signal, and therefore, a voltage drop appears across the first low pass filter 302. If this drop is sufficient to place the first or second signal diodes 304 and 306 into conduction, i.e. above 1.8 volts, the rapid increase in voltage error signal also appears as a rapid increase in the current command signal due to the first non-linear voltage loop compensation network. Thus, the first current error signal changes rapidly, as does the first duty cycle command signal which causes a rapid change in the duty cycles of the first and second square wave signals. Thus, during normal operation, the duty cycles of the first and second square wave signals are adjusted rather smoothly as the load at the DC bus 24 changes slowly, however, when the load at the DC bus changes abruptly, an immediate response is seen in the duty cycles of the first and second square wave signals. Thus, the inverter mode control circuit 272 provides for tight regulation of the DC to DC converter 12 over a wide range of loads.

In the inverter mode of operation an advantage of the duty cycle limiter 323 used in this embodiment is that the duty cycle of the first and second switching elements 202 and 204 is limited to prevent a 100 percent duty cycle condition from occurring, which would cause the converter to self-destruct. Under normal operating conditions, the first duty cycle command signal is limited by the duty cycle limiter to limit the duty cycle to about 80 percent. When the converter is changed from overlapping mode to non-overlapping mode, the clamp voltage is excessive, which enables the 55 percent control circuit 349 so that the duty cycle is limited to about 55 percent to make the voltage appearing at the secondary winding 46 less than the voltage at the DC bus 24, which reduces input current to zero. When the device is started, the DC bus voltage is zero and increasing during which time the first control circuit is enabled, which limits the duty cycle to about 30 percent limiting the input current to a few amperes or less, for a soft-start. After the DC bus voltage exceeds the low reference value, the 30 percent control circuit 347 is disabled and the duty cycle is limited to 80 percent as described above. If the DC bus voltage exceeds the high reference value, the 30 percent control circuit 347 is re-enabled, which again limits the duty cycle to 30 percent, to prevent excess voltage at the DC bus.

Basically, the first inverter mode control circuit is operable to control the DC to DC converter as a push-pull, current-fed transformer-isolated boost step-up converter.

First Charge Mode Control Circuit

Figure 7:
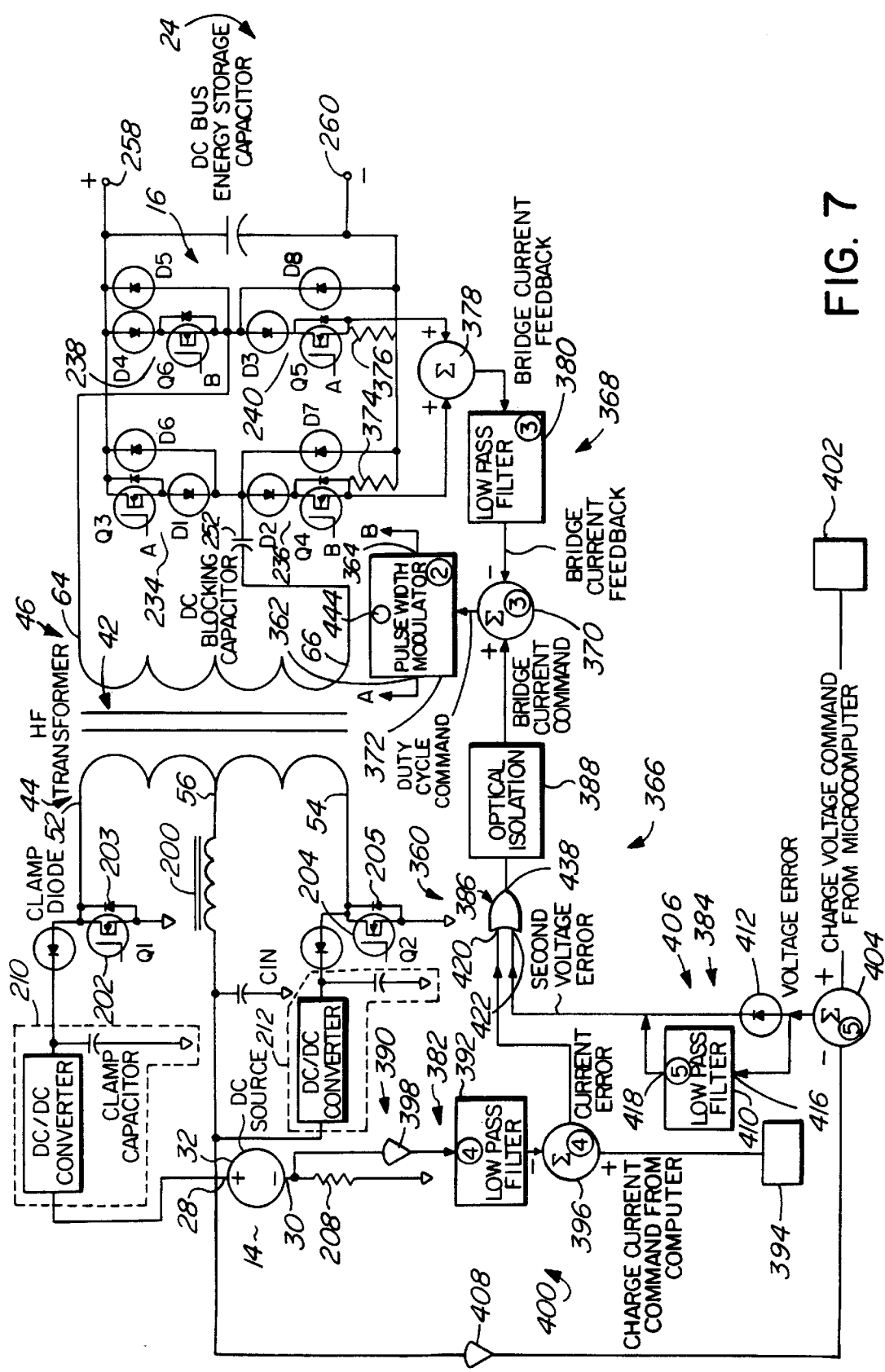
FIG. 7 is a schematic diagram of a charge mode control circuit of the DC to DC converter, according to the first embodiment of the invention.

Referring to FIG. 7, the first charge mode control circuit includes a second switching control circuit 360 having first and second outputs 362 and 364 in communication with the third, fourth fifth and sixth switching elements 234, 236, 238 and 240, for controlling conduction of the third, fourth, fifth and sixth switching elements to produce a high frequency voltage waveform across the secondary winding 46 when power is supplied to the DC bus 24 by the DC/AC converter 18 operating in charging mode.

The second switching control circuit 360 includes a bridge current command signal generator 366 for producing a bridge current command signal in response to voltage and current at the first DC port 14 and a bridge current feedback signal generator 368 for producing a bridge current feedback signal in response to current drawn at the second DC port, a third subtracter 370 for subtracting the bridge current feedback signal from the bridge current command signal to produce a second duty cycle command signal, and a second pulse width modulator 372 responsive to the second duty cycle command signal for producing third, fourth, fifth and sixth switching signals operable to control switching of the third, fourth, fifth and sixth switching elements 234, 236, 238 and 240.

Bridge Current Feedback Signal Generator

The bridge current feedback signal generator 368 includes first and second low resistance current sense resistors 374 and 376, a summer 378 and a third low pass filter 380. The first and second current sense resistors 374 and 376 are connected in series with the fourth switching element 236 and the sixth switching element 240 respectively and the negative terminal 260. The first and second current sense resistors 374 and 376 act as signal generators for generating first and second current sense signals respectively, representing current flow in the fourth and sixth switching elements 236 and 240 respectively.

The first and second current sense signals are provided to the summer 378 which sums them together to produce a raw bridge current feedback signal. The raw bridge current feedback signal is provided to the third low pass filter 380 which filters the raw bridge current feedback signal to produce the bridge current feedback signal. The bridge current feedback signal has a voltage level which increases with an increase in current through either or both of the first and second current sense resistors 374 and 376 and which decreases with a decrease in current through either of the first and second current sense resistors.

Bridge Current Command Signal Generator

The bridge current command signal generator 366 includes a second current error signal generator 382, a voltage error signal generator 384, a signal selector circuit 386 and an isolator 388.

Second Current Error Signal Generator

The second current error signal generator 382 generates a second current error signal in response to current flow at the first DC port 14. The second current error signal generator 382 includes a charging current signal generator 390 for generating a charging current signal indicative of current at the first DC port 14, a fourth low pass filter 392 for filtering the charging current signal to produce a filtered charging current signal, a charge current command signal generator 394 for generating a charge current command signal indicative of a desired charging current and a fourth subtracter 396 for subtracting the filtered charging current signal from the charge current command signal to produce the second current error signal.

The charging current signal generator 390 includes the current sense resistor 208 connected to the first DC source 32 and a signal conditioner 398 connected to the current sense resistor for producing the charging current signal. The charging current signal has a voltage level indicative of the current flowing in the current sense resistor 208, that is, the current flowing to the first DC source 32.

The fourth low pass filter 392 has a cutoff frequency of approximately 0 Hz and filters the charging current signal to produce a filtered charging current signal.

The charge current command signal generator 394 includes the microprocessor (not shown) and a first digital to analog converter (not shown), operable to receive a digital code from the microprocessor indicative of a desired charge current set by a pre-defined charging schedule and to produce a charge current command signal having a voltage level indicative of the desired charge current. Different charging schedules may be used depending upon the type or capacity of DC source employed or the power rating of the AC source. For example, a different charging schedule is employed for a wet cell battery as compared to the charging schedule employed for a gel cell battery.

The fourth subtracter 396 simply subtracts the voltage level of the filtered charging current signal from the voltage level of the charge current command signal to produce the second current error signal having a voltage level indicative of the difference between the charge current command signal and the filtered charging current signal.

Voltage Error Signal Generator

The voltage error signal generator 384 includes a charging voltage signal generator 400, a charging voltage reference signal generator 402, a fifth subtracter 404 and a second non-linear voltage loop compensation network 406.

The charging voltage signal generator 400 includes a signal conditioner 408 connected to the first DC port terminal 28 for generating a charging voltage signal having a voltage level indicative of voltage at the first DC port 14.

The charging voltage reference signal generator 402 includes the microprocessor (not shown) and a second digital to analog converter (not shown) for generating a charging voltage reference signal indicative of a desired charging voltage. The microprocessor provides a digital code to the second digital to analog converter, the digital code representing a desired voltage according to the pre-defined charging schedule and type and temperature of the DC source.

The fifth subtracter 404 subtracts the charging voltage signal from the charging voltage reference signal to produce a raw voltage error signal. The raw voltage error signal is provided to the second non-linear voltage loop compensation network 406 which filters the raw voltage error signal to produce the second voltage error signal.

The second non-linear voltage loop compensation network 406 includes a fifth low pass filter 410 and a third signal diode 412. The third signal diode 412 is connected in parallel between an input 416 and an output 418 of the fifth low pass filter 410. Overall, the second non-linear voltage loop compensation network 406 produces the second voltage error signal in response to the raw voltage error signal.

The fifth low pass filter 410 has a cutoff frequency of 0 Hz and a relatively slow response time in producing a change in the second voltage error signal in response to the charging voltage signal. The third signal diode 412 is operable to forward conduct when the raw voltage error signal changes at a rate at which an instantaneous voltage drop across the fifth low pass filter 410 exceeds a pre-defined value, in this embodiment 0.2 volts, the pre-defined value being set by the voltage drop across the diode when forward conducting. Thus, the second non-linear voltage loop compensation network 406 has a relatively slow response in changing the second voltage error signal when the voltage across the fifth low pass filter is within a first range, i.e. 0–0.2 volts and has a relatively fast response in changing the second voltage error signal when the voltage across the fifth low pass filter is within a second range, (i.e. >0.2 volts) corresponding to a slew rate of about 12.6 v/sec., rising only.) In other words, the second non-linear voltage loop compensation network 406 is operable to provide a slow response when the voltage across the fifth low pass filter is relatively small and a fast response when the voltage across the fifth low pass filter is relatively large.

Signal Selector

The signal selector 386 has first and second inputs 420 and 422 for receiving the second current error signal and the second voltage error signal and has an output 438 for producing a lesser output signal responsive to the lesser of the second current error signal and the second voltage error signal.

FIG. 8

Figure 8:
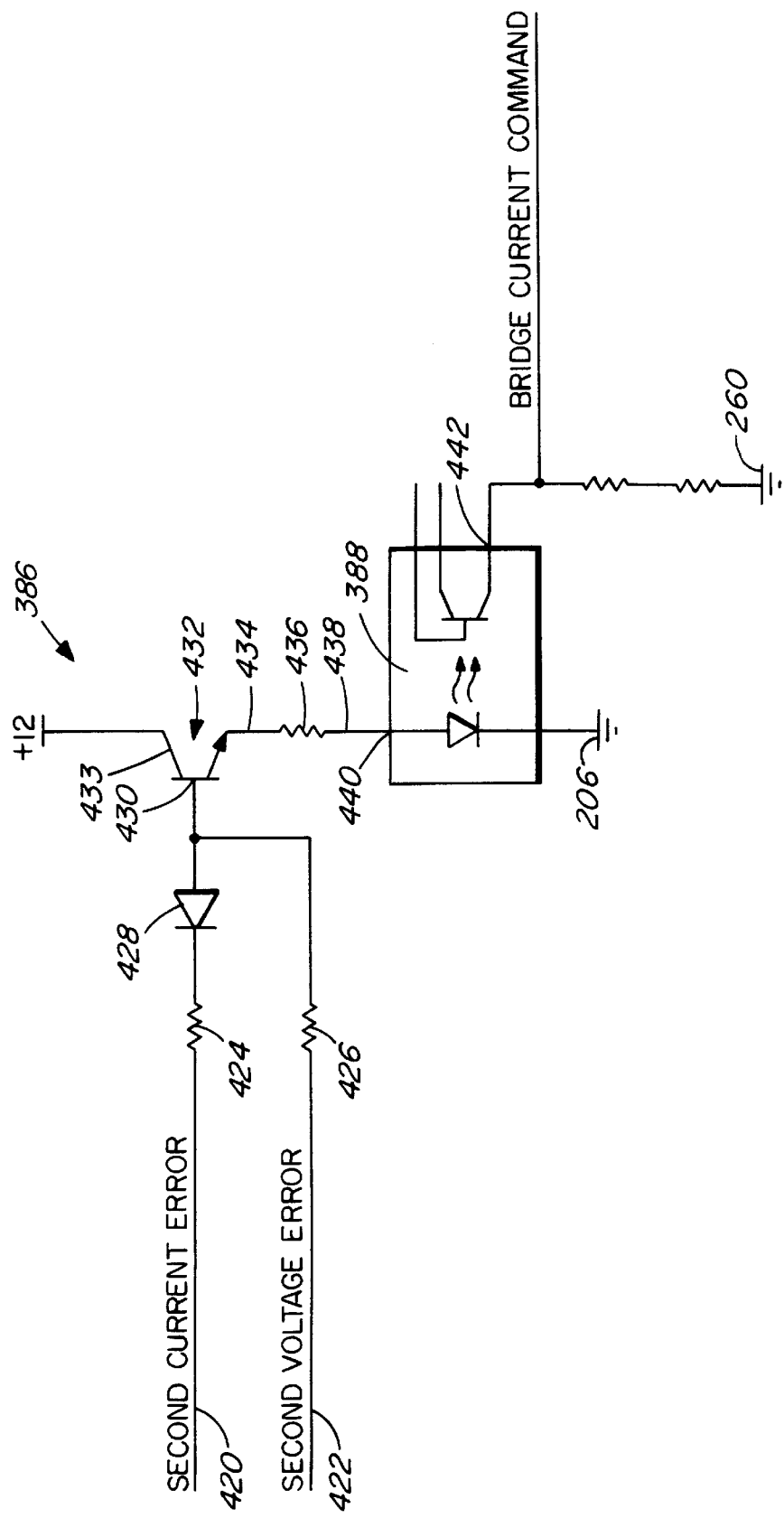
FIG. 8 is a schematic diagram of a signal selector, according to the first embodiment of the invention.

Referring to FIG. 8, the first and second inputs 420 and 422 are connected to first and second resistors 424 and 426 respectively. The first resistor 424 is connected to a second diode 428 which is connected to the base 430 of a signal transistor 432. The second resistor 426 is also connected to the base 430 of the signal transistor 432.

The signal transistor 432 has a collector terminal 433 connected to a 12 volt supply and has an emitter terminal 434 to which is connected a current limiting resistor 436. The current limiting resistor has a connection to the second isolator 388. This connection acts as the output 438 of the signal selector 386. The lesser output signal appears at the output 438.

The second isolator 388 has an input 440 for receiving the lesser output signal and has an output 442 for producing a bridge current command signal. The input 440 is electrically connected to the first DC port through the DC port signal ground terminal 206. The output is electrically connected to the DC bus 24 through the DC bus negative terminal 260. The input 440 and the output 442 are electrically isolated from each other and the input 440 is referenced to the DC port signal ground terminal 206 and the output 442 is referenced to the DC bus negative terminal 260. Thus the second isolator 388 passes the lesser output signal from circuit components referenced to the DC port to circuit components referenced to the DC bus of the apparatus, without any electrical connection between the DC bus and the DC port. The lesser output signal as it appears at the output of the second isolator 388 acts as the bridge current command signal.

Referring back to FIG. 7, the third subtracter 370 subtracts the bridge current feedback signal from the bridge current command signal to produce the second duty cycle command signal. The second duty cycle command signal is provided to the second pulse width modulator 372 which, in this embodiment includes a 3525A pulse width modulator control circuit available from Motorola Inc.

Figure 9:
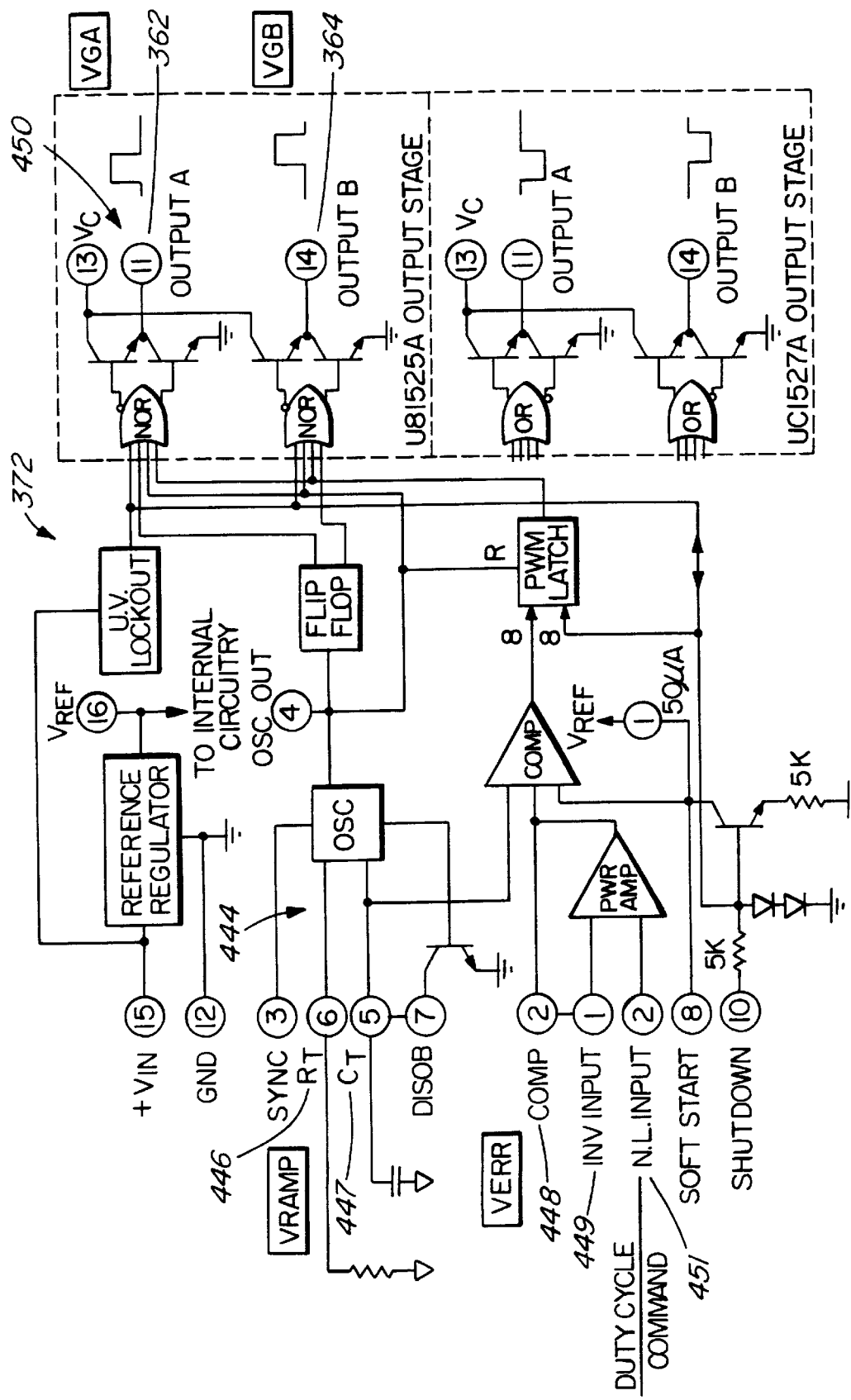
FIG. 9 is a block diagram of a pulse width modulator circuit.

Referring to FIG. 9, the second pulse width modulator 372 has an Rt input 446, a Ct input 447, a COMP input 448, an inverting input 449, a non-inverting input 451 and a first output stage 450 having first and second outputs A (362) and B (364). A resistor and capacitor are connected to the Rt and Ct inputs 446 and 447 to cause an oscillator in the circuit to have a frequency of about 60 kHz. The COMP input 448 is connected to the inverting input 449 and the second duty cycle command signal is provided to the non-inverting input 451. The first and second outputs 362 and 364 are connected to a switch driver (HARRIS HIP2500) (not shown) and the switch driver is connected to first and second pairs of switching elements. Referring back to FIG. 7, in this embodiment, the first pair includes the third and sixth switching elements 234 and 240 and the second pair includes the fourth and fifth switching elements 236 and 238. Thus, the first output 362 is connected to and is operable to simultaneously control the third and sixth switching elements 234 and 240 and the second output 364 is connected to and is operable to simultaneously control the fourth and fifth switching elements 236 and 238. Thus, the first output 362 produces third and sixth switching element control signals, which are actually the same signal hereinafter referred to as the third/sixth switching element control signal and the second output produces fourth and fifth switching element control signals, which are actually the same signal, hereinafter referred to as the fourth/fifth switching element control signal.

The third/sixth switching element control signal and the fourth/fifth switching element control signal are cyclic, having high and low states at a frequency of approximately 60 kHz and a variable duty cycle. The duty cycle changes in response to changes in the second duty cycle command signal. The high state represents a relatively high voltage level and is used to turn on or place in a conduction mode the switching elements receiving the signal, while the low state represents a relatively low voltage level and is used to turn off or place in a non-conducting mode the switching elements receiving the signal.

Figure 10:
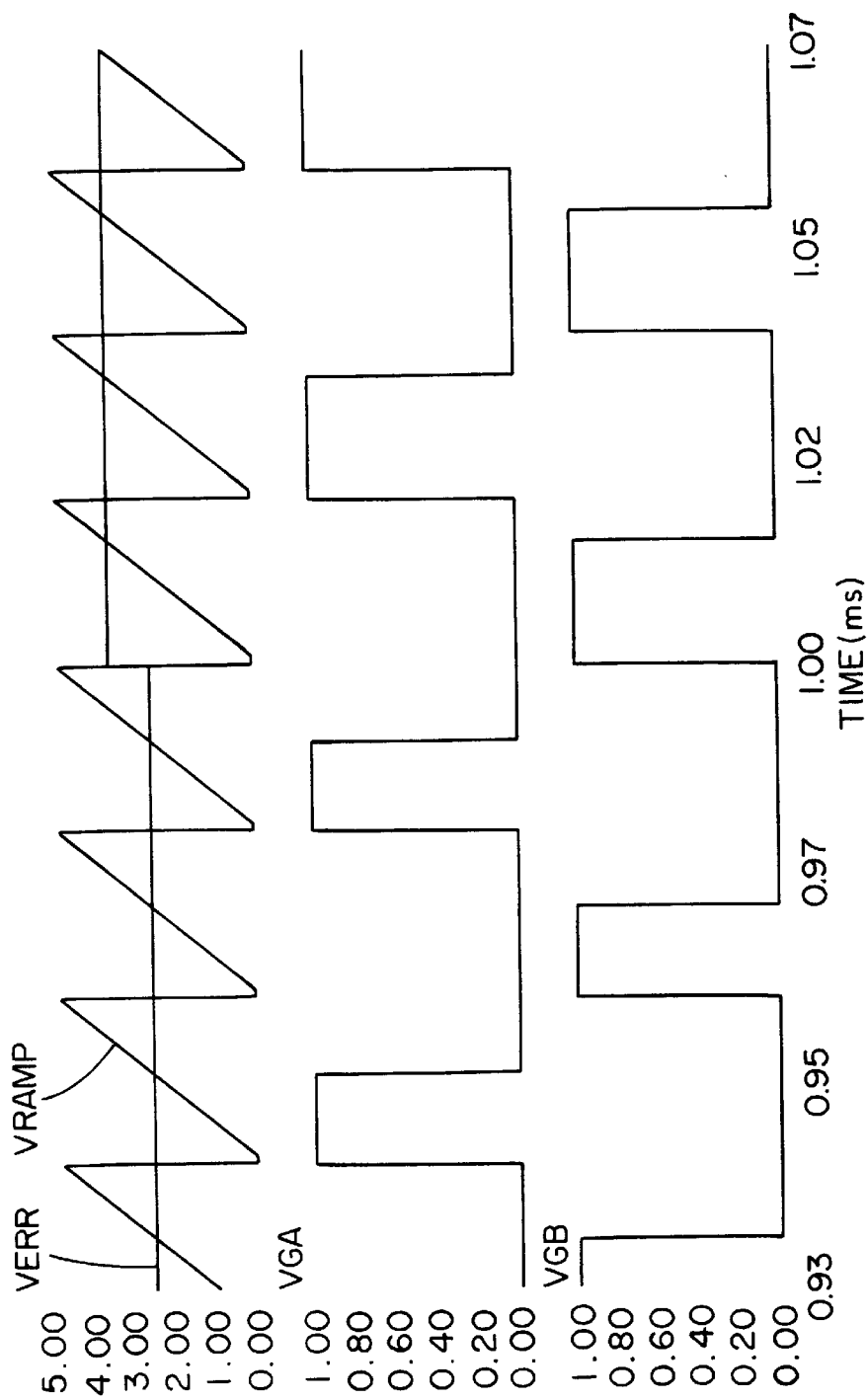
FIG. 10 is a diagram of third/sixth and fourth/fifth waveforms produced at outputs of the pulse width modulator shown in FIG. 9, according to the first embodiment of the invention.

Examples of the signals produced at the first and second outputs 362 and 364, in response to the second duty cycle command signal are shown in FIG. 10. As the second duty cycle command signal increases, the duty cycles of the third/sixth switching element control signal and the fourth/fifth switching element control signal are increased. Thus, as the second duty cycle command voltage is increased, the third and sixth switching elements (234 and 240) and also the fourth and fifth switching elements 236 and 238 remain in the conducting mode for a longer period of time.

Referring back to FIG. 7, as the second duty cycle command signal is increased or decreased in response to the bridge current feedback signal and the bridge current command signal, the second pulse width modulator 372, third subtracter 370 and voltage error signal generator 384 and second current error signal generator 382 act as a switching signal generator for generating third, fourth, fifth and sixth switching element control signals responsive to voltage or current at the first DC port 14 and current at the second DC port 16, the third, fourth, fifth and sixth switching signals being operable to place the third, fourth, fifth and sixth switching elements 234, 246, 238 and 240 in conducting and non-conducting states.

Operation of DC to DC Converter in Charter Mode

Figure 11:
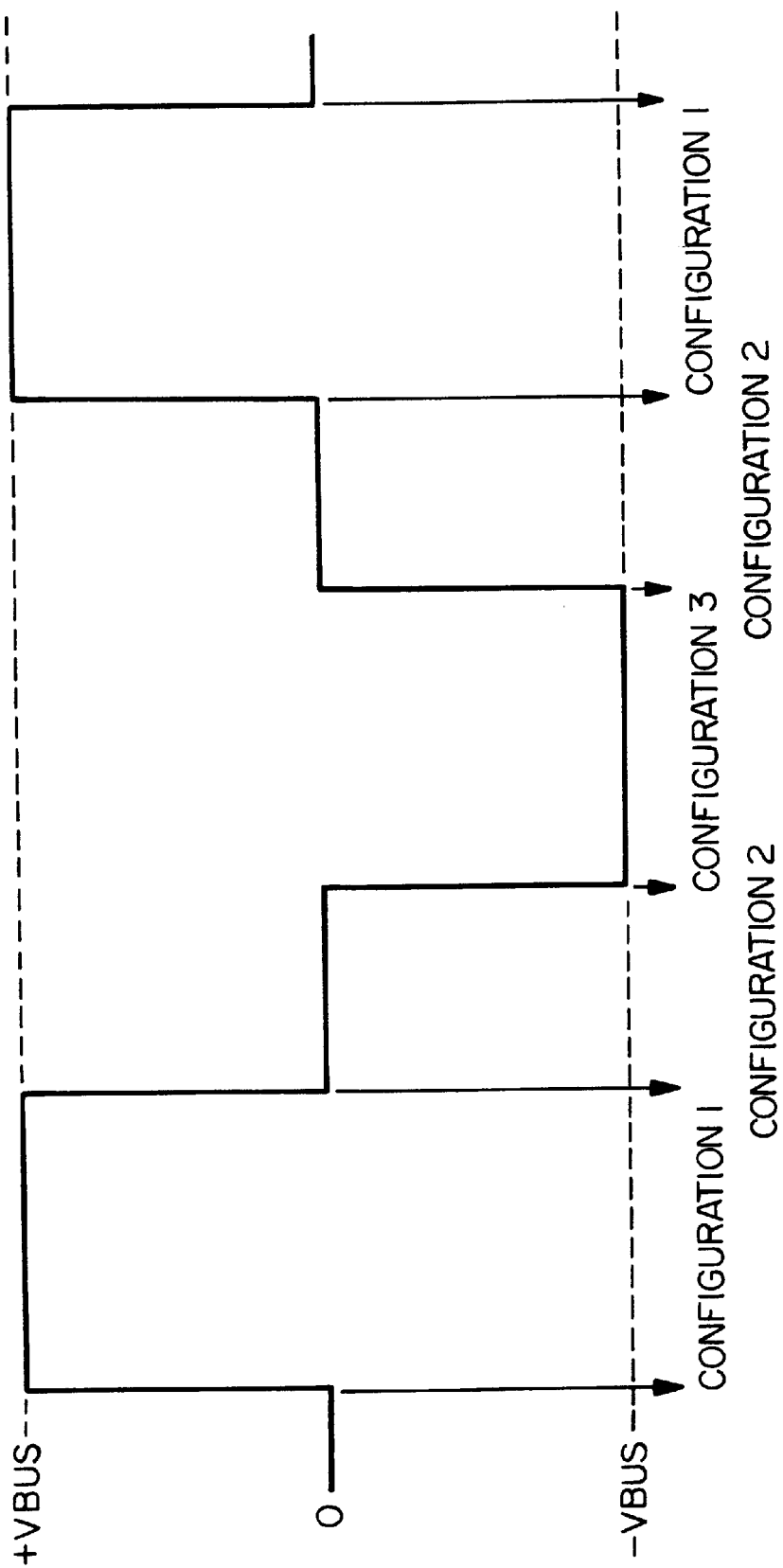
FIG. 11 is a diagram of a waveform produced at the secondary winding of the transformer, of the DC to DC to converter, when the DC to DC converter is in a rectifier mode, according to the first embodiment of the invention.

In the charger mode, the third, fourth, fifth, sixth switching elements 234, 236, 238 and 240 are active while the first and second switching elements 202 and 204 are inactive (always off). Switching of the third, fourth, fifth and sixth switching elements is controlled so that the switches are always in one of three configurations as follows:

Configuration 1—third switching element 234 and sixth switching element 240 on, the fourth and fifth switching elements 236 and 238 off;

Configuration 2—All switching elements off;

Configuration 3—The third and sixth switching elements 234 and 240 off and the fourth and fifth switching elements 236 and 238 on;

By sequencing through Configuration 1, Configuration 2, and Configuration 3 at a high frequency, a voltage waveform as shown in FIG. 11 is applied to the secondary winding of the transformer. Referring to FIG. 7, this high frequency alternating voltage is stepped down by the transformer 42 and appears at the primary winding terminals 52 and 54. The anti-parallel diodes 203 and 205 in the first and second switching elements 202 and 204 act as a centre tapped rectifier circuit to rectify the transformer voltage so that a DC voltage is applied to the input inductor 200. The anti-parallel diodes 203 and 205 in the low voltage MOSFETs used in the first and second switching elements 202 and 204 have fast recovery characteristics.

When the third, fourth, fifth and sixth switching elements 234, 236, 238 and 240 are in Configuration 1, current flows from the positive terminal 258 of the DC bus 24 through the third switching element 234, through the blocking diode and through the DC blocking capacitor 252 into the second secondary winding terminal 66. Current flows out of the first secondary winding terminal 64 of the secondary winding 46, through the blocking diode associated with the sixth switching element 240 and through the sense resistor 376 to the negative terminal 260 of the DC bus 24.

On the first DC port side of the transformer 42, current flows from the second DC port terminal 30 of the first DC port, through the anti-parallel diode 203 in the first switching element 202 and into the first primary winding terminal 52 of the primary winding 44 of the transformer 42. Current flows out of the centre tap terminal 56, through the input inductor 200 and out the first DC port terminal 28. As the transformer turns ratio has been chosen such that the voltage at the centre tapped terminal is higher than the voltage at the DC port positive terminal when the apparatus is in use, current flowing through the input inductor 200 increases and energy is stored in the input inductor 200.

When the third, fourth, fifth and sixth switching elements 234, 236, 238 and 240 are placed in Configuration 2, (all off) no voltage is applied to the secondary winding 46 of the transformer. It will be appreciated that alternative switch configurations such as the third switching element 234 and fifth switching element 238 on and the fourth and sixth switching elements 236 and 240 off, will achieve the same effect.

In the second configuration, on the DC port side of the transformer 42, the input inductor 200 maintains current flow to the first DC port 14. Current flows from the negative terminal of the first DC port terminal 30 through the anti-parallel diodes 203 and 205 in the first and second switching elements 202 and 204, into the first and second primary winding terminals 52 and 54 and out of the centre tap terminal 56 and through the input inductor 200 to the first DC port terminal 28 of the first DC port 14. In this case, the voltage at the centre tap terminal 56 is less than the voltage at the first DC port terminal 28 of the first DC port 14. Therefore, current flowing through the input inductor 200 decreases and energy is supplied to the source by the input inductor 200.

When the third, fourth, fifth and sixth switching elements 234, 236, 238 and 240 are in Configuration 3, current flows from the positive terminal 258 of the DC bus 24 through the fifth switching element 238 and its associated blocking diode, into the first secondary winding terminal 64. Current flows out of the second secondary winding terminal 66, through the DC blocking capacitor 252, through the fourth switching element 236 and its associated blocking diode, through sense resistor 374, to the negative terminal 260 of the DC bus 24. On the first DC port side of the transformer, current flows from the second DC port terminal 30 of the first DC port 14, through the anti-parallel diode 205 in the second switching element 204 and into the second primary winding terminal 54. Current flows out of the centre tap terminal 56 of the primary winding, through the input inductor 200 and out the first DC port terminal 28 of the first DC port 14.

The first and second clamping circuits 210 and 212 are also active in the charger mode, limiting voltage transients across the first and second switching elements 202 and 204.

Output current and voltage appearing at the first DC port 14 are regulated by varying the duty cycle of the voltage appearing at the centre tap terminal 56 of the transformer, which in turn is controlled by the duty cycle of the third/sixth and fourth/fifth switching element control signals produced at outputs 362 and 364 the second pulse width modulator 372.

Effectively, in the charging mode, the microprocessor (not shown) sends codes to the first and second digital to analog converters respectively which provide charge current command and charge voltage command signals accordingly, to the fourth and fifth subtracters 396 and 404 respectively in accordance with the pre-defined charging schedule. The fourth and fifth subtracters 396 and 404 subtract the charging current signal representing the charge current supplied to the source and the voltage feedback signal representing voltage at the source, respectively from the charge current command signal and the charge voltage command signal respectively, to produce the second current error signal and the voltage error signal respectively. The voltage error signal is passed through the second voltage loop compensation network 406 to produce the second voltage error signal. The second voltage loop compensation network 406 provides a slow voltage loop response when the voltage error signal is relatively small and a fast voltage loop response when the voltage error signal is relatively large. The second voltage error signal produced by the second voltage loop compensation network and the second current error signal, are provided to the signal selector 386 which presents at its output, the lesser value of the second current error signal and the second voltage error signal. This has the effect of ensuring that neither the output voltage nor the output current will exceed its commanded value, as dictated by the microprocessor. If achieving the output voltage commanded would require an output current greater than that commanded, then the current command will dominate. Conversely, if achieving the output current commanded would require an output voltage greater than that commanded, then the voltage command will dominate.

As described above, an increase in the second duty cycle command signal increases the duty cycle of the third/sixth switching element control signal at output 362 and an increase in the duty cycle of the fourth/fifth switching element control signal at output 364, thereby increasing the duration of time during which the switching elements are in conduction, and increasing power transfer from the DC bus 24 to the first DC port 14. Similarly, a decrease in the second duty cycle command signal decreases the time during which the third, fourth, fifth and sixth switching elements are in conduction, thereby reducing the duration of time during which the switching elements are in conduction, and decreasing power transfer from the DC bus 24 to the first DC port 14.

It will be appreciated that the first charge mode control circuit is operable to control the DC to DC converter 12 as a full-bridge voltage fed transformer-isolated buck step-down converter with centre tapped output rectifiers.

DC Bus

Referring back to FIG. 1, in this embodiment, the DC bus is formed from a pair of copper circuit board traces (not shown) to which the second DC port 16 and third DC port 20 are connected. The load balancing energy storage element 26 includes eight 470 uF 250 volts capacitors shown generally at 456, connected between the positive terminal 258 and the DC bus negative terminal 260. The capacitors decouple the DC to DC converter 12 from the DC to AC converter 18 by supplying energy to the DC bus 24 when a voltage at the DC bus 24 is decreasing and by storing energy received from the DC bus 24 when a voltage at the DC bus 24 is increasing. This enables the apparatus to receive power from the first DC source 32 and supply power to the first DC source 32 substantially ripple free even though power supplied to and received from the AC port has a ripple at twice the frequency of the AC voltage.

DC to AC Converter

Referring to FIG. 3, the DC to AC converter 18 includes a full bridge converter 470 and an AC output low pass filter 472. The full bridge converter 470 includes seventh 474, eighth 476, ninth 478 and tenth 480 switching elements connected to the DC bus 24 in a full bridge topology having first and second bridge input terminals 482 and 484 connected to the DC bus 24 and first and second bridge output terminals 486 and 488 connected to the AC output low pass filter 472. Effectively, the bridge output terminals 486 and 488 provide a pulse width modulated waveform to the AC output low pass filter 472. In this embodiment, each of the seventh 474, eighth 476, ninth 478 and tenth 480 switching elements includes four paralleled IRF646 N-channel Power MOSFETs manufactured by Harris Corporation of the United States.

The AC output low pass filter 472 has an input 490 connected to the full bridge output terminals 486 and 488 for receiving the pulse width modulated waveform and has a filter output 492 to which is connected an electromagnetic interference filter 494 having AC in/out line and neutral terminals 34 and 36 which act as the AC port 22. The AC output low pass filter 472 includes first and second 600 uH filter inductors 496 and 498, third and fourth 40 uH filter inductors 500 and 502, and first and second filter capacitors 504 and 506. The first and third filter inductors 496 and 500 are connected in series with the second bridge output terminal 488 and the second and fourth filter inductors 498 and 502 are connected in series with the first bridge output terminal 486.

The DC to AC converter 18 further includes a snubber circuit shown generally at 508 connected between the bridge output terminals 486 and 488 and the DC bus 24. The snubber circuit 508 includes eleventh 510 and twelfth 512 switching elements connected to the bridge output terminals 486 and 488 first and second snubber diodes 514 and 516 connected in parallel with the eleventh 510 and twelfth 512 switching elements respectively and second and third inductors 518 and 520 connected to the eleventh 510 and twelfth 512 switching elements respectively and connected to each other and to a third snubber diode 522 connected to the second and third inductors 518 and 520 and the DC bus 24. In this embodiment, each of the eleventh and twelfth switching elements 510 and 512 includes a single HGTP20N60B3 40A, 600 volts UFS Series N-channel IGBT manufactured by Harris Corporation.

Referring to FIG. 1, the DC to AC converter 18 further includes a second power control circuit 524 which operates independently of the first power control circuit 270 controlling the DC to DC converter 12. The second power control circuit 524 includes an inverter mode control circuit 526 for generating an inverter mode current command signal, a charge mode control circuit 528 for generating a charge mode current command signal and a third switching control circuit 530 for controlling the seventh, eighth, ninth, tenth, eleventh, and twelfth switching elements in the inverter mode and in the charge mode respectively, in response to the inverter mode command signal and the charge mode command signal respectively.

Inverter Mode Control Circuit

Referring back to FIG. 3, the inverter mode control circuit 526 acts as an inverter mode current command signal generator and includes an AC output voltage control circuit 527 and a DC offset correction circuit 532 for producing and varying the inverter mode current command signal in response to AC output voltage and DC offset voltage measured across capacitor 504.

The AC output voltage control circuit 527 includes an AC output voltage sense signal generator 534 connected to a circuit node between the first and third filter inductors 496 and 500.

The AC output voltage sense signal generator 534 includes a first signal conditioner 544 connected to a circuit node between the first and third filter inductors 496 and 500 to produce an AC output voltage sense signal responsive to AC voltage at the bridge output terminals 486 and 488. The DC offset correction circuit 532 includes a sixth low pass filter 536, a sinewave reference signal generator 538, a sixth subtracter 540 and a seventh subtracter 542. The sixth low pass filter 536 receives the AC output voltage sense signal and produces a filtered DC offset signal in response to the AC output voltage sense signal.

The sinewave reference signal generator 538 includes the microprocessor (not shown). The microprocessor sends a sinusoidally width modulated digital pulse train to a filter (not shown) which produces the desired sinewave reference signal. The pulse train may represent an AC waveform having a frequency of 50 Hz or 60 Hz, as desired. In response, the filter produces a sinewave reference signal, at the desired frequency.

A sixth subtracter 540 subtracts the filtered DC offset signal from the sinewave reference signal to produce an output voltage command signal.

A seventh subtracter 542 subtracts the AC output voltage sense signal from the output voltage command signal to produce the inverter mode current command signal. Thus, the inverter mode current command signal is produced and varied in response to both the AC output voltage and the DC offset voltage.

Charge Mode Command Signal Generator

Figure 12:
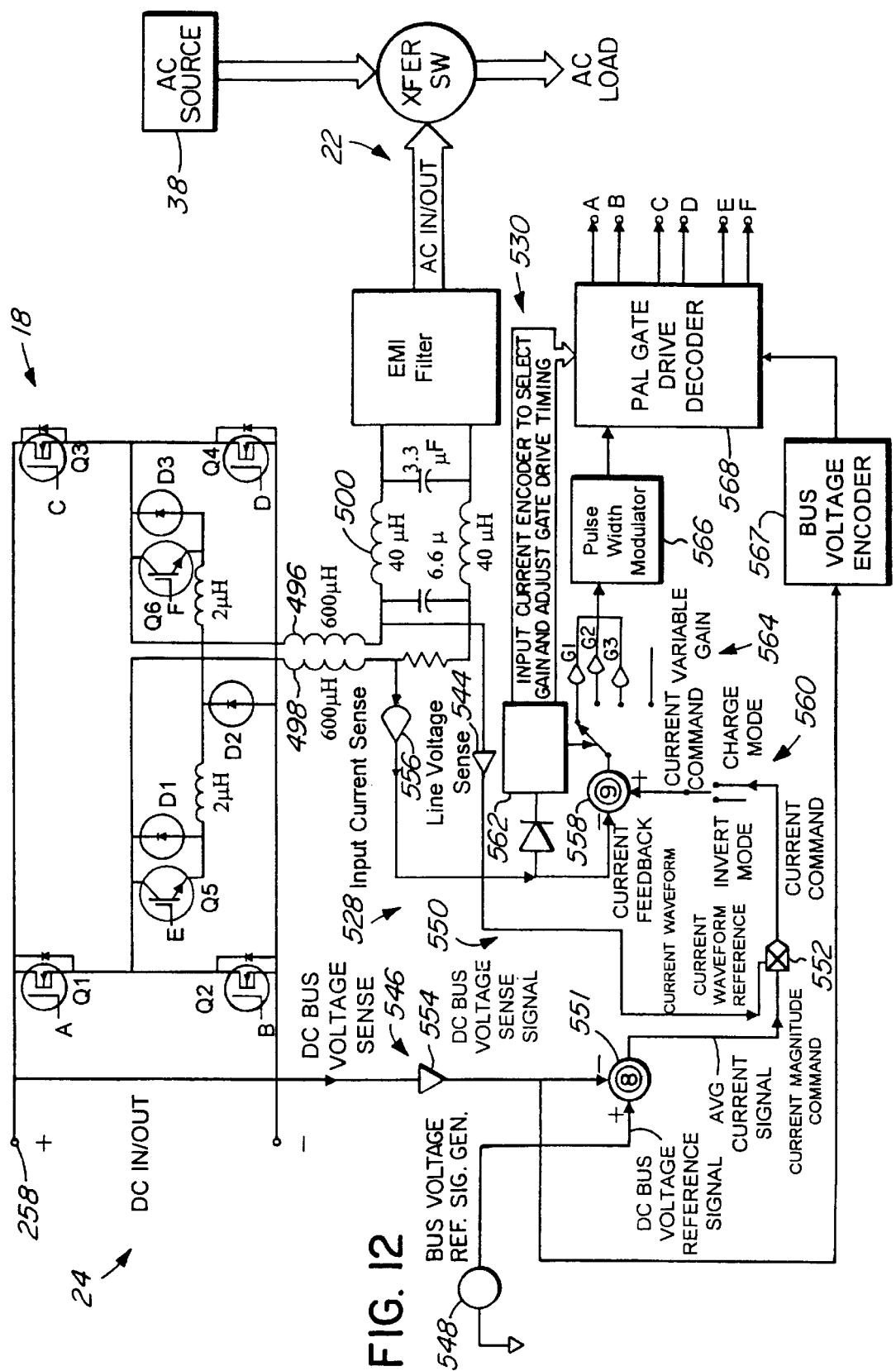
FIG. 12 is a schematic diagram of a charge mode control circuit for controlling the DC to AC converter, according to the first embodiment of the invention.

Referring to FIG. 12, the charge mode control circuit 528 includes a DC bus voltage sense signal generator 546, a DC bus voltage reference signal generator 548, a current waveform signal generator 550, an eighth subtracter 551, and a multiplier 552.

The DC bus voltage sense signal generator 546 includes a second signal conditioner 554 connected to the positive terminal 258 of the DC bus 24, for producing a DC bus voltage sense signal responsive to voltage at the DC bus.

The DC bus voltage reference signal generator 548 includes an analog voltage reference integrated circuit, in this embodiment a TL431 available from Texas Instruments Corp. of Texas, USA. This device produces a DC bus voltage reference signal having a voltage indicative of a desired DC bus voltage, which in this embodiment is 215 volts for normal charge mode operation and 230 volts for an equalizing charge mode operation.

The current waveform signal generator 550 includes the first signal conditioner 544 connected to the circuit node between the first and third filter inductors 496 and 500, which provides the output voltage feedback signal. The output voltage feedback signal follows the voltage of the bridge output voltage and hence the AC port voltage and therefore is indicative of a desired current waveform as the desired current at the AC output port is one which identically follows the output voltage, in order to achieve a unity power factor. Thus the first signal conditioner acts as a current waveform signal generator for generating a desired current waveform indicative of the desired current at the AC output port.

The eighth subtracter 551 subtracts the DC bus voltage sense signal from the DC bus voltage reference signal to produce an average current signal and the multiplier 552 multiplies the average current magnitude command signal by the current waveform signal to produce the charge mode current command signal. The above components thus act as a charge mode current command signal generator for generating a charge mode current command signal in response to the DC bus voltage sense signal, the DC bus voltage reference signal and the current waveform signal.

Third Switching Signal Generator

Referring back to FIG. 3, the third switching control circuit 530 includes an AC current sense signal generator 556, a ninth subtracter 558, a selector 560, an analog to digital converter 562, a magnetization compensation circuit 564, third pulse width modulator 566, a DC bus voltage encoder 567 and a gate drive decoder circuit 568.

Referring back to FIG. 3, the third switching control circuit 530 produces switching signals for controlling the seventh, eighth, ninth, tenth, eleventh and twelfth switching elements 474, 476, 478, 480, 510 and 512 in response to the AC current sense signal, the DC bus voltage reference signal and at least one of the charge mode command signal and the inverter mode command signal.

The AC current sense signal generator 556 generates an AC current sense signal responsive to current at the bridge output. The AC current sense signal generator includes a low resistance sense resistor 570 and a third signal conditioner 572. The low resistance sense resistor 570 is connected in series with and between the second and fourth filter inductors 498 and 502 such that a voltage developed across the sense resistor is indicative of the current flowing at the AC port 22. This voltage is conditioned by the third signal conditioner 572 to produce the AC current sense signal. The AC current sense signal is provided to the analog to digital converter 562 and to the ninth subtracter 558.

Selector

The selector 560 is in communication with the charge mode command signal generator (528 in FIG. 12), the inverter mode control circuit 526, and the ninth subtracter 558 and acts to selectively provide the inverter mode current command signal or the charge mode current command signal to the ninth subtracter 558. The selection of which command signal is provided to the ninth subtracter 558 is set by the microprocessor. The microprocessor monitors the AC output voltage sense signal and controls the selector 560 to provide the inverter mode current command signal to the ninth subtracter 558 when the AC voltage is outside of a desired AC output voltage range and to provide the charge mode current command signal to the ninth subtracter 558 when the AC voltage is within the desired AC output voltage range.

The ninth subtracter 558 subtracts the AC current sense signal from the selected current command signal to produce a third duty cycle command signal. Thus the ninth subtracter 558 acts as a third duty cycle command signal generator for generating a third duty cycle command signal indicative of a desired duty cycle of the seventh, eighth, ninth and tenth switching elements 474, 476, 478 and 480.

Analog to Digital Converter

The analog to digital converter 562 has an input 574 for receiving the analog AC current signal and has outputs shown generally at 576 for providing a digital representation of the instantaneous magnitude of the AC current signal. The digital representation includes a first bit indicative of the direction of current through the sense resistor 570, a second bit indicating whether or not the measured current is greater than 50 amperes, a third bit indicating whether or not the measured current is greater than 30 amperes and a fourth bit indicating whether or not the measured current is greater than 10 amperes. It will be appreciated that because the current sensed by the sense resistor 570 is alternating, the direction of current through the sense resistor 570 changes on each half-cycle of alternating current. Hence, the first bit indicative of the direction of current through the sense resistor also changes state on each half-cycle alternating current.

Magnetization Compensation Circuit

The magnetization compensation circuit 564 acts to compensate the third duty cycle command signal in response to the magnitude of current through sense resistor 570 to compensate for magnetization effects in the sixth AC output low pass filter 472.

The magnetization compensation circuit 564 includes a variable gain amplifier 578 having a gain dependent upon the digital representation of the AC current signal as provided by the analog to digital converter 562. The variable gain amplifier 578 includes first, second and third gain stages 580, 582 and 584 selectively rendered operable when the magnitude of the AC current as indicated by the AC current signal is within a first, second or third range respectively. The first range corresponds to currents in which the current in the first and second filter inductors 496 and 498 in the AC output low pass filter 472 is within a linear range of the magnetization curve of the first and second filter inductors 496 and 498 (approximately 10 amperes). The second range corresponds to currents in which the current in the first and second filter inductors 496 and 498 is within a knee range of the magnetization curve of the inductors (approximately 10–30 amperes) and the third range corresponds to currents in which the current in the first and second filter inductors is within a saturation range of the magnetization curve of the inductors (approximately 30–50 amperes). The gain applied to the third duty cycle command signal is decreased as the current at the AC port increases in order to maintain relatively linear control of the current throughout the entire range of the magnetization curve of the first and second filter inductors 496 and 498. This eliminates the need for heavy, expensive inductors in the AC output low pass filter 472, which do not saturate in anticipated operating current ranges.

The variable gain amplifier has an output 586 which is connected to an input 588 of the third pulse width modulator 566. The magnetization compensation circuit 564 thus includes a variable gain amplifier 578 in communication with the third pulse width modulator 566 for amplifying the third duty cycle command signal to provide an amplified third duty cycle command signal to the third pulse width modulator 566, the variable gain amplifier 578 having a gain dependent upon the magnitude of the AC current sense signal.

Third Pulse Width Modulator

The third pulse width modulator 566 is similar to that shown in FIG. 6, with the exception that it has only one output for producing a cyclic width-modulated pulse stream having a frequency of approximately 40 kHz, in response to the third duty cycle command signal. A pulse is produced on each cycle, the pulse having a duty cycle or width dependent upon the third duty cycle command signal. As the third duty cycle command signal increases, so does the pulse width and vice versa.

DC Bus Voltage Encoder

The DC bus voltage encoder 467 includes a signal conditioner 554 and an analog to digital converter 590. The analog to digital converter 590 produces a digital representation of the DC bus voltage to indicate whether the DC bus voltage is in any of three ranges. The three ranges are >120 volts, >170 volts and >240 volts. The DC bus voltage encoder thus has three outputs each indicating whether or not the DC bus voltage exceeds a respective range.

Gate Drive Decoder

The gate drive decoder circuit 568 includes a programmable array logic (PAL) device 592 having a three-pin DC bus voltage input 594 for receiving the DC bus voltage sense signals, a four-pin AC current input 596, a pulse width modulator input 598, a clock input 600, a charge enable input 602, an invert enable input 604 and a reset input 606. The PAL further includes first, second, third, fourth, fifth and sixth outputs 608, 610, 612, 614, 616 and 618.

The DC bus voltage input 594 is connected to the DC bus voltage encoder 567 to receive the digital representation of the DC bus voltage. The AC current input 596 is connected to the analog to digital converter 562 to receive the digital representation of the magnitude and direction of the AC current. The pulse width modulator input 598 is connected to the third pulse width modulator 566 for receiving the width modulated pulse stream therefrom. The clock input 600 is connected to a clock circuit (not shown) which produces a clock signal having a frequency of approximately 4 MHz. The charge enable input 602, is controlled by the microprocessor (not shown). The invert enable input 604 is controlled by the microprocessor. The reset input 606 is connected to a conventional power on reset circuit (not shown).

The first, second, third, fourth, fifth and sixth outputs 608, 610, 612, 614, 616 and 618 are connected to the seventh, eighth, ninth, tenth, eleventh and twelfth switching elements 474, 476, 478, 480, 510 and 512 respectively. The gate drive decoder includes respective registers, to which values are written, for controlling the on and off states of respective outputs 608 through 618.

DC to AC Converter Operation in Inverter Mode

Operation of the DC to AC converter 18 in inverter mode involves a bi-polar voltage switching strategy in which the seventh and tenth switching elements 474 and 480 are treated as a first pair which is switched in unison and the eighth and ninth switching elements 476 and 478 are treated as a second pair switched in unison. Generally, one of the two switch pairs is always in conduction when the circuit is active.

Effectively, the switching signals for the DC to AC converter 18, as provided by the gate drive decoder circuit 568 are generated in response to the signal produced by the third pulse width modulator 566.

The third pulse width modulator produces a pulse stream which, includes a plurality of pulses which vary in width in a sinusoidal relation. This pulse stream is applied to the gate drive decoder circuit 568 which produces seventh, eighth, ninth, tenth, eleventh and twelfth switching signals in response to the AC current input 596, the pulse width modulator input 598, the reset input 606, the DC bus voltage input 594, the clock input 600, the charge enable input 602 and the invert enable input 604.

Generally, when the voltage level of the pulse is high, the first pair of switching elements 474 and 480 is placed in a conducting state and the second pair of switching elements 476 and 478 is placed in a non-conducting state. Similarly, when the voltage level of the pulse stream is low, the first pair of switching elements 474 and 480 is placed in a non-conducting state, and the second pair of switching elements 476 and 478 is placed in a conducting state.

FIG. 13a

Figure 13A:
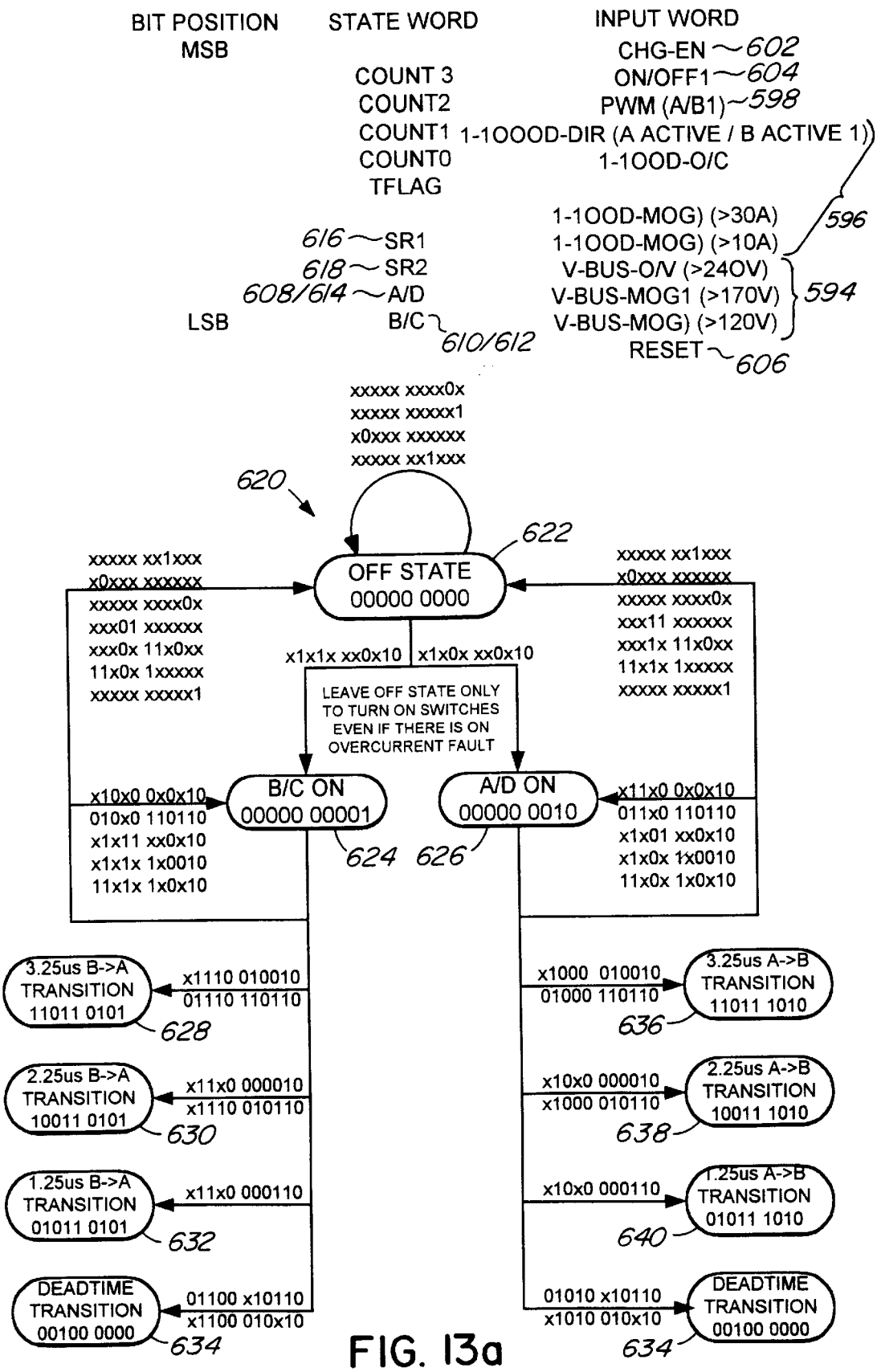
FIGS. 13a, 13b, 13c and 13d are state diagrams showing states of a state machine, for controlling power flow in the DC to AC converter, according to the first embodiment of the invention.

Referring to FIG. 13a, the function of the gate drive decoder is shown generally at 620. The gate drive decoder effectively acts as a state machine operating at a frequency of about 4 MHz.

The state machine implemented by the programmable array logic device, moves from state to state depending upon the states of the inputs 594, 596, 598, 602, 604 and 606 seen in FIG. 3. Referring back to FIG. 13a, the state machine is thus responsive to eleven bit input words which place the state machine in certain states in which state words are produced, the state words including four bit positions which control the active/inactive states of outputs 608 through 618.

A most significant bit of the input word is provided by the charge enable input 602, and is controlled by the microprocessor. The next bit is an on/off! bit which is generated within the state machine as the exclusive OR of the charge and invert enable inputs 602 and 604. The next bit is a pulse width modulation (A/B!) bit which is controlled by the pulse width modulator input 598. The next four bits include a current load direction bit, a current load overcurrent bit, a current load magnitude greater than 30 amperes bit and a current load magnitude greater than 10 amperes bit. Each of these bits is controlled by the AC current input 596 which is controlled by respective outputs of the Analog to Digital Converter (562). The next three bits include a bus overvoltage greater than 240 volt bit, a bus magnitude 1 greater than 170 volt bit and a bus magnitude 0 greater than 120 volt bit. Each of these three bits is controlled by the DC bus voltage input 594 which is controlled by respective outputs of the DC bus voltage encoder 567. The final bit in the input word is the reset bit which is controlled by the power on reset input 606.

The state word includes nine bits, the first five of which are used internally to the state machine, and the remaining four of which are used to control the outputs 608 through 618. The least significant bit is used to control the second and third outputs (610 and 612 controlling the eighth and ninth switching elements (476 and 478), the next most significant bit is used to control the first and fourth outputs (608 and 614 controlling the seventh and tenth switching elements 474 and 480), the next most significant bit is used to control the sixth output (618) connected to the eleventh switching element (510) snubber circuit and the next most significant bit is used to control the fifth output 616 connected to the twelfth switching element 512 of the snubber circuit. Thus, the state machine controls the seventh, eighth, ninth and tenth switching elements in the full bridge converter 470 and the eleventh and twelfth switching elements in the snubber circuit 508. The state machine remains in each state for a period of 0.25 microseconds.

Still referring to FIG. 13a, the state machine includes an off state 622 which is only exited when the on/off! bit is active, the reset signal is inactive, and the voltage at the DC bus is greater than 120 volts and is not more than 240 volts. In this situation, if the current load direction signal is active, the state machine advances to a B/C on state 624, or if the current load direction is inactive, the state machine advances to an A/D on state 626. In the B/C on state 624, the outputs 610 and 612 and hence, the eighth and ninth switching elements (476 and 478) are rendered active, whereas the remaining outputs are inactive. In the A/D on state, the outputs 608 and 614 and hence the seventh and tenth switching elements (474 and 480) are rendered active whereas all other outputs are rendered inactive.

From the B/C on state 624 and from the A/D on state 626, the state machine may return to the off state 622 or may advance to one of four transition state branches enterable from the B/C on state 624 and the A/D on state 626 respectively.

The states enterable from the B/C on state 624 include a 3.25 microsecond B-A transition branch 628, a 2.25 microsecond B-A transition branch 630, a 1.25 microsecond B-A transition branch 632 and a deadtime transition branch 634. Similarly, the transition branches enterable from the A/D on state 626 include a 3.25 microsecond A-B transition branch 636, a 2.25 microsecond A-B transition branch 638, a 1.25 microsecond A-B transition branch 640 and the deadtime transition branch 634. Generally, transition branches 628, 630 and 632 are similar to corresponding branches 636, 638 and 640. Therefore, only branches 628–634 will be discussed, it being understood that branches 636–642 are similar.

Figure 13B:
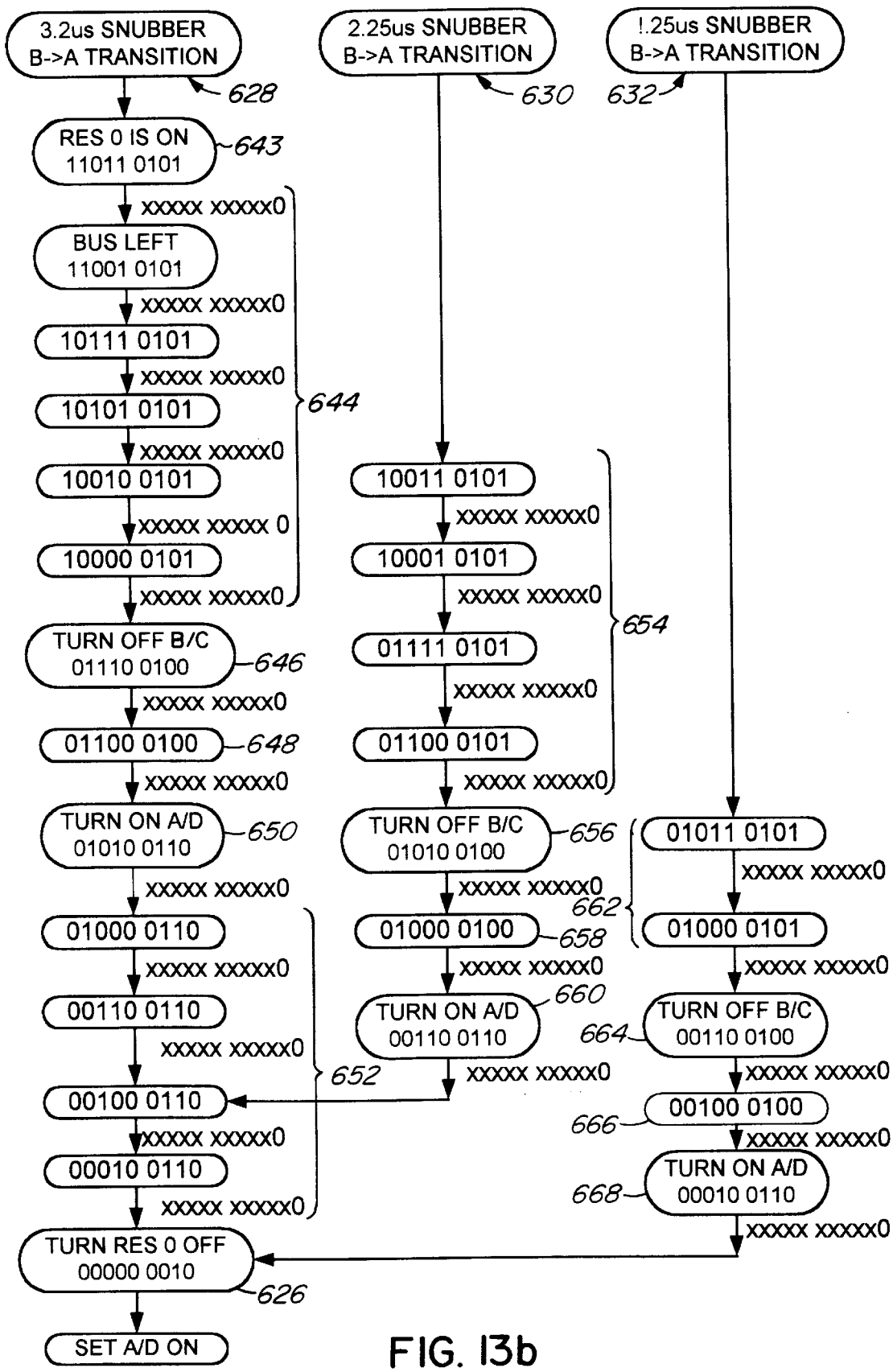
Figure 13C:
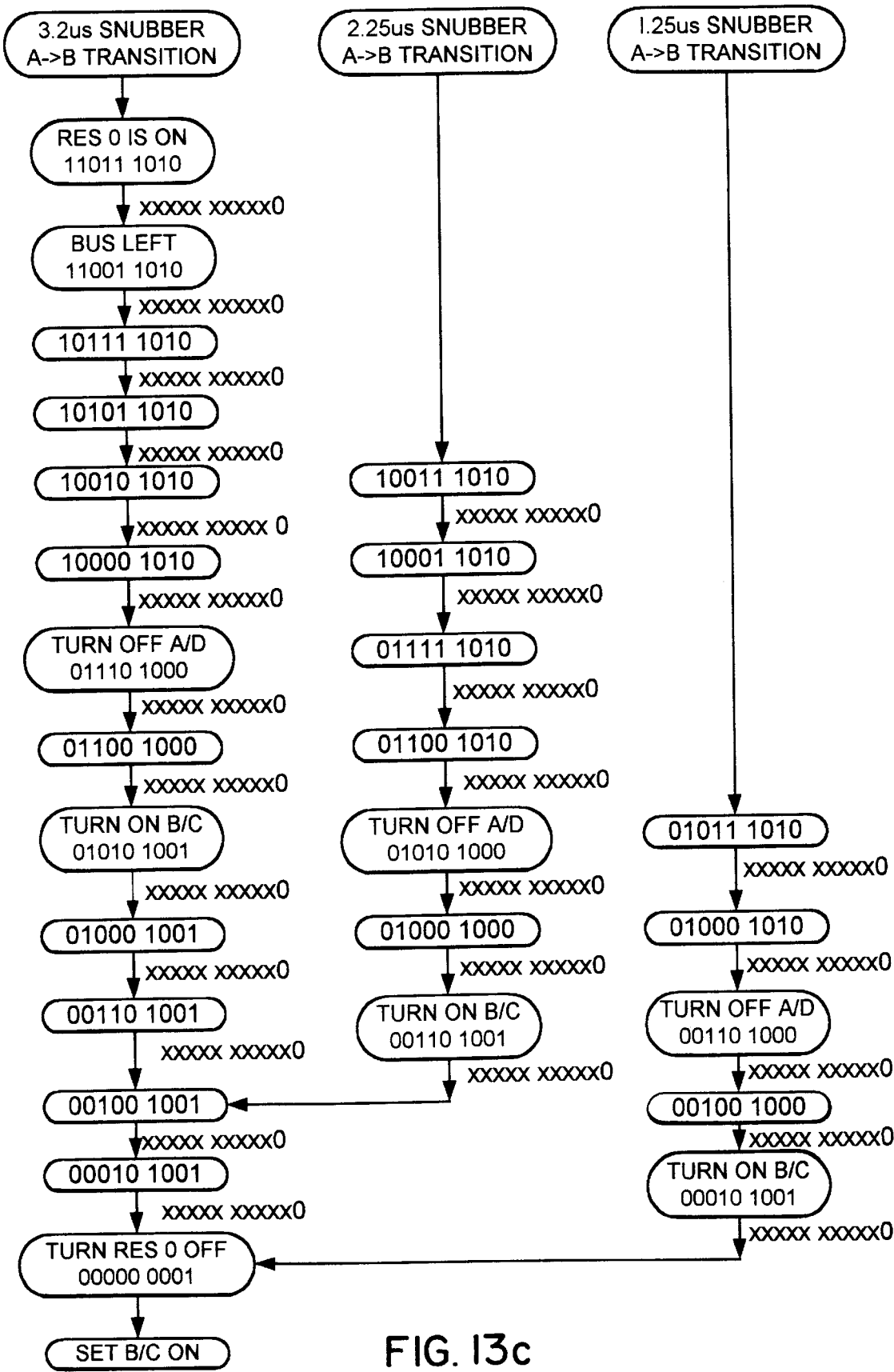

Referring to FIG. 13b, the 3.25 microsecond transition branch is shown generally at 628, the 2.25 microsecond transition branch is shown generally at 630 and the 1.25 microsecond transition branch is shown generally at 632. Each branch is entered according to values of the DC bus voltage input 594 and AC current input 596 according to the following table:

|                      | 120 < Vbus < 170 | 170 < Vbus < 240 |
|----------------------|------------------|------------------|
| 0A < Iout ≤ 10A      | 2.25             | 1.25             |
| 10A < Iout ≤ 30A     | 3.25             | 2.25             |
| 30A < Iout ≤ 50A     | N/A              | 3.25             |

Upon entering the 3.25 microsecond transition branch, the state machine enters state 643 in which output 618 controlling the twelfth switching element 480 is rendered active while the remaining outputs remain inactive (i.e., switching elements off). A first plurality of states shown generally at 644 acts as a time delay path, during which outputs 610/612 controlling the eighth and ninth switching elements are kept in an on state while outputs 608/614 controlling the seventh and tenth switching elements are kept in an off state and output 618 controlling the twelfth switching element 480 is kept in an on state while output 616 controlling the eleventh switching element is kept in an off state.

The state machine then enters a turn off B/C state 646 which turns off outputs 610 and 612, turning off the eighth and ninth switching elements keeps outputs 608 and 614 controlling the seventh and tenth switching elements in an off state and keeps outputs 616 and 618 controlling the eleventh and twelfth switching elements as they were during the delay states 644.

The state machine then encounters a single delay state 648 and then enters a turn on A/D state 650 wherein outputs 608 and 614 are turned on, turning on the seventh and tenth switching elements while outputs 610 and 612 controlling the eighth and ninth switching elements remain in an off state and outputs 616 and 618 controlling the eleventh and twelfth switching elements remain as before.

The state machine then encounters a second plurality of delay states 652 after which the state machine returns to the A/D on state 626 wherein output 618 is rendered inactive thereby turning off the twelfth switching element.

The state machine resumes operation back at the A/D on state 626 of FIG. 13a.

Referring back to FIG. 13b, the 2.25 microsecond B-A transition branch 630 includes a third plurality of delay states 654 including two less states than the first plurality 644. Thus, the time delay is less than that provided in branch 628. The third plurality of delay states is succeeded by a turn off B/C state 656 in which outputs 610 and 612 controlling the eighth and ninth switching elements are rendered inactive, the remaining outputs remaining the same.

The turn off B/C state 656 is followed by a single delay state 658 which is followed by a turn on A/D state 660 which renders the outputs 608 and 614 active, thereby turning on the seventh and tenth switching elements. The remaining outputs stay the same.

The state machine then enters a portion of the second plurality of delay states 652 and proceeds to the A/D on state 626 as described above.

Still referring 13b, the 1.25 microsecond B-A transition branch 632 includes a fourth plurality of delay states 662 followed by a third turn off B/C state 664 which renders outputs 610 and 612 inactive, thereby turning off the eighth and ninth switching elements, the remaining outputs staying the same. The turn off B/C state is followed by a single delay state 666 which is followed by a third turn on A/D state 668 which renders the outputs 608 and 614 active, thereby turning on the seventh and tenth switching elements the remaining outputs remaining the same. The state machine is then directed to the A/D on state 626 shown in FIG. 13a.

Figure 13D:
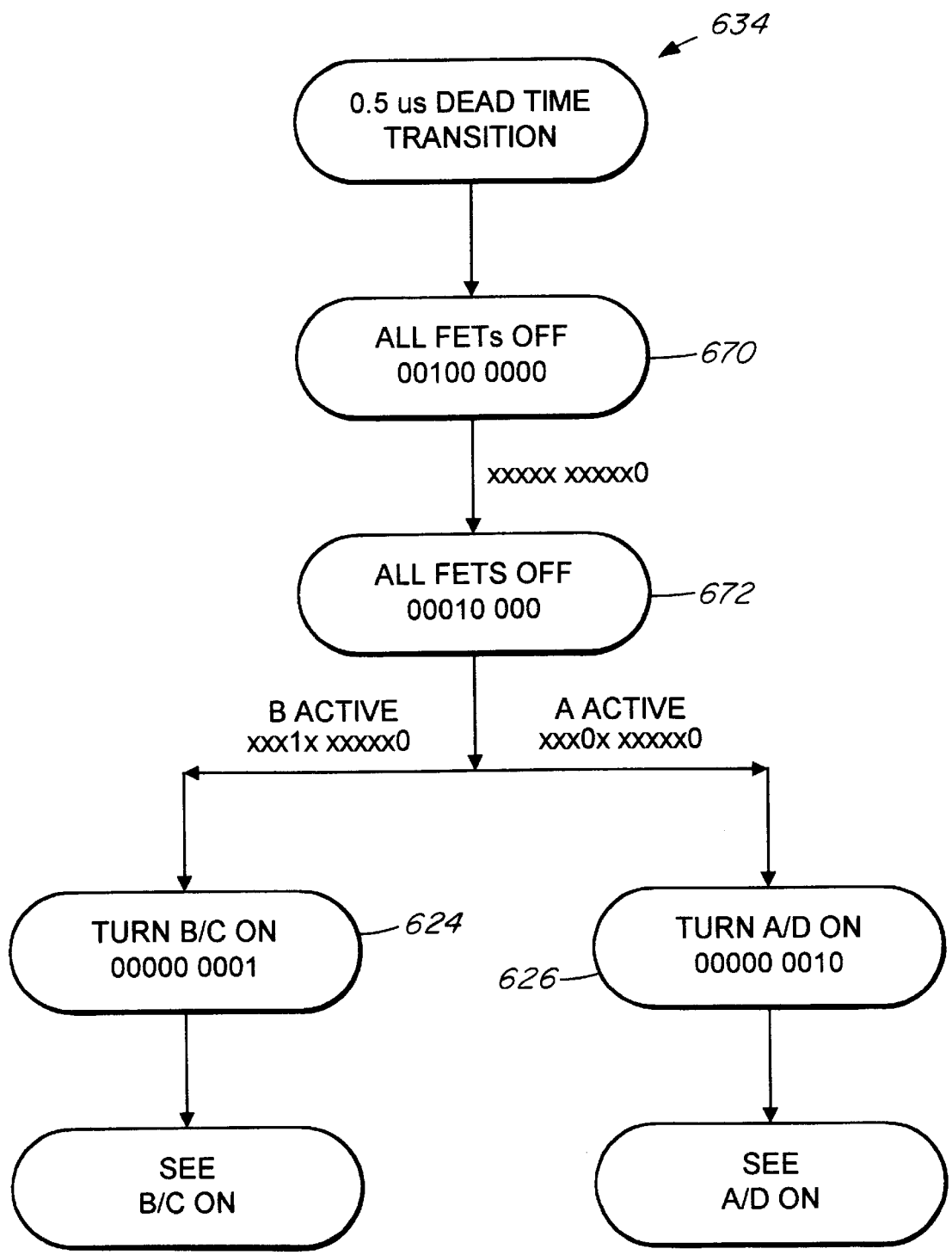

Referring to FIG. 13d, the deadtime transition branch is shown generally at 634. This branch includes a FETs off state 670 in which all outputs are set inactive, thereby turning off all switching elements of the full bridge converter 470.

Then, regardless of the states of the inputs, and assuming the reset input is inactive, a first delay state 672 is assumed. In this state, the outputs remain inactive. Then, if the current load direction is active, the state machine enters the B/C on state 624 or if the current load direction signal is inactive, the state machine enters the A-D on state 626 shown in FIG. 13a.

Referring back to FIG. 3, effectively, the gate drive decoder circuit 568 generates switching element control signals for controlling the seventh, eighth, ninth tenth, eleventh and twelfth switching elements 474, 476, 478, 480, 510 and 512 in response to the width-modulated pulse stream. It will be appreciated that the seventh and tenth switching elements 474 and 480 are switched in unison, between a conducting state and a non-conducting state and the eighth and ninth switching elements 476 and 478 are switched in unison, between a conducting state, and a non-conducting state such that a deadtime is provided when switching the seventh and tenth switching elements 474 and 480 from a conducting state to a non-conducting state and when switching the eighth and ninth switching elements 476 and 478 between the conducting state and the non-conducting state, the deadtime being a period during which each of the seventh, eighth, ninth and tenth switching elements 474, 476, 478 and 480 is in a non-conducting state.

Generally, an increase in AC output voltage is corrected by reducing the duty cycle signal command received at the third pulse width modulator 566. Any increase in current detected at the sense resistor 570 is met with an increase in the duty command signal. In this manner, power flow from the DC bus to the AC port is controlled.

Any DC offset voltage detected in the AC port output, is subtracted from the sinewave reference by the sixth subtracter 540. At the pulse width modulator 466, this has the effect of changing the width of the pulses cycle to reduce the DC voltage appearing at the AC port 22.

In addition, the load current sensed by the low resistance sense resistor 570 and indicated by the analog to digital converter 562, is used to adjust the gain of the magnetization compensation circuit 564 to account for non linearities in the B-H magnetization curve of the first and second filter inductors 496 and 498.

DC to AC Converter Operation in Charger Mode

Referring to FIG. 12, in the charger mode, an AC voltage is applied by the AC source 38 to the AC port 22. The DC to AC converter 18 acts as a unity power rectifier to transfer power to the DC bus 24 in order to maintain the DC bus voltage at its regulated value. In order to operate at unity power factor, the converter must draw a sinusoidal current from the AC port, in phase with the applied voltage. Thus, the current waveform reference signal produced by the first signal conditioner 544 is derived from the AC input voltage.

The current waveform reference signal is multiplied by the output of the eighth subtracter 551 which produces the current command signal in response to the bus voltage reference and the DC bus voltage. Thus, the current waveform reference signal is increased or decreased by an amount indicated by the difference between the DC bus voltage and the DC bus voltage reference. The signal so produced acts as the current command signal from which the input current feedback signal is subtracted by the ninth subtracter 558 to produce the third duty cycle command signal for controlling the pulse width modulator, which operates as described above to control the gate drive decoder as described above.

The circuit topologies described above enable the apparatus to employ unidirectional switches and decouples the DC to DC converter 12 from the DC to AC converter 18 which eliminates the need for synchronization between these converters as is normally found in the prior art. This reduces cost and complexity and increases power conversion efficiency, despite the use of separate DC to DC and DC to AC converters to achieve overall DC to AC inversion and overall charging functions. At the same time, because the DC to DC converter 12 and DC to AC converter 18 are decoupled, the DC to AC converter can be independently controlled to receive power from the AC port 22 at virtually a unity power factor. In addition, referring to FIG. 3, the use of the DC offset correction circuit in the apparatus reduces any DC component in the AC output voltage, which might saturate motors or transformers in AC load equipment.

Alternatives

If the apparatus is to be used with a 12 volt DC source/load and a 220 volt AC source/load, the primary winding of the transformer is formed to include two turns and the primary winding is formed to include 23 turns.

It will be appreciated that the power MOSFETs used in the third, fourth, fifth and sixth switching elements may be replaced with IGBTs or with power MOSFETs having integral fast recovery antiparallel diodes, in which case the fast recovery diode shown in FIG. 5 is not required.

Referring to FIG. 2, it should be noted that in the embodiment described, first and second clamping circuits 210 and 212 were described. It will be appreciated that a cost saving may be obtained by using only one clamping circuit in which case the first and second clamp diodes 214 and 224 are connected to the input 220 of the first clamping circuit 210, for example.

FIG. 14

Figure 14:
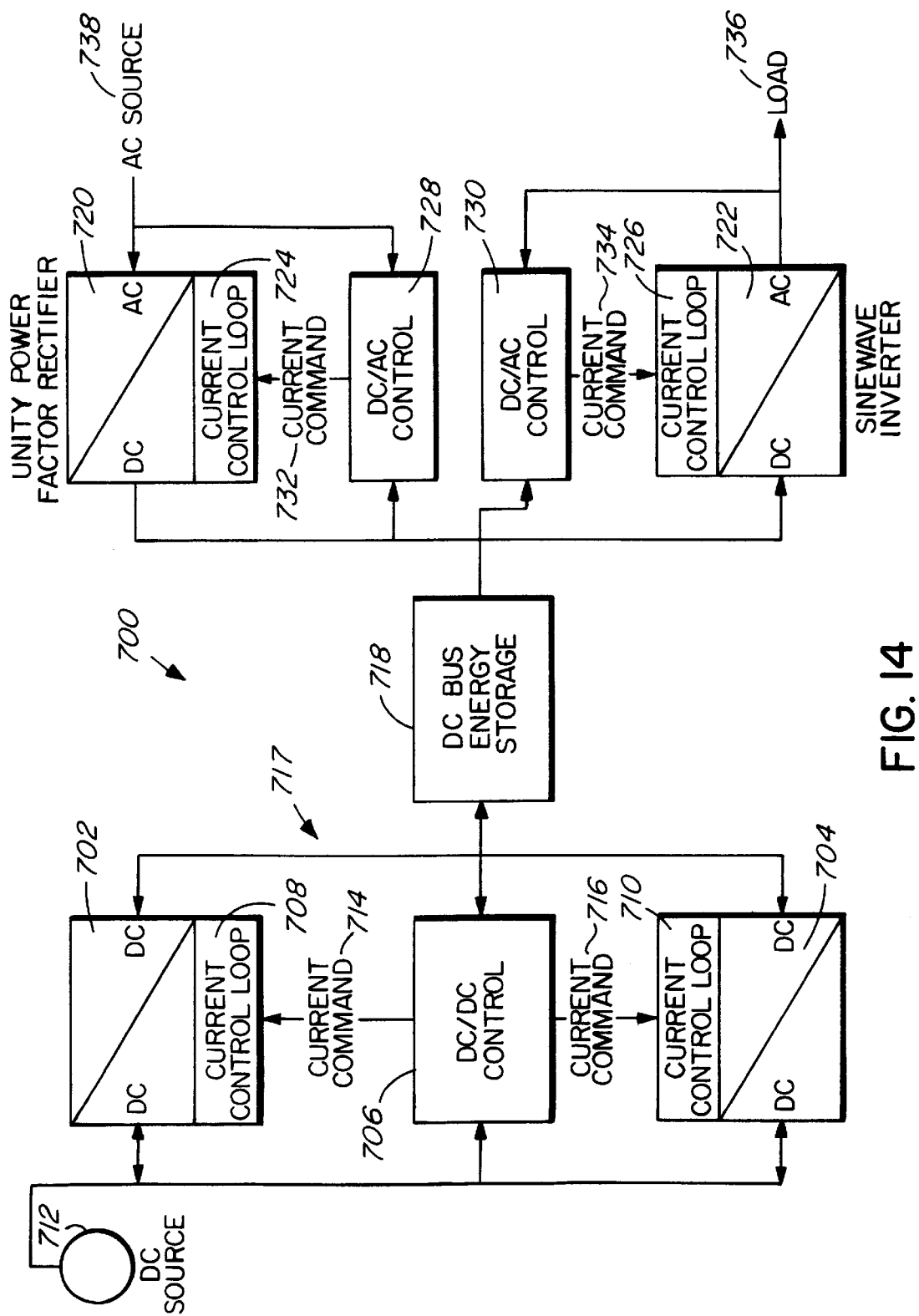
FIG. 14 is a block diagram of an un-interruptible power supply apparatus, according to a second embodiment of the invention.

Referring to FIG. 14, an apparatus according to a second embodiment of the invention is shown generally at 700. The apparatus includes first and second DC/DC converters 702 and 704 of the type described in connection with the first embodiment and a DC/DC control circuit 706. The first and second DC/DC converters include first and second current control loops 708 and 710 respectively, in communication with the DC/DC control unit 706. In this embodiment, the first and second control loops are similar to the bridge current feedback signal generator 368 shown in FIG. 1, and the DC/DC control unit includes two bridge current command signal generators similar to that shown at 366 in FIG. 2. Each DC/DC converter 702 and 704 receives DC power from a common DC source 712. The DC/DC control unit 706 issues first and second current commands 714 and 716 to control the flow of power from the DC source 712 through the DC/DC converters 702 and 704 to a DC bus and DC bus energy storage element 718. The DC/DC converters 702 and 704 thus act as a DC/DC conversion stage 717.

The apparatus further includes first and second DC/AC converters 720 and 722 including respective current control loops 724 and 726 and respective DC/AC control circuits 728 and 730 which issue respective current command signals 732 and 734 to respective current control loops 724 and 726 respectively. The first DC/AC converter 720 receives and transfers power from an AC source 738 to the DC bus energy storage element 718 and the DC/AC control circuit 728 controls the flow of power from the AC source 738 to the DC bus energy storage element 718.

The second DC/AC converter 722 draws power from the DC bus energy storage element 718 and supplies power to an AC load 736 under the control of the second DC/AC control unit 730.

The current control loops 724 and 726 are similar to the third switching control circuit 530 shown in FIG. 3 and the first DC/AC control circuit 728 is similar to the charge mode control circuit 528 shown in FIG. 12. The second DC/AC control circuit 730 is similar to the inverter mode control circuit 526 shown in FIG. 3.

The use of the plurality of DC/DC converters for providing energy to the DC bus energy storage element 718 increases the power which may be supplied to the DC bus energy storage element. By employing the control circuits of the first embodiment, power sharing among modules is guaranteed as each module acts as a controlled current source. Modules with different power ratings can be employed by appropriately scaling the current commands to different modules. Effectively in the apparatus shown, the first and second DC/DC converters and the first DC/AC converter 720 may supply power to the DC bus energy storage element 718 and the second DC/AC converter 722 receives power from the DC bus energy storage element 718.

When the DC/AC converter 720 supplies power, however, the first and second DC/DC converters may be shut off. The apparatus may thus act as an un-interruptible power supply as when the AC source 738 is unable to supply power, power demands at the load can be met by the DC/DC converters 702 and 704 supplying power to the DC bus energy storage element and the second DC/AC converter drawing power therefrom. When power is restored to the AC source 738, the DC/AC converter 720 again supplies power to the DC bus energy storage element 718, along with the first and second DC/DC converters. To the load, this is seen as an uninterrupted source of power.

Figure 15:
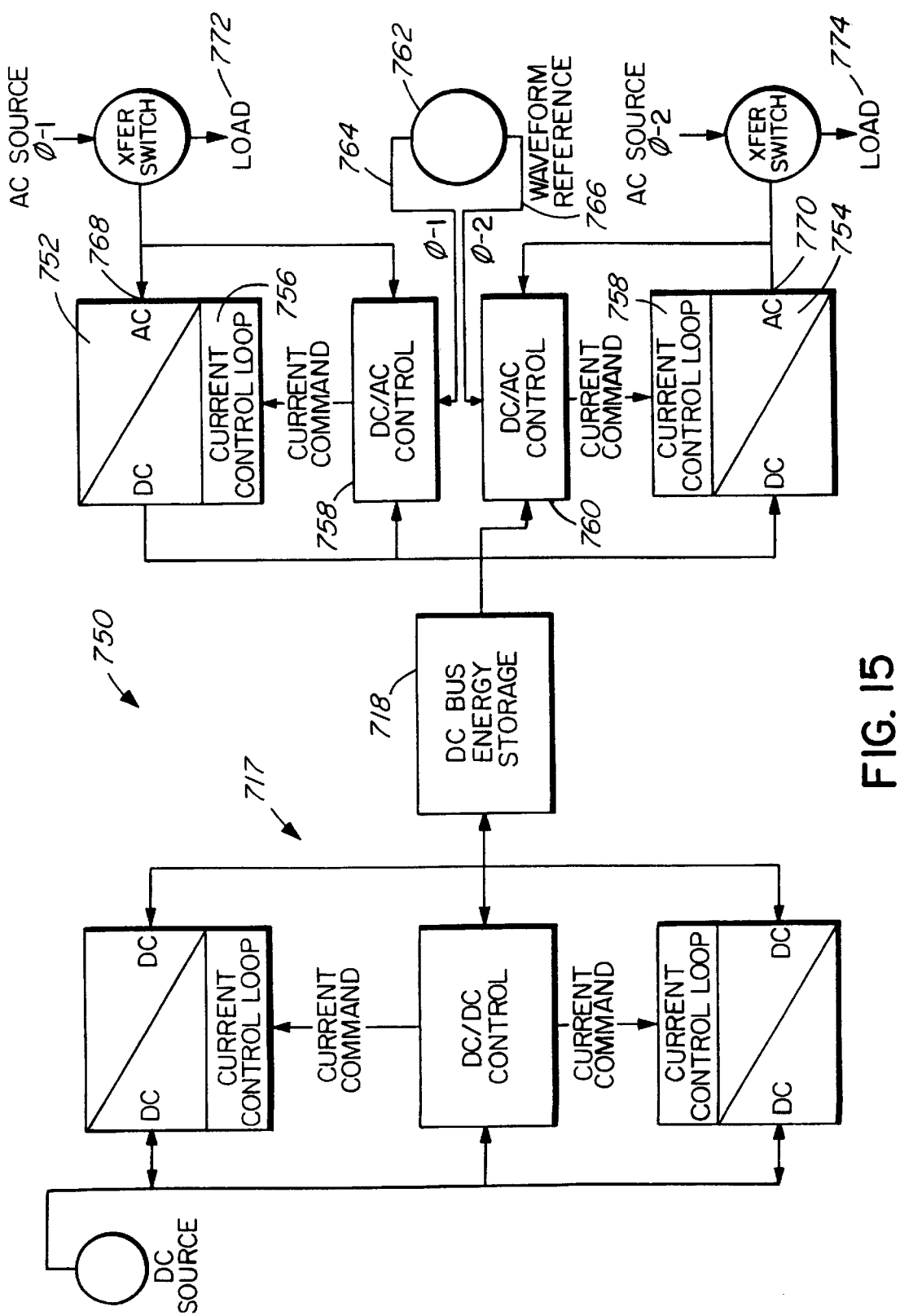
FIG. 15 is a block diagram of a multiphase converter apparatus, according to a third embodiment of the invention.

Referring to FIG. 15, an apparatus according to a third embodiment of the invention is shown generally at 750. This embodiment includes a DC/DC stage 717 and a DC bus energy storage element 718 identical to that shown in FIG. 14. In addition, the apparatus includes a first DC/AC converter 752 and a second DC/AC converter 754 having respective current control loops 756 and 758 respectively. The current control loops are the same as that shown in FIG. 3 with the exception that the inverter mode control circuit 526 shown in FIG. 3 is replaced with separate DC/AC control circuits 758 and 760 for controlling the first and second DC/AC converters 752 and 754 respectively. The DC/AC control circuits are essentially similar to the inverter mode control circuit 526 shown in FIG. 3, with the exception that each receives a separate sinewave reference signal produced by a reference signal generator seen as 762 in FIG. 15.

In the embodiment shown in FIG. 15, the waveform reference signal generator 762 produces first and second waveform signals on signal lines 764 and 766 respectively each of the waveform reference signals being identical but 180 degrees out of phase with each other. The effect on the circuit therefore, is to produce first and second AC power waveforms at outputs 768 and 770 of the first and second DC/AC converters 752 and 754 respectively for supplying power to separate loads 772 and 774. The apparatus thus acts as a split phase supply.

It will be appreciated that by replacing the waveform reference shown with a waveform reference having three outputs for producing three sinewave reference waveforms, each phase delayed by 120 degrees relative to the other, and by providing three DC/AC converters and associated control circuitry, the apparatus is operable to supply a three phase AC load.

Figure 16:
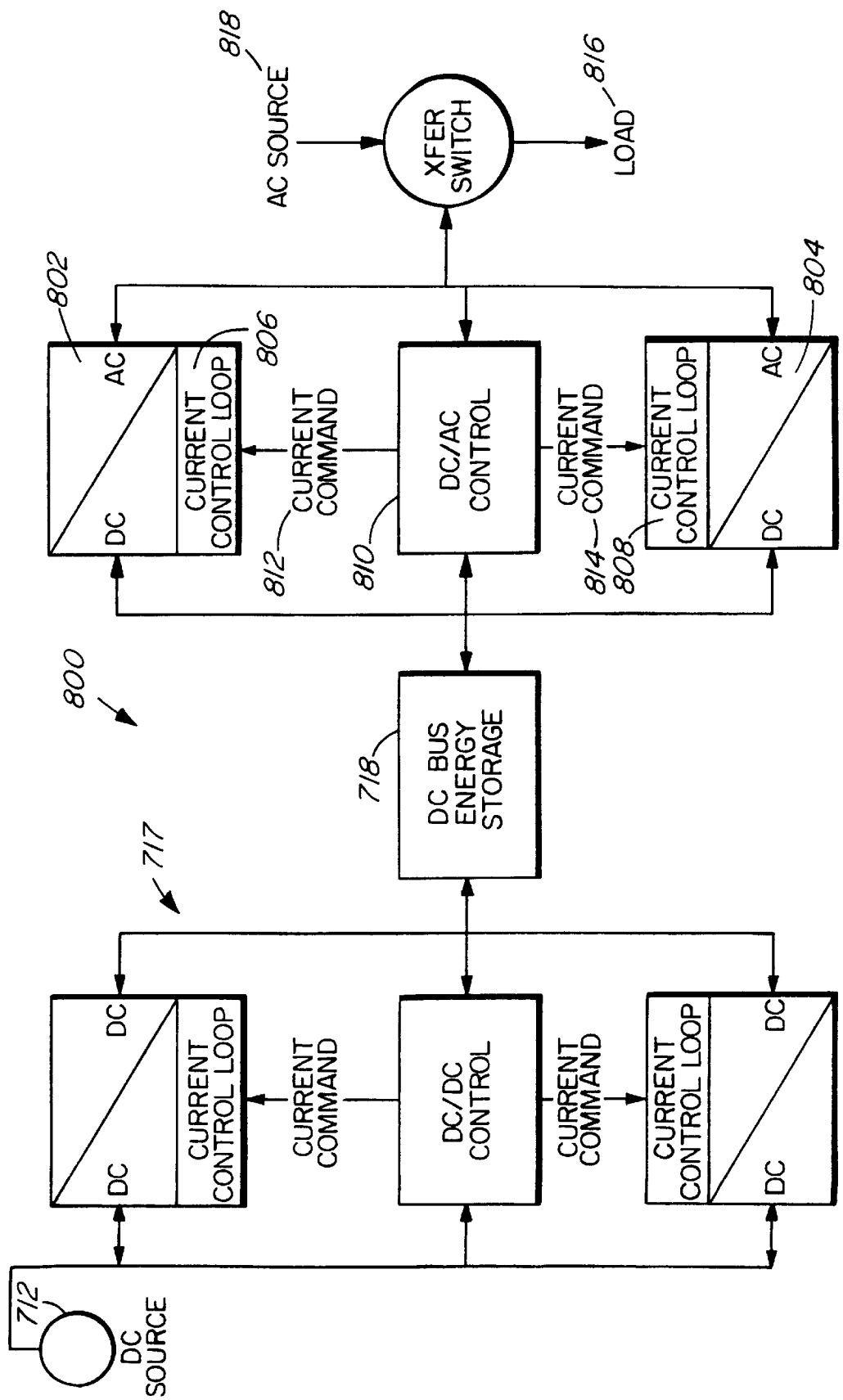
FIG. 16 is a block diagram of a high power conversion apparatus, according to a fourth embodiment of the invention.

Referring to FIG. 16, an apparatus according to a fourth embodiment of the invention is shown generally at 800. The apparatus includes a DC/DC stage 717 and a DC bus energy storage element 718, identical to those shown in FIGS. 14 and 15. The apparatus further includes first and second DC/AC converters 802 and 804 having first and second current control loops 806 and 808 respectively, the current control loops being identical to the third switching control circuit 530 shown in FIG. 3. A DC/AC control circuit 810 provides first and second current commands 812 and 814 to the first and second current control loops 806 and 808 respectively to control and balance power flow through each DC/AC converter 802 and 804 to the load 816. The DC/AC control circuit 810 effectively includes two inverter mode control circuits similar to that shown at 526 in FIG. 3, and two charge mode control circuits similar to that shown at 528 in FIG. 12.

Similarly, the DC/AC converters may operate in a charge mode wherein power is drawn from an AC source 818 through the first and second DC/AC converters 802 and 804 to supply power to the DC bus energy storage element 718 whereupon power is drawn through the DC/DC converter stages and supplied to the DC source 712. Effectively, this apparatus involves parallel operation of DC/DC converters and parallel operation of DC/AC converters to increase power capacity.

Figure 17:
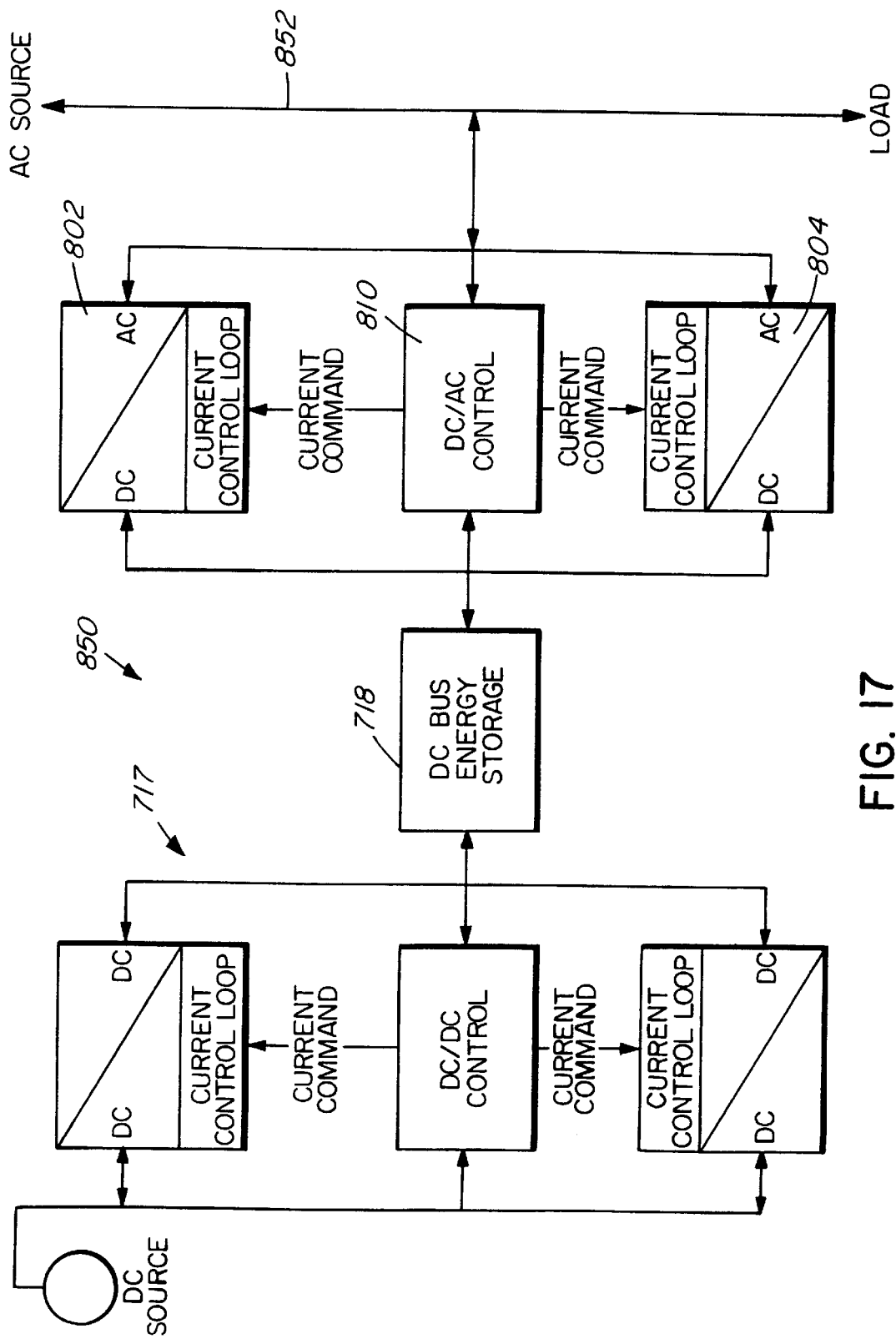
FIG. 17 is a block diagram of a converter apparatus for grid-tie operation, according to a fifth embodiment of the invention.

Referring to FIG. 17, an apparatus according to a fifth embodiment of the invention is shown generally at 850. The apparatus includes a DC/DC converter stage shown generally at 717 and a DC bus energy storage element 718 identical to those shown in FIGS. 14, 15 and 16. In addition, the apparatus includes first and second DC/AC converters 802 and 804 and associated control circuitry as shown in FIG. 16. In this embodiment, the DC/AC converters are connected directly to an AC power grid 852. The AC power grid provides a stable reference voltage and therefore this voltage is used in the DC/AC control circuit 810 to control the first and second DC/AC converters 802 and 804 respectively. Thus, the apparatus transfers current to and from the AC grid in phase with the AC grid voltage. This has application in distributed generation and battery energy storage systems in which a plurality of small, dispersed energy generation and/or storage systems are connected to the power grid.

Figure 18:
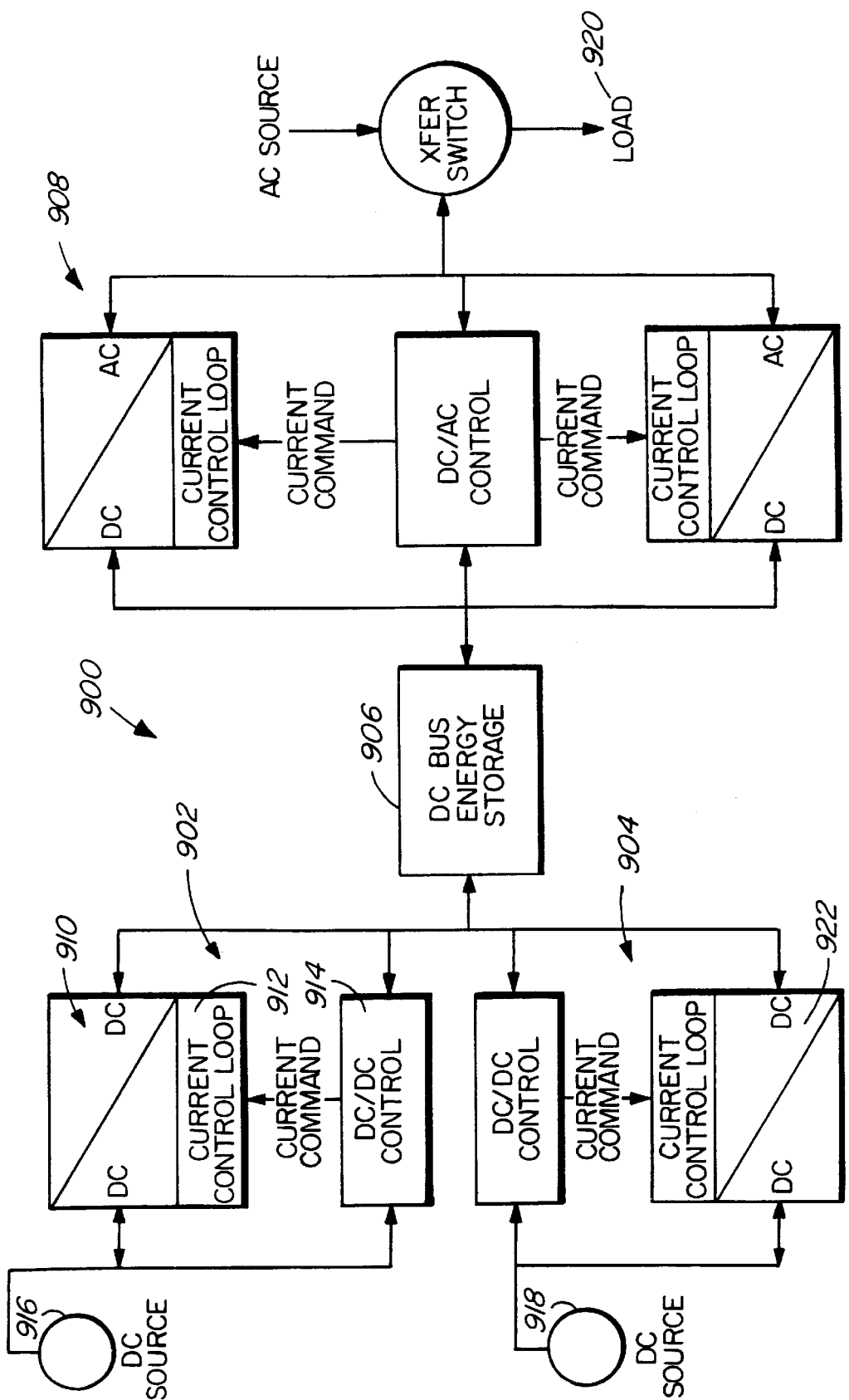
FIG. 18 is a block diagram of a converter apparatus for use with a plurality of separate DC sources, according to a sixth embodiment of the invention.

Referring to FIG. 18, an apparatus according to a sixth embodiment of the invention, includes first and second DC/DC stages 902 and 904, a DC bus energy storage element 906 and a DC/AC stage 908, the DC bus energy storage element 906 and the DC/AC stage 908 being similar to those shown in FIG. 16.

The first DC/DC stage 902 includes a first DC/DC converter 910 having a current control loop 912 and a DC/DC control circuit 914. The DC current control loop 912 is essentially the same as the current control loop circuit 276 shown in FIG. 2 and the DC/DC control circuit 914 is effectively the same as the voltage control loop circuit 278 shown in FIG. 2. The DC/DC control circuit 914 also includes a second switching control circuit as shown at 360 in FIG. 7 for controlling the flow of power from the DC bus energy storage element 906 to a first source 916.

The second DC/DC stage 904 includes a second DC/DC converter 922 and a second DC/DC control circuit effectively the same as the voltage control loop circuit 278 shown in FIG. 2. The second DC/DC converter includes a current control loop effectively the same as the current control loop circuit 276 shown in FIG. 2.

Each DC/DC stage 902 and 904 operates independently and is connected to the first DC source 916 and a second DC source 918 respectively. In this embodiment, the first DC source 916 is a conventional battery and the second DC source is 918 is a photovoltaic array. In this apparatus, power from the photovoltaic array is stored at the DC bus energy storage element 906 and can be supplied to the first DC source 916 or can be used by the AC load 920 connected to the DC/AC stage. Energy stored in the first DC source 916 can supplement or replace power from the photovoltaic array to operate the AC load, as required.

While specific embodiments of the invention have been described and illustrated, such embodiments should be considered illustrative of the invention only and not as limiting the invention as construed in accordance with the accompanying claims.

What is claimed is:

1. A power converter apparatus comprising:
   a) a first DC to DC converter having a first DC port connectable to a DC sources and a second DC port, said first DC to DC converter being controllable as a current fed transformer isolated boost step up converter to transfer energy from said first DC port to said second DC port;
   b) a DC to AC converter having a third DC port and an AC port, said third DC port being connected to said second DC port and said AC port being connectable to an AC load; and
   c) a load balancing energy storage element connected to said second DC port for decoupling said DC to DC converter from said DC to AC converter by supplying energy to said third DC port when a voltage at said second DC port is tending to decrease and for storing energy received from said second DC port when a voltage at said third port is tending to increase.

2. An apparatus as claimed in claim 1 wherein said first DC to DC converter is controllable as a voltage fed transformer isolated buck step down converter for transferring energy from said second DC port to said first DC port and wherein said DC to AC converter is bidirectional.

3. An apparatus as claimed in claim 2 further including a DC bus connecting said second and third DC ports together for transferring energy between said DC to DC converter and said DC to AC converter, said load balancing energy storage element decoupling said DC to DC converter from said DC to AC converter by supplying energy to said DC bus when a voltage at said DC bus is tending to decrease and for storing energy received from said DC bus when a voltage at said DC bus is tending to increase.

4. An apparatus as claimed in claim 3 where in said load balancing energy storage element includes a capacitor.

5. An apparatus as claimed in claim 3 wherein said DC to DC converter includes a first power control circuit and said DC to AC converter includes a second power control circuit, said first and second power control circuits operating independently of each other.

6. An apparatus as claimed in claim 3 wherein said first DC to DC converter includes:
   a) a centre-tapped transformer having a centre-tapped primary winding having a number of turns, first and second primary winding terminals and a centre-tap terminal and a secondary winding having first and second secondary winding terminals;
   b) an input inductor connected between said centre-tap terminal and a first terminal of said first DC port; and
   c) first and second switching elements connected between said first and second primary winding terminals respectively and a second terminal of said first DC port.

7. An apparatus as claimed in claim 6 wherein said first and second switching elements are unidirectional.

8. An apparatus as claimed in claim 6 wherein said first and second switching elements include transistors.

9. An apparatus as claimed in claim 6 wherein said DC to DC converter includes a first inverter mode control circuit for controlling power flow from said first DC port to said DC bus, and a first charge mode control circuit for controlling power flow from said DC bus to said first DC port.

10. An apparatus as claimed in claim 6 wherein said DC to DC converter includes a first inverter mode control circuit for controlling power flow in said DC to DC converter.

11. An apparatus as claimed in claim 10 wherein said first inverter mode control circuit is operable to control said DC to DC converter as a push-pull, current-fed transformer-isolated boost converter.

12. An apparatus as claimed in claim 10 wherein said first inverter mode control circuit includes:
   a) a current control loop circuit for generating a current feedback signal responsive to current at said first DC port;
   b) a voltage control loop circuit for generating a current command signal in response to DC bus voltage; and
   c) a first switching control circuit for producing switching control signals in response to said current feedback signal and said current command signal for controlling switching of said first and second switching elements.

13. An apparatus as claimed in claim 12 wherein said voltage control loop circuit includes:
   a) a DC bus voltage feedback signal generator for generating a DC bus voltage feedback signal indicative of said DC bus voltage; and
   b) a non-linear voltage loop compensation network responsive to said DC bus feedback signal for producing said current command signal, said non-linear voltage loop compensation network having a relatively slow response in changing said current command signal when said DC bus voltage feedback signal is changing relatively slowly and said non-linear voltage loop compensation network having a relatively fast response in changing said current command signal when said DC bus voltage feedback signal is changing relatively quickly.

14. An apparatus as claimed in claim 13 wherein said voltage control loop circuit includes:
   a) a DC bus voltage reference source for producing a DC bus voltage reference signal; and
   b) a first subtracter for subtracting said DC bus voltage reference signal from said DC bus voltage feedback signal to produce a first voltage error signal, said voltage error signal being communicated to said non-linear voltage loop compensation network, and wherein said non-linear voltage loop compensation network produces said current command signal in response to said voltage error signal.

15. An apparatus as claimed in claim 14 wherein said non-linear voltage loop compensation network includes a first low pass filter and at least one diode in parallel with said first low pass filter, said diode being operable to forward conduct when said voltage error signal changes at a rate at which an instantaneous voltage drop across said low pass filter exceeds a pre-defined value.

16. An apparatus as claimed in claim 12 wherein said first switching control circuit includes:
   a) a second subtracter for subtracting said current feedback signal from said current command signal to produce a first current error signal;
   b) a second low pass filter for filtering said first current error signal to produce a duty cycle command signal; and
   c) a first pulse width modulator for producing first and second switching signals for placing said first and second switching elements respectively in conducting and non-conducting modes for periods of time dependent on said duty cycle command signal.

17. An apparatus as claimed in claim 16 wherein said first pulse width modulator includes first and second waveform generators for generating first and second waveforms 180 degrees out of phase with each other, said first and second waveforms including at least an on state and an off state and having a first duty cycle, said first and second waveforms being supplied to said first and second switching elements respectively to place said switching elements in conducting and non-conducting modes according to said on and off states respectively, of said first and second waveforms respectively.

18. An apparatus as claimed in claim 10 wherein said first inverter mode control circuit has a first circuit portion connected to said primary winding and a second circuit portion connected to said DC bus, and a first isolator for isolating said first circuit portion from said second circuit portion while providing for communication between said first and second circuit portions.

19. An apparatus as claimed in claim 18 wherein said first isolator includes an optical isolator.

20. An apparatus as claimed in claim 6 further including at least a first clamping circuit for controlling the voltage across at least one of said first and second switching elements.

21. An apparatus as claimed in claim 20 wherein said first clamping circuit includes a second DC to DC converter connected between said at least one of said first and second switching elements and said first terminal of said DC port.

22. An apparatus as claimed in claim 6 wherein said DC to DC converter includes a first charge mode control circuit for controlling power flow from said DC bus to said first DC port.

23. An apparatus as claimed in claim 22 wherein said first and second switching elements include first and second low voltage MOSFET transistors having first and second anti-parallel diodes respectively.

24. An apparatus as claimed in claim 23 wherein said first charge mode control circuit is operable to control said DC to DC converter as a full-bridge voltage fed transformer-isolated buck step-down converter.

25. An apparatus as claimed in claim 6 further including third, fourth, fifth and sixth switching elements connected to said secondary winding in a full bridge topology.

26. An apparatus as claimed in claim 25 wherein said first DC to DC converter includes a second switching control circuit in communication with said third, fourth, fifth and sixth switching elements for controlling conduction of said third, fourth, fifth and sixth switching elements to produce a high frequency voltage waveform across said secondary winding.

27. An apparatus as claimed in claim 26 wherein said second switching control circuit includes a switching signal generator for generating third, fourth, fifth and sixth control signals responsive to voltage at said first DC port and current at said second DC port, said third, fourth, fifth and sixth control signals being operable to place said third, fourth, fifth and sixth switching elements in conducting and non-conducting states.

28. An apparatus as claimed in claim 27 wherein said control signal generator includes:
   a) a bridge current command signal generator for producing a bridge current command signal in response to voltage and current at said first DC port;
   b) a bridge current feedback signal generator for producing a bridge current feedback signal in response to current drawn at said second DC port;
   c) a third subtracter for subtracting said bridge current feedback signal from said bridge current command signal to produce a duty cycle command signal; and
   d) a second pulse width modulator responsive to said duty cycle command signal for producing said third, fourth, fifth and sixth switching signals operable to control switching of said third, fourth, fifth and sixth switching elements.

29. An apparatus as claimed in claim 28 wherein said bridge current feedback signal generator includes:
   a) first and second current sense signal generators for generating first and second current sense signals representing current flow in said fourth and sixth switching elements respectively;
   b) a summer for summing said first and second current sense signals to produce a raw bridge current feedback signal; and
   c) a third low pass filter for filtering said raw bridge current feedback signal to produce said bridge current feedback signal.

30. An apparatus as claimed in claim 29 wherein said bridge current command signal generator includes:
   a) a current error signal generator for generating a second current error signal in response to current flow at said first DC port;
   b) a voltage error signal generator for generating a second voltage error signal in response to voltage at said first DC port;
   c) a signal selector having first and second inputs for receiving said second current error signal and said second voltage error signal and an output for producing a lesser output signal responsive to the lesser of said second current error signal and said second voltage error signal;
   d) a second isolator having an input electrically connected to said first DC port, for receiving said lesser output signal and an output electrically connected to said DC bus for providing said bridge current command signal to said third subtracter, said input and output being electrically isolated from each other.

31. An apparatus as claimed in claim 30 wherein said current error signal generator includes:

a) a charging current signal generator for generating a charging current signal indicative of current at said first DC port;
   b) a fourth low pass filter for filtering said charging current signal to produce a filtered charging current signal;
   c) a charge current command signal generator for generating a charging current command signal indicative of a desired charging current; and
   d) a fourth subtracter for subtracting said filtered charging current signal from said charge current command signal to produce said second current error signal.

32. An apparatus as claimed in claim 30 wherein said voltage error signal generator includes:
   a) a charging voltage signal generator for generating a charging voltage signal indicative of voltage at said first DC port;
   b) a charging voltage reference signal generator for generating a charging voltage reference signal indicative of a desired charging voltage;
   c) a fifth subtracter for subtracting said charging voltage signal from said charging voltage reference signal to produce a raw voltage error signal; and
   d) a second non-linear voltage loop compensation network for filtering said raw voltage error signal to produce said second voltage error signal.

33. An apparatus as claimed in claim 32 wherein said second non-linear voltage loop compensation network includes a fifth low pass filter.

34. An apparatus as claimed in claim 32 wherein said second non-linear voltage loop compensation network has a relatively slow loop response when said raw voltage error signal is changing relatively slowly and a relatively fast loop response when said raw voltage error signal is changing relatively quickly.

35. An apparatus as claimed in claim 34 wherein said second non-linear voltage loop compensation network is operable to provide a slow response when said raw voltage error signal is changing relatively slowly and a fast response when said raw voltage error signal is changing relatively quickly.

36. An apparatus as claimed in claim 3 wherein said DC to AC converter includes:
   a) a full bridge converter having an input connected to said DC bus and a bridge output for providing a pulse width modulated waveform; and
   b) an AC output low pass filter having an input connected to said bridge output for receiving said pulse width modulated waveform and a filter output, said filter output acting as said AC port.

37. An apparatus as claimed in claim 36 wherein said full bridge converter includes seventh, eighth, ninth and tenth switching elements connected to said DC bus in a full bridge topology.

38. An apparatus as claimed in claim 37 wherein said DC to AC converter includes:
   a) an AC current sense signal generator for generating a AC current sense signal responsive to current at said bridge output;
   b) a DC bus voltage sense signal generator for generating a DC bus voltage sense signal responsive to voltage at said DC bus;
   c) an AC output voltage sense signal generator for generating an output voltage sense signal responsive to voltage at said bridge output;

d) an inverter mode current command signal generator for generating an inverter mode current command signal in response to said AC output voltage sense signal; and e) a third switching control circuit for producing switching signals for controlling said seventh, eighth, ninth and tenth switching elements in response to said inverter mode current command signal.

39. An apparatus as claimed in claim 37 wherein said DC to AC converter includes:

a) a DC bus voltage sense signal generator for generating a DC bus voltage sense signal responsive to voltage at said DC bus;

b) a DC bus voltage reference signal generator for generating a DC bus voltage reference signal;

c) a current waveform signal generator for generating a desired current waveform signal indicative of the desired current at said bridge output;

d) a charge mode current command signal generator for generating a charge mode command signal in response to said DC bus voltage sense signal, said DC bus voltage reference signal and said desired current waveform signal; and e) a third switching control circuit for producing switching signals for controlling said seventh, eighth, ninth and tenth switching elements in response to said charge mode command signal.

40. An apparatus as claimed in claim 37 wherein said DC to AC converter includes:

a) a DC bus voltage sense signal generator for generating a DC bus voltage sense signal responsive to voltage at said DC bus;

b) a DC bus voltage reference signal generator for generating a DC bus voltage reference signal;

c) a current waveform signal generator for generating a desired current waveform signal indicative of the desired current at said bridge output;

d) an AC current sense signal generator for generating an AC current sense signal responsive to current at said bridge output;

e) an AC output voltage sense signal generator for generating an AC output voltage sense signal responsive to voltage at said bridge output;

f) a charge mode current command signal generator for generating a charge mode command signal in response to said DC bus voltage sense signal, said DC bus voltage reference signal and said desired current waveform signal;

g) an inverter mode current command signal generator for generating an inverter mode current command signal in response to said DC bus voltage sense signal;

h) a third switching control circuit for producing switching signals for controlling said seventh, eighth, ninth and tenth switching elements in response to said AC current sense signal, said DC bus voltage reference signal and at least one of said charge mode command signal and said inverter mode current command signal; and i) a selector in communication with said charge mode current command signal generator, said inverter mode current command signal generator, and said third switching signal control circuit for selectively providing said inverter mode current command signal or said charge mode command signal to said third switching control circuit.

41. An apparatus as claimed in claim 40 wherein said inverter mode current command signal generator includes a DC offset correction circuit for varying said inverter mode current command signal in response to DC offset voltage at said bridge output.

42. An apparatus as claimed in claim 41 wherein said DC offset correction circuit includes:

a) a sixth low pass filter for producing a filtered DC offset signal in response to said AC output voltage sense signal;

b) a sinewave reference signal generator for generating a sinewave reference signal;

c) a sixth subtracter for subtracting said filtered DC offset signal from said sinewave reference signal to produce an output voltage command signal; and d) a seventh subtracter for subtracting said AC output voltage sense signal from said output voltage command signal to produce said current command signal.

43. An apparatus as claimed in claim 40 wherein said charge mode current command signal generator includes:

a) an eighth subtracter for subtracting said DC bus voltage sense signal from said DC bus voltage reference signal to produce an average current signal; and b) a multiplier for multiplying said average current signal by said desired current waveform signal to produce said charge mode command signal.

44. An apparatus as claimed in claim 40 wherein said third switching control circuit includes:

a) a third duty cycle command signal generator for generating a third duty cycle command signal indicative of a desired duty cycle of said seventh, eighth, ninth and tenth switching elements;

b) a third pulse width modulator for producing a width-modulated pulse stream in response to said third duty cycle command signal; and c) a gate drive decoder circuit for generating switching element control signals for controlling said seventh, eighth, ninth and tenth switching elements in response to said width-modulated pulse stream.

45. An apparatus as claimed in claim 44 wherein said gate drive decoder circuit includes a programmable array logic device.

46. An apparatus as claimed in claim 44 wherein said third switching control circuit includes a magnetization compensation circuit for compensating said third duty cycle command signal in response to the magnitude of current at said bridge output to compensate for magnetization effects in said AC output low pass filter.

47. An apparatus as claimed in claim 46 wherein said magnetization compensation circuit includes a variable gain amplifier in communication with said third pulse width modulator for amplifying said third duty cycle command signal to provide an amplified third duty cycle command signal to said third pulse width modulator, said variable gain amplifier having a gain dependent upon said AC current sense a signal.

48. An apparatus as claimed in claim 40 wherein said third switching control circuit is operable to switch said seventh and tenth switching elements in unison, between a conducting state and a non-conducting state and is operable to switch said eighth and ninth switching elements in unison, between a conducting state, and a non-conducting state such that a dead time is provided when switching said seventh and tenth switching elements from a conducting state to a non-conducting state and when switching said eighth and ninth switching elements between said conducting state and said non-conducting state, said deadtime being a period during which each of said seventh, eighth, ninth and tenth switching elements is in a non-conducting state.

49. An apparatus as claimed in claim 40 wherein said DC to AC converter includes a snubber circuit connected between said bridge output and said DC bus.

50. An apparatus as claimed in claim 49 wherein said snubber circuit includes:
 a) eleventh and twelfth switching elements connected to said bridge output;
 b) second and third inductors connected to said eleventh and twelfth switching elements respectively and connected to each other; and
 c) a diode connected to said second and third inductors and said DC bus.

51. An apparatus as claimed in claim 50 wherein said third switching control circuit is operable to control said eleventh and twelfth switching elements in response to said DC bus voltage sense signal and said AC current signal.

52. An apparatus as claimed in claim 51 wherein said third switching control circuit produces eleventh and twelfth switching signals for controlling said eleventh and twelfth switching elements to place said snubber circuit in communication with said bridge output for a period of time dependent upon current at the AC port and DC bus voltage.

53. An apparatus as claimed in claim 52 wherein said third switching control circuit is operable to vary said period of time in response to said DC bus voltage sense signal and said AC current sense signal.

54. A method of transferring power between a DC port and an AC port, the method including:
 a) selectively operating a DC to DC converter in at least one of a current fed transformer isolated boost mode and a voltage fed transformer isolated buck mode to transfer energy between said DC port and a DC bus;
 b) selectively operating a DC to AC converter in at least one of an invert mode and a charge mode to transfer energy between said DC bus and said AC port; and
 c) supplying energy to said DC bus from a load balancing energy storage element when a voltage at said DC bus is tending to decrease and storing energy from said DC bus in said energy storage element when a voltage at said DC bus is tending to increase.

55. A method as claimed in claim 54 further including the step of independently controlling the transfer of power between said DC port and said DC bus and the transfer of power between said DC bus and said AC port.

56. A method as claimed in claim 55 further including:
 a) generating a current feedback signal responsive to current at said DC port;
 b) generating a current command signal in response to DC bus voltage; and
 c) producing switching control signals in response to said current feedback signal and said current command signal for controlling switching of first and second switching elements in said DC to DC converter.

57. A method as claimed in claim 56 further including the steps of:
 a) generating a DC bus voltage feedback signal indicative of said DC bus voltage; and
 b) producing said current command signal with a non-linear voltage loop compensation network having a relatively slow response in changing said current command signal when said DC bus voltage changes relatively slowly and a relatively fast response in changing said current command signal when said DC bus voltage changes relatively quickly.

58. A method as claimed in claim 57 further including:
 a) producing said DC bus voltage reference signal; and
 b) subtracting said DC bus voltage reference signal from a DC bus voltage feedback signal to produce a first voltage error signal, and communicating said first voltage error signal to said non-linear voltage loop compensation network to produce said current command signal.

59. A method as claimed in claim 58 further including the step of rendering a diode connected between an input and an output of a low pass filter operable to forward conduct when said first voltage error signal changes at a rate at which an instantaneous voltage drop across said low pass filter exceeds a pre-defined value.

60. A method as claimed in claim 59 further including the steps of:
 a) subtracting said current feedback signal from said current command signal to produce a first current error signal;
 b) filtering said first current error signal with a second low pass filter to produce a first duty cycle command signal; and
 c) producing first and second switching signals for placing said first and second switching elements respectively in conducting and non-conducting modes for periods of time dependent on said first duty cycle command signal.

61. A method as claimed in claim 55 further including controlling switching of third, fourth, fifth and sixth switching elements connected to a secondary winding of said DC to DC converter, to produce a high frequency voltage waveform across said secondary winding.

62. A method as claimed in claim 61 further including the steps of:
 a) producing a bridge current command signal in response to voltage and current at said first DC port;
 b) producing a bridge current feedback signal in response to current drawn at said DC bus;
 c) subtracting said bridge current feedback signal from said bridge current command signal to produce a second duty cycle command signal; and
 d) producing third, fourth, fifth and sixth switching signals operable to control switching of said third, fourth, fifth and sixth switching elements in response to said second duty cycle command signal.

63. A method as claimed in claim 62 further including:
 a) generating current sense signals representing current flow in said fourth and sixth switching elements respectively;
 b) summing said first and second current sense signals to produce a raw bridge current feedback signal; and
 c) filtering said raw bridge current feedback signal to produce said bridge current feedback signal.

64. A method as claimed in claim 63 further including:
 a) generating a second current error signal in response to current flow at said DC port;
 b) generating a second voltage error signal in response to voltage at said DC port;
 c) producing a lesser output signal responsive to the lesser of said second current error signal and said second voltage error signal; and
 d) isolating said bridge current command signal prior to subtracting said bridge current feedback signal.

65. A method as claimed in claim 64 further including:
a) generating a charging current signal indicative of current at said DC port;
b) filtering said charging current signal to produce a filtered charging current signal;
c) generating a charging current command signal indicative of a desired charging current; and
d) subtracting said filtered charging current signal from said charging current command signal to produce said second current error signal.

66. A method as claimed in claim 65 further including:
a) generating a charging voltage signal indicative of voltage at said DC port;
b) generating a charging voltage reference signal indicative of a desired charging voltage;
c) subtracting said charging voltage signal from said charging voltage reference signal to produce a raw voltage error signal; and
d) filtering said raw voltage error signal with a second non-linear voltage loop compensation network to produce said second voltage error signal.

67. A method as claimed in claim 66 further including the step of providing a relatively slow loop response in said second non-linear voltage loop compensation network when said raw voltage error signal changes relatively slowly and a relatively fast loop response when said raw voltage error signal changes relatively quickly.

68. A method as claimed in claim 54 further including:
a) generating a DC bus voltage sense signal responsive to voltage at said DC bus;
b) generating a DC bus voltage reference signal;
c) generating a desired current waveform indicative of the desired current at said DC port;
d) generating an AC current sense signal responsive to current at said AC port;
e) generating an AC output voltage sense signal responsive to voltage at said AC port;
f) generating a charge mode command signal in response to said DC bus voltage sense signal, said DC bus voltage reference signal and said desired current waveform signal;
g) generating an inverter mode current command signal in response to said AC output voltage sense signal; and
h) selectively producing switching signals for controlling seventh, eighth, ninth and tenth switching elements in said DC to AC converter in response to said AC current sense signal, said DC bus voltage reference signal and at least one of said charge mode command signal and said inverter mode current command signal.

69. A method as claimed in claim 68 further including varying said inverter mode current command signal in response to DC offset voltage at a bridge output of a converter of said DC to AC converter.

70. A method as claimed in claim 69 further including the step of:
a) producing a filtered DC offset signal in response to said AC output voltage sense signal;
b) generating a sinewave reference signal;
c) subtracting said filtered DC offset signal from said sinewave reference signal to produce an output voltage command signal; and
d) subtracting said AC output voltage sense signal from said output voltage command signal to produce said inverter mode current command signal.

71. A method as claimed in claim 70 further including the step of:
a) subtracting said DC bus voltage sense signal from said DC bus voltage reference signal to produce an average current signal; and
b) multiplying said average current signal by said current waveform signal to produce said charge mode current command signal.

72. A method as claimed in claim 71 further including:
a) generating a third duty cycle command signal indicative of a desired duty cycle of said seventh, eighth, ninth and tenth switching elements;
b) producing a width-modulated pulse stream in response to said third duty cycle command signal; and
c) generating switching element control signals for controlling said seventh, eighth, ninth and tenth switching elements in response to said width-modulated pulse stream.

73. A method as claimed in claim 72 further including the step of compensating said third duty cycle command signal in response to the magnitude of current at said AC port to compensate for magnetization effects in said DC to AC converter.

74. A method as claimed in claim 73 further including the step of providing an amplified third duty cycle command signal to a third pulse width modulator, with an amplification dependent upon said AC current sense signal.

75. A method as claimed in claim 74 further including the step of switching said seventh and tenth switching elements in unison, between a conducting state and a non-conducting state and switching said eighth and ninth switching elements in unison, between a conducting state, and a non-conducting state such that a deadtime is provided when switching said seventh and tenth switching elements from a conducting state to a non-conducting state and when switching said eighth and ninth switching elements between said conducting state and said non-conducting state, said deadtime being a period during which each of said seventh, eighth, ninth and tenth switching elements is in a non-conducting state.

76. A method as claimed in claim 75 further including the step of producing eleventh and twelfth switching signals for controlling eleventh and twelfth switching elements to place a snubber circuit in communication with said bridge output for a period of time dependent upon current at the AC port and DC bus voltage.

77. A method as claimed in claim 76 further including the step of varying said period of time in response to said DC bus voltage sense signal and said AC current sense signal.

78. A power converter apparatus comprising:
a) first and second simultaneously operable DC to DC converters connectable to a common DC source, said first and second DC to DC converters each having first and second DC ports, said second DC ports being connected together;
b) a DC bus connected to said second DC ports;
c) a first DC to AC converter having a third DC port connected to said DC bus and a first AC port connectable to an AC source, said first DC to AC converter being bi-directional and operable in an AC to DC conversion mode;
d) a second DC to AC converter having a fourth DC port and a second AC port, said fourth DC port being connected to said DC bus and said second AC port being connected to an AC load; and
e) a load balancing energy storage element connected to said DC bus for decoupling said first and second DC to DC converters and said second DC to AC converter from said first DC to AC converter by supplying energy to said DC bus when a voltage at said DC bus is tending to decrease and for storing energy received from said DC bus when a voltage at said DC bus is tending to increase.

79. An apparatus as claimed in claim 78 wherein said first and second DC to AC converters are bi-directional.

80. An apparatus as claimed in claim 78 wherein said first and second DC to DC converters are bi-directional.

81. An apparatus as claimed in claim 78 wherein said first and second DC to DC converters include first and second current control loop circuits respectively for controlling the flow of power through said first and second DC to DC converters respectively.

82. An apparatus as claimed in claim 81 further including a DC to DC converter control circuit for providing current command signals to said first and second current control loop circuits respectively for apportioning contributions of energy to said load balancing energy storage element between said first and second DC to DC converters.

83. An apparatus as claimed in claim 78 wherein said first DC to AC converter includes a third current control loop circuit for controlling the flow of power through said first DC to AC converter.

84. An apparatus as claimed in claim 81 further including a DC to AC converter control circuit for providing a current command signal to said third current control loop circuit for controlling the flow of power through said first DC to AC converter.

85. An apparatus as claimed in claim 78 further including a fourth current control loop circuit for controlling the flow of power through said second DC to AC converter.

86. An apparatus as claimed in claim 85 further including a DC to AC converter control circuit for providing a current command signal to said fourth current control loop circuit for controlling the flow of power through said second DC to AC converter.

87. An apparatus as claimed in claim 78 wherein said first and second DC to DC converters are bi-directional and wherein said first converter and second DC to AC converters are bi-directional.

88. A power converter apparatus comprising:
a) first and second simultaneously operable DC to DC converters connectable to a common DC source, said first and second DC to DC converters each having first and second DC ports, said second DC ports being connected together;
b) a DC bus connected to said second DC ports;
c) first and second DC to AC converters each having third DC ports connected to said DC bus respectively and respective first AC ports for supplying power to first and second AC loads respectively; and
d) a load balancing energy storage element connected to said DC bus for decoupling said first and second DC to DC converters from said first and second DC to AC converters by supplying energy to said DC bus when a voltage at said DC bus is tending to decrease and for storing energy received from said DC bus when a voltage at said DC bus is tending to increase.

89. An apparatus as claimed in claim 88 wherein said first and second DC to DC converters include first and second current control loop circuits respectively for controlling the flow of power through said first and second DC to DC converters respectively.

90. An apparatus as claimed in claim 89 further including a DC to DC converter control circuit for providing current command signals to said first and second current control loop circuits respectively for apportioning contributions of energy to said load balancing energy storage element between said first and second DC to DC converters.

91. An apparatus as claimed in claim 88 wherein said first DC to AC converter includes a third current control loop circuit for controlling the flow of power through said first DC to AC converter.

92. An apparatus as claimed in claim 91 further including a first DC to AC converter control circuit for providing a current command signal to said third current control loop circuit for controlling the flow of power through said first DC to AC converter.

93. An apparatus as claimed in claim 92 wherein said second DC to AC converter includes a fourth current control loop circuit for controlling the flow of power through said second DC to AC converter.

94. An apparatus as claimed in claim 93 further including a second DC to AC converter control circuit for providing a current command signal to said fourth current control loop circuit for controlling the flow of power through said second DC to AC converter.

95. An apparatus as claimed in claim 94 wherein said first and second DC to AC converter control circuits control said first and second DC to AC converters such that said first and second DC to AC converters produce first and second AC waveforms respectively, said first and second AC waveforms being out of phase with each other.

96. An apparatus as claimed in claim 95 further including a reference signal generator for generating first and second AC waveform reference signals, said first and second AC waveform reference signals being provided to said first and second DC to AC converter control circuits respectively.

97. An apparatus as claimed in claim 88 wherein said first and second DC to DC converters are bi-directional and wherein said first and second DC to AC converters are bi-directional.

98. An apparatus as claimed in claim 88 wherein said first and second DC to AC converters include third and fourth current control loop circuits respectively for controlling the flow of power through said first and second DC to AC converters.

99. An apparatus as claimed in claim 98 further including a first DC to AC converter control circuit for providing third and fourth current command signals to said third and fourth current control loop circuits respectively for controlling the flow of power through said first and second DC to AC converters.

100. A power converter apparatus comprising:
a) first and second simultaneously operable DC to DC converters connectable to first and second DC sources respectively, said first and second DC to DC converters each having first and second DC ports, said second DC ports being connected together;
b) a DC bus connected to said second DC ports;
c) first and second DC to AC converters each having a third DC ports connected to said DC bus respectively and respective first AC ports for supplying power to first and second AC loads respectively; and
d) a load balancing energy storage element connected to said DC bus for decoupling said first and second DC to DC converters from said first and second DC to AC converters by supplying energy to said DC bus when a voltage at said DC bus is tending to decrease and for storing energy received from said DC bus when a voltage at said DC bus is tending to increase.

101. An apparatus as claimed in claim 100 wherein said first and second DC to DC converters include first and second current control loop circuits respectively for controlling the flow of power through said first and second DC to DC converters respectively.

102. An apparatus as claimed in claim 101 further including first and second DC to DC converter control circuits for providing first and second current command signals to said first and second current control loop circuits respectively for independently controlling power flow through said first and second DC to DC converters.

103. An apparatus as claimed in claim 100 wherein said first DC to AC converter includes a third current control loop circuit for controlling the flow of power through said first DC to AC converter.

104. An apparatus as claimed in claim 103 further including a first DC to AC converter control circuit for providing a current command signal to said third current control loop circuit for controlling the flow of power through said first DC to AC converter.

105. An apparatus as claimed in claim 104 wherein said second DC to AC converter includes a fourth current control loop circuit for controlling the flow of power through said second DC to AC converter.

106. An apparatus as claimed in claim 105 further including a second DC to AC converter control circuit for providing a current command signal to said fourth current control loop circuit for controlling the flow of power through said second DC to AC converter.

107. An apparatus as claimed in claim 106 wherein said first and second DC to AC converter control circuits control said first and second DC to AC converters such that said first and second DC to AC converters produce first and second AC waveforms respectively, said first and second AC waveforms being out of phase with each other.

108. An apparatus as claimed in claim 107 further including a reference signal generator for generating first and second AC waveform reference signals, said first and second AC waveform reference signals being provided to said first and second DC to AC converter control circuits respectively.

109. An apparatus as claimed in claim 100 wherein said first and second DC to DC converters are bi-directional and wherein said first and second DC to AC converters are bi-directional.

110. An apparatus as claimed in claim 100 wherein said first and second DC to AC converters include third and fourth current control loop circuits respectively for controlling the flow of power through said first and second DC to AC converters.

111. An apparatus as claimed in claim 110 further including a first DC to AC converter control circuit for providing third and fourth current command signals to said third and fourth current control loop circuits respectively for controlling the flow of power through said first and second DC to AC converters.

* * * * *